United States Patent
Miller et al.

(10) Patent No.: US 7,110,473 B2
(45) Date of Patent: Sep. 19, 2006

(54) MODE CONTROLLER FOR SIGNAL ACQUISITION AND TRACKING IN AN ULTRA WIDEBAND COMMUNICATION SYSTEM

(75) Inventors: Timothy R. Miller, Arlington, VA (US); Gerard P. Lynch, Ashburn, VA (US); Deepak M. Joseph, Oakton, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 792 days.

(21) Appl. No.: 10/214,183

(22) Filed: Aug. 8, 2002

(65) Prior Publication Data

US 2003/0067963 A1 Apr. 10, 2003

Related U.S. Application Data

(63) Continuation-in-part of application No. 09/685,197, filed on Oct. 10, 2000, now Pat. No. 6,965,630, and a continuation-in-part of application No. 09/209,460, filed on Dec. 11, 1998, now Pat. No. 6,700,939.

(60) Provisional application No. 60/311,114, filed on Aug. 10, 2001.

(51) Int. Cl.
*H04L 27/06* (2006.01)
*H04L 23/00* (2006.01)

(52) U.S. Cl. ..................... 375/316; 375/377

(58) Field of Classification Search ............ 375/130, 375/136, 145, 159, 377, 316, 140, 147, 149, 375/326, 141; 370/441, 342, 335
See application file for complete search history.

(56) References Cited

U.S. PATENT DOCUMENTS

| | | | | |
|---|---|---|---|---|
| 3,409,744 A | * | 11/1968 | Liberman | 360/8 |
| 4,689,806 A | | 8/1987 | von der Embse | |
| 5,007,068 A | * | 4/1991 | Simon et al. | 375/280 |
| 5,184,139 A | * | 2/1993 | Hirako et al. | 342/354 |
| 5,239,497 A | * | 8/1993 | McKay et al. | 708/422 |
| 5,469,471 A | * | 11/1995 | Wheatley, III | 370/335 |
| 5,471,508 A | * | 11/1995 | Koslov | 375/344 |
| 5,642,377 A | * | 6/1997 | Chung et al. | 375/145 |
| 5,898,665 A | * | 4/1999 | Sawahashi et al. | 370/342 |
| 6,205,189 B1 | * | 3/2001 | Ha | 375/345 |
| 6,597,727 B1 | * | 7/2003 | Philips et al. | 375/147 |
| 6,965,630 B1 | * | 11/2005 | Miller et al. | 375/130 |

FOREIGN PATENT DOCUMENTS

| | | |
|---|---|---|
| EP | 0 776 106 A | 5/1997 |
| WO | WO 02 32066 A | 4/2002 |

OTHER PUBLICATIONS

Sandeep et al., "Timing Acquisition in Ultra-Wideband=d Communication Systems," IEEE pp. 1570-1583, 2005.*

* cited by examiner

*Primary Examiner*—Tesfaldet Bocure

(57) ABSTRACT

A system and method is provided for controlling the mode of operation in a UWB receiver. In one variation, the system and method determines the mode of operation by reading a set number of samples of the signal, estimating mode parameters, calculating a mode probability, and then transitioning in a finite state machine between a track and an acquisition state depending on the value of the mode probability. Exemplary versions of the mode controller include a signal to noise ratio calculator, a signal and noise power estimator, and an AGC initialization circuit.

59 Claims, 27 Drawing Sheets

MODE CONTROLLER FOR SIGNAL ACQUISITION AND TRACKING IN AN ULTRA WIDEBAND COMMUNICATION SYSTEM

CROSS-REFERENCE TO RELATED PATENT DOCUMENTS

This application is a continuation-in-part of U.S. application Ser. No. 09/685,197, for "MODE CONTROLLER FOR SIGNAL ACQUISITION AND TRACKING IN AN ULTRA WIDEBAND COMMUNICATION SYSTEM," filed Oct. 10, 2000 now issued as U.S. Pat. No. 6,965,630 on Nov. 15, 2005, and a continuation-in-part of U.S. application Ser. No. 09/209,460 for "ULTRA WIDE BANDWIDTH SPREAD-SPECTRUM COMMUNICATIONS SYSTEM filed on Dec. 11, 1998, now issued as U.S. Pat. No. 6,700, 939 on Mar. 2, 2004." This application also relies for priority upon U.S. provisional application Ser. No. 60/311,114, for "MODE CONTROLLER FOR SIGNAL ACQUISITION AND TRACKING IN AN ULTRA WIDEBAND COMMUNICATION SYSTEM," filed Aug. 10, 2001. The contents of each of these applications are hereby incorporated by reference in their entirely.

BACKGROUND OF THE INVENTION

The present invention relates to radio frequency communication receivers, systems and methods employing ultra wide bandwidth (UWB) signaling techniques. More particularly, the present invention relates to the systems and methods configured to control in a receiver when to acquire the UWB signal and when to track the incoming UWB signal to maintain quality of service.

In wireless communication systems, a transmitter takes data, modulates it, and sends the resulting waveforms to an amplifier and antenna, which converts the waveforms from electrical signals into electromagnetic radiation. This electromagnetic radiation propagates through the air and is converted into an electrical current by an antenna coupled to a receiver. These currents (or voltages) are then amplified and processed before being sent to a converter to convert the electrical signals into digital samples and subsequently processed to extract the source information from the signal.

In order to maintain a particular quality of service at the receiver, the receiver "locks" on to the incoming signal. Thus, the receiver monitors the signal quality of the incoming signal, and employs a device to determine when the receiver should be placed in a signal acquisition mode of operation, in which a signal of sufficient quality is not being received, or a signal track mode of operation, in which a signal of sufficient quality is being received. More detailed descriptions of receiver synchronization are found in Chapter 8 of "Digital Communications" B. Sklar, Prentice Hall, 1988, the entire contents of which are incorporated by reference herein.

Some radios have a mode controller incorporated into the receiver. The mode controller monitors the received incoming signal and determines whether the signal-to-noise ratio (SNR) is sufficient to maintain an acceptable quality of service. If the mode controller determines that the SNR is not sufficient, the receiver is forced out of a track mode and into an acquisition mode.

Some radios use a RSSI (received signal strength indicator) to determine what mode, i.e., tracking or acquisition, the mode controller should be in. The RSSI measures purely incoming signal strength. However, a problem with these type of controllers is that when the noise power increases significantly, the signal strength still shows acceptability when, in fact, the quality of the signal is noisy and unacceptable.

Other radios use two RSSIs—one to measure signal power and the other to measure noise power. The noise power is measured in an out-of-band region of the spectrum presumably unoccupied by any signals. Assuming the noise is the same in the out-of band region as in the in-band region, this measure presumably indicates an accurate noise power for the in-band region. However, this presumption may not be correct. The presumed unoccupied region may contain a signal that would affect the estimate of the assumed noise power. In addition, the out-of-band noise power may not be the same as the in-band noise power. These radios estimate SNR from the in-band signal measure and out-of-band noise measure. The underlying presumption that noise changes little over relatively small frequency ranges empowers such techniques for narrowband systems. Out-of-band noise for UWB systems holds no significance. Hence, a truer estimate of SNR is desired.

The present inventors recognize that in order to get a true indication of radio performance, both signal and noise power should be measured and both measurements should be taken in-band, especially for UWB systems. The true indication of radio performance allows the mode controller to accurately switch between the acquisition and tracking states of the radio, preventing missed acquisitions, which adversely affect system throughput because the receiver spends time trying to acquire a signal when it should be receiving data at an acceptable bit error rate (BER), and preventing false acquisitions, which cause the receiver to process data and unacceptable BERs.

Such erroneous transitions to the acquisition mode arise in systems where the incoming signal is prone to burst error or intermittent signal loss, for example. The bursty nature of the incoming signal is particularly true for a UWB channel. In these bursty communication channels, the receiver can frequently be forced out of the tracking state, due to a short outage, no longer receiving the signal. The radio attempts to reacquire the signal in order to get an acceptable SNR even though the reception outage time is relatively short. These frequent reception interruptions while the radio attempt reacquisition adversely affect the system's effective throughput.

The challenge is to effectively determine when a receiver should transition between a tracking state and an acquisition state in a way that minimizes degradation of quality of service (e.g., acceptable BER at a certain throughput).

SUMMARY OF THE INVENTION

Consistent with the title of this section, only a brief description of selected features of the present invention is now presented. A more complete description of the present invention is the subject of this entire document.

An object of the present invention is to provide a UWB receiver that includes a synchronization mode controller that estimates signal power of an incoming UWB signal relative to background noise to determine a SNR, and from the SNR determine whether the receiver should be in acquisition or track mode.

Another object of the present invention is to provide a UWB receiver that includes a mode controller that uses a processor for efficiently calculating SNR in order to determine whether the receiver should be in acquisition or track mode.

Another feature of the present invention is to address the above-identified and other deficiencies of conventional communications systems and methods.

These and other objects are accomplished by way of a radio receiver configured to receive UWB transmissions. While several embodiments are disclosed herein, one embodiment would be to include a signal to noise ratio calculator, while another would be to include a signal and noise power estimator for detecting whether a receiver is locked onto an incoming UWB signal and whether a receiver should be in acquisition or track mode.

Some of these objectives are also accomplished by a mode controller for determining a desired operation mode for acquisition or tracking of an incoming data signal. The mode controller comprises a data dependence removal element for receiving the incoming data signal and outputting a data-independent signal that indicates a strength of the incoming data signal independent of data contained in the incoming data signal; a signal path comprising a first processor for manipulating the data-independent signal to determine a first intermediate signal; and a first non-linear function element for performing a non-linear function on the first intermediate signal to determine a signal parameter; a noise-related path, comprising a second non-linear function element for performing a non-linear function on the data-independent signal to determine a second intermediate signal; a second processor for manipulating the second intermediate signal to determine a noise-related parameter; and a third processor for processing the signal parameter and the noise-related parameter to determine a mode-controlling parameter indicative of the relative signal strength of the incoming data signal.

The mode controller may further comprise a first sub-sampler between the first processor and the first non-linear function element for sampling the first intermediate signal at a first rate and outputting a sampled first intermediate signal to the first non-linear function element. The mode controller may also further comprise a second sub-sampler between the second processor and the comparator for sampling the signal parameter at a second rate and outputting a sampled signal parameter to the comparator.

The mode controller may further comprise an input scaler for multiplying the incoming signal by a first scaling factor before it is input to the data dependence removal element. The first scaling factor may be a factor of 2. The first scaling factor may also be programmable.

The mode controller may further comprise a signal path scaler for multiplying the signal parameter by a second scaling factor before it is input to the comparator. The second scaling factor may be a factor of 2. The second scaling factor may also be programmable.

The mode controller may further comprise a noise-related path scaler for multiplying the noise-related signal by a third scaling factor before it is input to the comparator. The third scaling factor may be a factor of 2. The third scaling factor may also be programmable.

The first processor may be a first filter. The first filter may be a finite impulse response filter, a moving average filter, an infinite impulse response filter, a leaky integrator filter, or any other desired filter. Similarly, the second processor may be a second filter. The second filter may be a finite impulse response filter, a moving average filter, an infinite impulse response filter, or a leaky integrator filter, or any other desired filter.

In particular, in one embodiment the first processor is an infinite impulse response filter while the second processor is a leaky integrator filter. In this case, the infinite impulse response filter may be shaped to approximate an expected correlation signal. In another embodiment the first processor is a first moving average filter and the second processor is a second moving average filter.

The data dependence removal element may be an absolute value element that outputs the absolute value of the incoming signal as the data-independent signal.

The first non-linear function element is a first squarer that outputs the square of the first intermediate signal as the signal parameter. Likewise, the second non-linear function element may be a second squarer that outputs the square of the data-independent signal as the second intermediate signal.

Some of these objectives are also accomplished by a mode controller for determining a desired operation mode for acquisition or tracking of an incoming data signal. The mode controller comprises an absolute value element for receiving the incoming data signal and determining an absolute value of the incoming data signal; a signal path comprising a first filter for filtering the absolute value of the data signal to determine a first intermediate signal; and a first squarer for squaring the first intermediate signal to determine a noise-related parameter; a noise-related path, comprising a second squarer for squaring the absolute value of the incoming data signal to determine a second intermediate signal; and a second filter for filtering the second intermediate signal to determine a signal parameter; and a comparator for comparing the signal parameter and the noise-related parameter to determine a mode-controlling parameter indicative of the relative signal strength of the incoming data signal.

The mode controller may further comprise a first sub-sampler between the first filter and the first squarer for sampling the first intermediate signal at a first rate and outputting a sampled first intermediate signal to the first squarer. The mode controller may further comprise a second sub-sampler between the second filter and the comparator for sampling the signal parameter at a second rate and outputting a sampled signal parameter to the comparator.

The mode controller may further comprise an input scaler for multiplying the incoming signal by a first scaling factor before it is input to the absolute value element. The first scaling factor may be a factor of 2. The first scaling factor may be programmable.

The mode controller may further comprise a signal path scaler for multiplying the signal parameter by a second scaling factor before it is input to the comparator. The second scaling factor may be a factor of 2. The second scaling factor may be programmable.

The mode controller may further comprise a noise-related path scaler for multiplying the noise-related signal by a third scaling factor before it is input to the comparator. The third scaling factor may be a factor of 2. The third scaling factor may be programmable.

The first filter may be a finite impulse response filter, a moving average filter, an infinite impulse response filter, or a leaky integrator filter, or any other desired filter. Similarly, the second filter may be a finite impulse response filter, a moving average filter, an infinite impulse response filter, a leaky integrator filter, or any other desired filter.

In particular, in one embodiment the first processor is an infinite impulse response filter while the second processor is a leaky integrator filter. In this case, the infinite impulse response filter may be shaped to approximate an expected correlation signal. In another embodiment the first processor is a first moving average filter and the second processor is a second moving average filter.

Some of these objectives are also accomplished by a mode controller for determining a desired operation mode for acquisition or tracking of an incoming data signal in an ultrawide bandwidth receiver. The mode controller comprises a signal path for determining a signal parameter of the incoming data signal; a noise-based path for determining a noise-based parameter of the incoming data signal; a processor for processing the signal parameter and the noise-related parameter to determine a mode-controlling parameter; and a controller for transitioning between an acquisition mode and a tracking mode based on the mode-controlling parameter.

The signal parameter may be an estimate of signal strength and the noise-based parameter is an estimate of signal-plus-noise strength. The processor may be a comparator.

The mode controller may further comprise a signal path scaler for scaling the signal parameter to generate a scaled signal parameter. The processor may then receive the scaled signal parameter rather than the signal parameter.

The mode controller may further comprise a noise path scaler for scaling the noise-based parameter to generate a scaled noise-based parameter The processor may then receive the scaled noise-based parameter rather than the noise-based parameter.

The signal path may comprise a filter followed by squarer. The noise path may comprise a squarer followed by a filter.

The mode controller may further comprise an absolute value block for determining an absolute value of the incoming data signal and providing the absolute value of the data signal to the signal path and the noise-based path.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which.

DETAILED DESCRIPTION OF THE PREFERRED EMBODIMENTS

Figure 1:
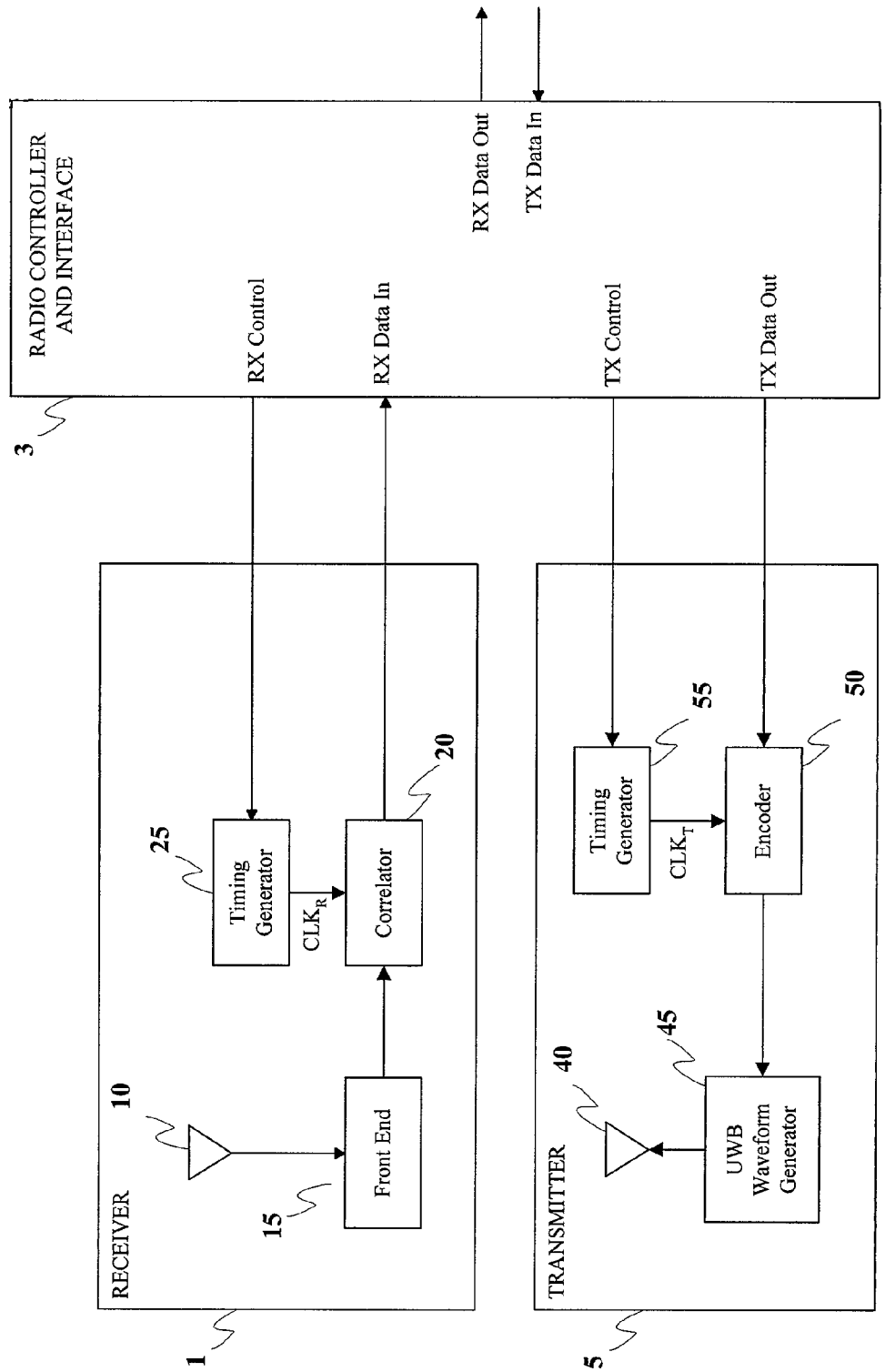
FIG. 1 is a block diagram of an ultra-wide band (UWB) transceiver according to a preferred embodiment of the present invention.

Preferred embodiments of the present invention will now be described with reference to the drawings. Throughout the several views, like reference numerals designate identical or corresponding parts.

Transceiver Design

FIG. 1 is a block diagram of an ultra-wide band (UWB) transceiver according to a preferred embodiment of the present invention. As shown in FIG. 1, the transceiver includes three major components, a receiver 1, a radio controller and interface 3, and a transmitter 5. The receiver 1 includes a receiving antenna 10, a front end 15, a UWB waveform correlator 20, and a receiving timing generator 25. The transmitter includes a transmitting antenna 40, a UWB waveform generator 45, an encoder 50, and a transmitting timing generator 55.

Although a single radio controller and interface 3 is shown servicing both the receiver 1 and transmitter 5, alternate embodiments could include a separate radio controller and interface 3 for each of the receiver 1 and transmitter 5. In addition, a single antenna that is switched between transmitting and receiving may be used in place of the separate receiving and transmitting antennas 10 and 40. The receiving and transmitting timing generators 25 and 55 may also be combined into a single timing generator or may be maintained as separate units.

The radio controller and interface 3 is preferably a processor-based unit that is implemented either with hard wired logic, such as in one or more application specific integrated circuits (ASICs) or in one or more programmable processors. In operation, the radio controller and interface 3 either serves as a media access control (MAC) controller or serves as a MAC interface between the UWB wireless communication functions implemented by the receiver 1 and transmitter 5 and applications that use the UWB communications channel for exchanging data with remote devices.

When the transceiver is receiving a signal, the receiving antenna 10 converts an incoming UWB electromagnetic waveform into an electrical signal (or optical signal) and provides this electrical signal to the radio front end 15. Depending on the type of waveform, the radio front end 15 processes the electric signals so that the level of the signal and spectral components of the signal are suitable for processing in the UWB waveform correlator 20. This processing may include spectral shaping, such as a matched filtering, partial matched filtering, simple roll-off, etc.

After front end processing, the UWB waveform correlator 20 then correlates the incoming signal with different candidate signals generated based on a clock signal from the timing generator 25 to determine whether the receiver 1 is synchronized with the incoming signal and if so, to determine the data contained in the received incoming signal.

The timing generator 25 operates under the control of the radio controller and interface 3 to provide a clock signal $CLK_R$ that is used in the correlation process performed in the UWB waveform correlator 20. This clock signal $CLK_R$ has a phase that is preferably varied with respect to the incoming signal received at the receiving antenna 10. The UWB waveform correlator uses the clock signal $CLK_R$ to locally generate a correlation signal that matches a portion of the incoming signal and has the phase of the clock signal $CLK_R$. When the locally-generated correlation signal (the locally-generated signal) and the incoming signal are aligned with one another in phase, the UWB waveform correlator 20 provides high signal-to-noise ratio (SNR) data to the radio controller and interface 3 for subsequent processing.

Conceptually, the UWB waveform correlator 20 can be considered to have a correlation window containing the local signal. As the phase of the clock signal is varied with respect to that of the incoming signal, the correlation window is shifted. The correlation window is then compared to a snapshot of the incoming signal until an acceptable correlation result is obtained for the two signals, indicating that an acquisition lock has been achieved.

In some circumstances, the output of the UWB waveform correlator 20 is the data itself. In other circumstances, the UWB waveform correlator 20 simply provides an intermediate correlation result, which the radio controller and interface 3 uses to determine the data and determine when the receiver 1 is synchronized with the incoming signal.

The UWB waveform correlator 20 operates in two modes of operation, a signal track mode ("track mode") and a signal acquisition mode ("acquisition mode"). Acquisition mode is used when synchronization either has not occurred or has been lost, and the receiver 1 is working to achieve such synchronization. Track mode is used when synchronization has occurred and needs to be maintained.

During acquisition mode, the radio controller and interface 3 provides a control signal to the receiver 1 to acquire synchronization. This control signal instructs the receiver 1 to slide the correlation window within the UWB waveform correlator 20 to try and match the phase of the incoming signal and achieve an acquisition lock. In particular, this is achieved by adjusting the phase and frequency of the clock output from the timing generator 25 until a desirable correlation result is obtained.

Once synchronized, the receiver enters track mode. During track mode, the transceiver operates to maintain and improve synchronization. In particular, the radio controller and interface 3 analyzes the correlation result from the UWB waveform correlator 20 to determine whether the correlation window in the UWB waveform correlator 20, i.e., the phase of the local signal from the timing generator, needs to be adjusted.

In addition, during track mode, the receiver 1 provides data to an input port ("RX Data In") of the radio controller and interface 3, which in turn provides this data to an external process, via an output port ("RX Data Out"). The external process may be any one of a number of processes performed with data that is either received via the receiver 1 or is to be transmitted via the transmitter 5 to a remote receiver.

When the transceiver is transmitting a signal, the radio controller and interface 3 receives source data at an input port ("TX Data In") from an external source. The radio controller and interface 3 then applies the data to the encoder 50 of the transmitter 5 via an output port ("TX Data Out"). The radio controller and interface 3 also provides control signals to the transmitter 5 for use in identifying the signaling sequence of UWB pulses. As noted above, in some embodiments of the present invention, the receiver 1 and the transmitter 5 functions may use joint resources, e.g., a common timing generator and/or a common antenna.

The encoder 50 receives user coding information and data from the radio controller and interface 3 and preprocesses the data and coding so as to provide a timing input for the UWB waveform generator 45. The UWB waveform generator 45 in turn produces UWB pulses encoded in shape and/or time to convey the data to a remote location. The encoder 50 performs this function in accordance with a timing signal received from the transmitting timing generator 55.

The encoder 50 produces the control signals necessary to generate the required modulation. For example, the encoder 50 may take a serial bit stream and encode it with a forward error correction (FEC) algorithm (e.g., such as a Reed Solomon code, a Golay code, a Hamming code, a Convolutional code, etc.). The encoder 50 may also interleave the data to guard against burst errors. The encoder 50 may also apply a whitening function to prevent long strings of "ones" or "zeros." The encoder 50 may also apply a user specific spectrum spreading function, such as generating a predetermined length chipping code that is sent as a group to represent a bit (e.g., inverted for a "one" bit and non-inverted for a "zero" bit, etc.). The encoder 50 may divide the serial bit stream into subsets in order to send multiple bits per wavelet or per chipping code, and generate a plurality of control signals in order to affect any combination of the modulation schemes as described above (e.g., as described in Lathi, "Modern Digital and Analog Communications Systems," Holt, Rinehart and Winston, 1998, the entire contents of which is incorporated by reference herein).

The radio controller and interface 3 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal as a way of impressing the encoding onto the signal.

The output from the encoder 50 is applied to the UWB waveform generator 45, which then produces a UWB pulse sequence of pulse shapes at pulse times according to the command signals it receives, which may be one of any number of different schemes. The output from the UWB generator 45 is then provided to the transmitting antenna 40, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 5, etc. A potentially more important quality, however, is the application of such techniques to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
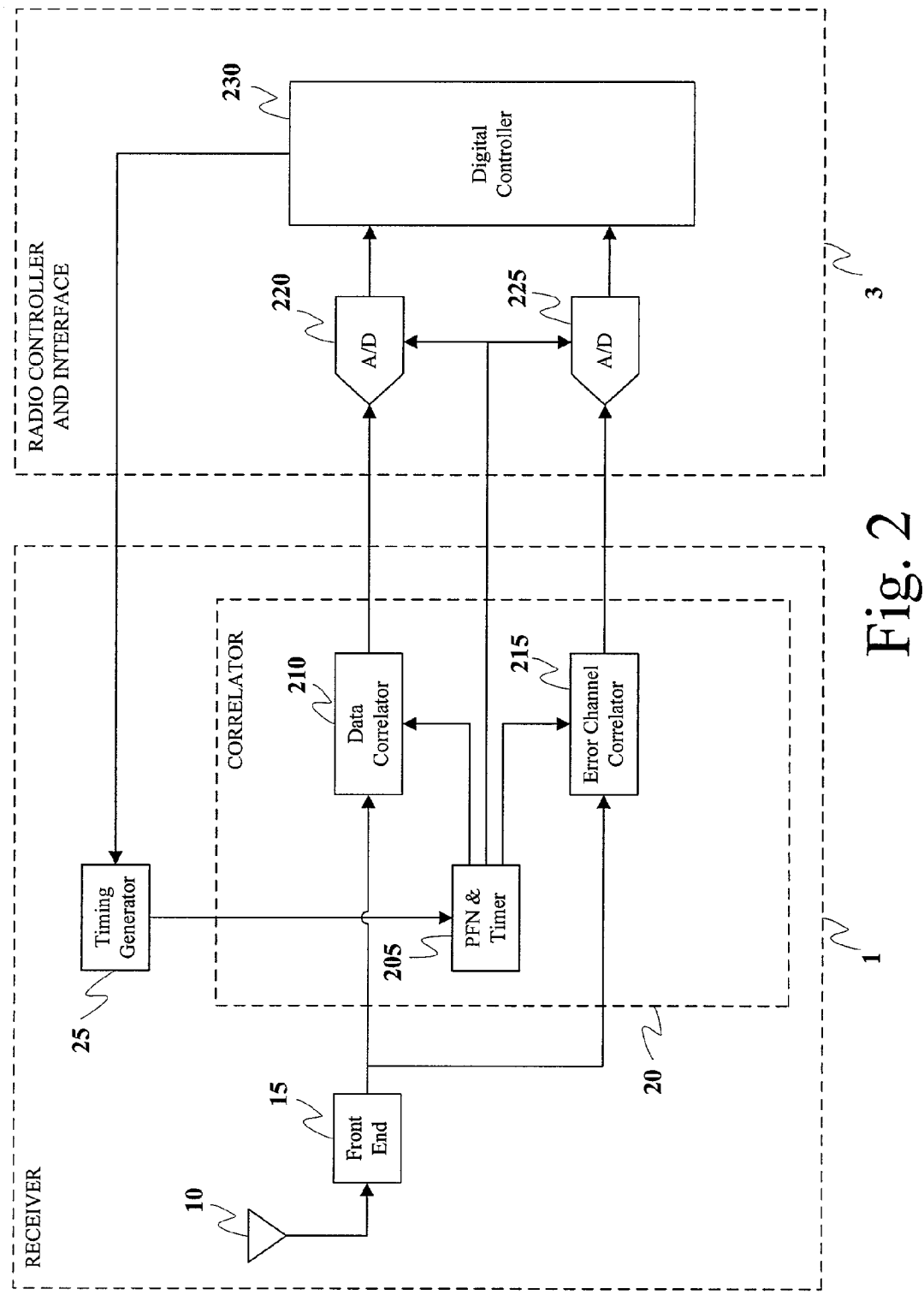
FIG. 2 is a block diagram of the receiver and radio control and interface portions of the transceiver of FIG. 1 according to a preferred embodiment of the present invention.

FIG. 2 is a block diagram of the receiver and radio control and interface portions of the transceiver of FIG. 1 according to a preferred embodiment of the present invention. As shown in FIG. 2, the UWB waveform correlator 20 further includes a pulse forming network (PFN) and timer 205, a data correlator 210, and an error channel correlator 215. The radio controller and interface 3 includes first and second A/D converters 220 and 225, and a digital controller 230. The operation of the receiver 1 and the radio controller and interface 3 will be described below.

Based on the clock signal received from the timing generator 25, the PFN and timer 205 generates a series of local pulses, e.g., square pulses or perhaps wavelets, (i.e., the locally-generated signal) that are provided to both the data correlator 210 and the error channel correlator 215. The PFN and timer 205 also provides a control signal to the data and error channel correlators 210 and 215 and a clocking command to the first and second A/D converters 220 and 225. The control signal controls the operation of the data and error channel correlators 210 and 215, and the clocking signal instructs the first and second A/D converters 220 and 225 to sample the respective outputs of the data and error channel correlators 210 and 215.

The first and second A/D converters 220 and 225 receive the analog outputs from the data and error channel correlators 210 and 215, respectively, and convert these to digital signals, which are then provided to the digital controller 230. The digital controller 230, in turn, determines whether a signal of sufficient quality has been received (either for acquisition or to maintain signal lock) and performs a mode control operation that selects whether the receiver 1 should currently be in track mode or acquisition mode. In addition, if the receiver 1 is in track mode, the digital controller 230 also provides information to the receiver timing generator 25 to improve the signal lock.

Figure 3:
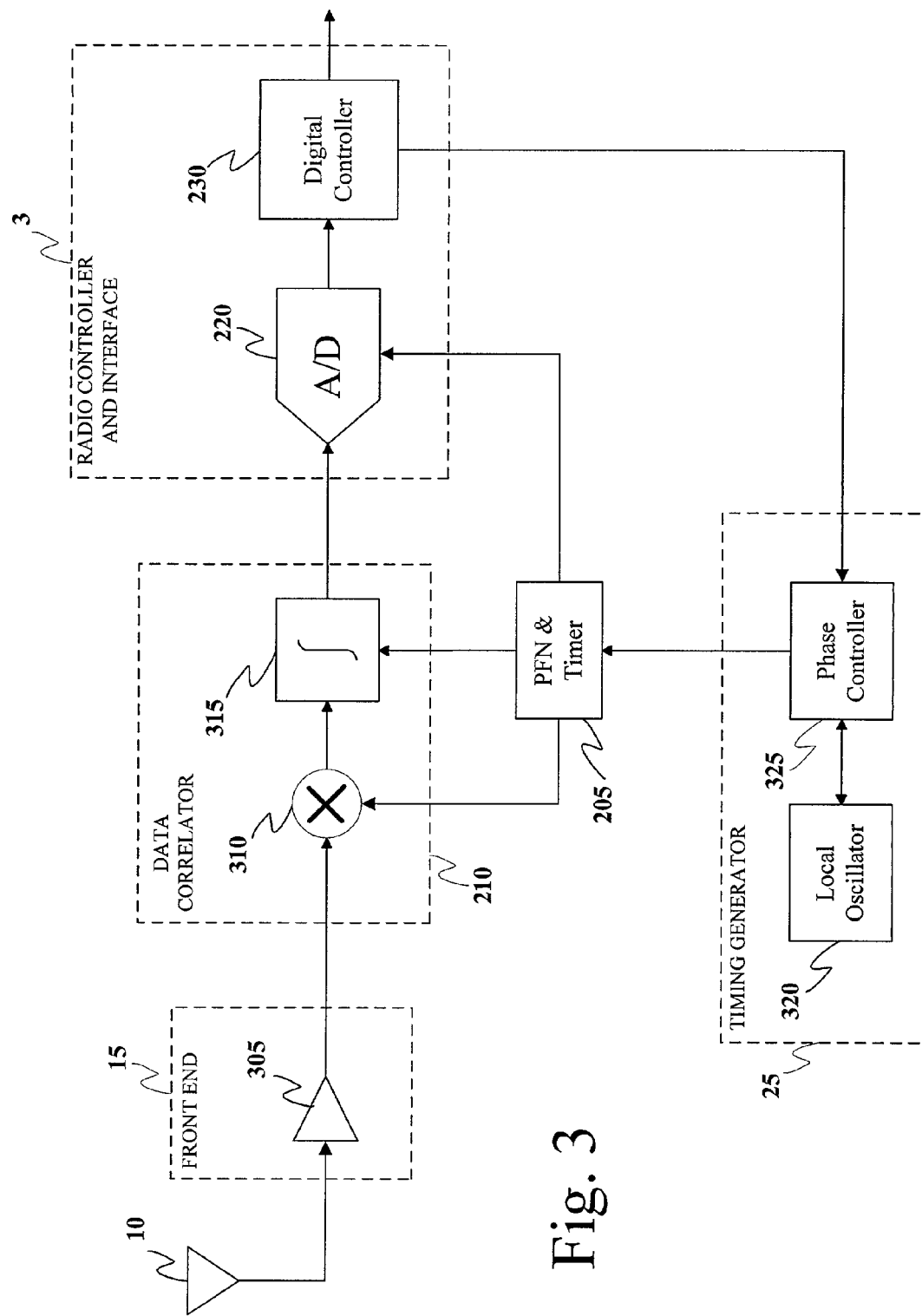
FIG. 3 is a block diagram of an acquisition path of the receiver of FIG. 2, according to a preferred embodiment of the present invention.

FIG. 3 is a block diagram of a data path in the receiver according to a preferred embodiment of the present invention. As shown in FIG. 3, the front end 15 contains an amplifier 305; the data correlator 210 contains a data mixer 310 and a data integrator 315; and the timing generator 25 includes a local oscillator ("LO") 320 and a phase controller 325.

The amplifier 305 amplifies the incoming signal prior to sending it to the data correlator 210. In alternate embodiments the front end can be modified to perform as many or as few operations as needed. For example, it could also perform filtering and signal adjustment such as automatic gain control (AGC), if required.

The data mixer 310 receives the amplified incoming signal from the front end 15 and the locally-generated signal from the PFN and timer 205 and mixes the two signals to generate an on-time signal. The on-time signal is then provided to the data integrator 315, which integrates the on-time signal over a period of time between reset commands received from the PFN and timer 205. The integrated on-time signal generated by the data integrator 315 is output through the first A/D converter to the digital controller 230, which determines whether acquisition has successfully occurred in acquisition mode or whether data lock has been maintained in track mode.

Alternate embodiments could employ multiple mixers separated by one or more other processing units (such as amplifiers, filters, etc.) The first mixer reduces the input signal to an IF signal and the second mixer reduces the signal to baseband.

Figure 4:
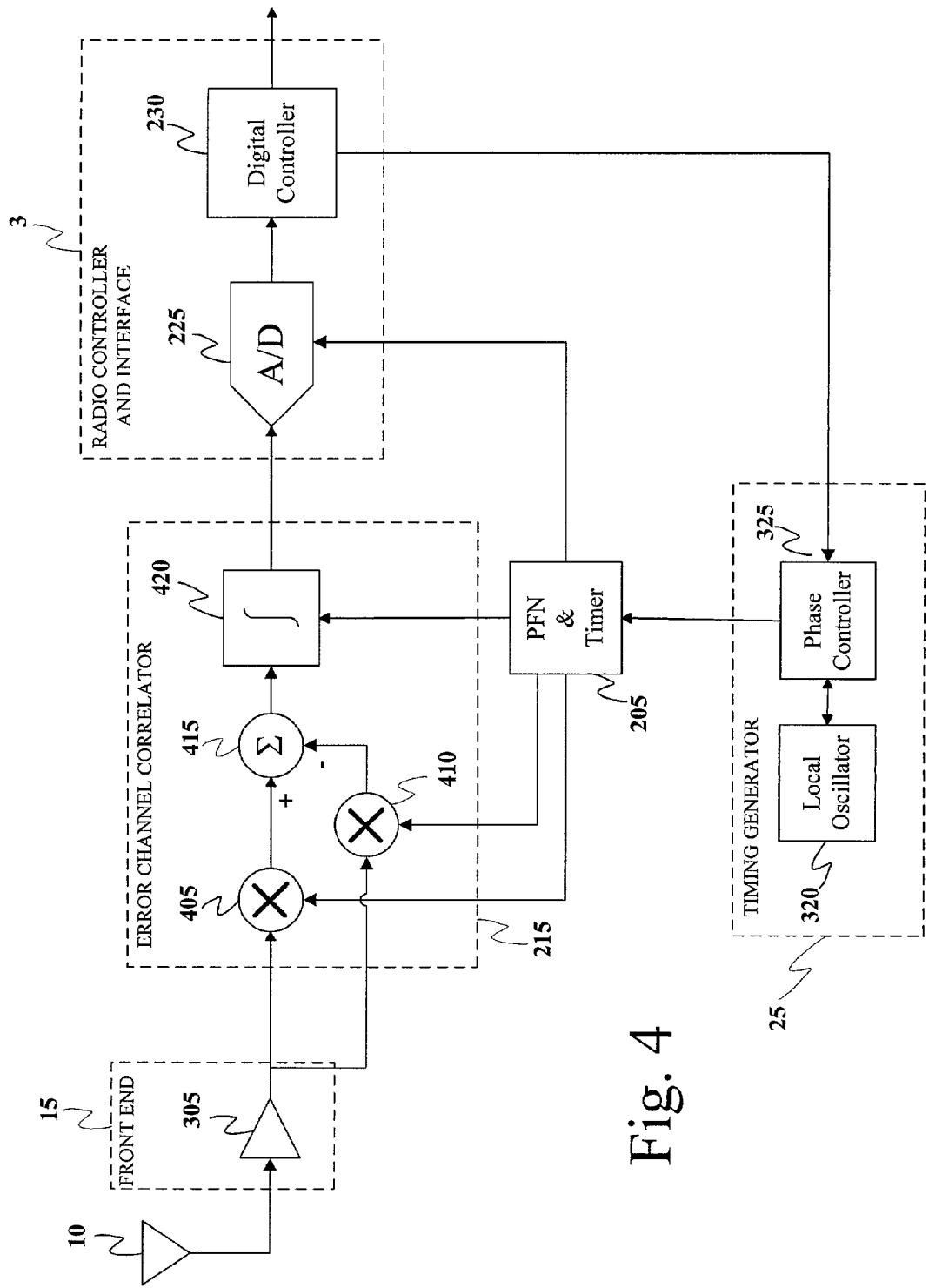
FIG. 4 is a block diagram of a tracking path of the receiver of FIG. 2, according to a preferred embodiment of the present invention.

FIG. 4 is a block diagram of an error channel path in the receiver according to a preferred embodiment of the present invention. As shown in FIG. 4, the front end 15 contains an amplifier 305; the error channel correlator 215 contains a first error channel mixer 405, a second error channel mixer 410, an error channel summer 415, and an error channel integrator 420; and the timing generator 25 includes a local oscillator 320 and a phase controller 325.

The first error channel mixer 405 receives the amplified incoming signal from the front end 15 and a first copy of the locally-generated signal from the PFN and timer 205 and mixes the two signals. The second error channel mixer 410 receives the amplified incoming signal from the front end 15 and a second copy of the locally-generated signal from the PFN and timer 205 and multiplies the two signals.

The first and second copies of the locally-generated signal provided to the first and second error channel mixers 405 and 410 are preferably delayed by a set amount from each other so that the first error channel mixer 405 considers a locally-generated signal with a first phase and the second error channel mixer 410 considers a locally-generated signal with a second phase. This allows the error channel correlator 215 to consider correlation values based on two different phases for the local signal. Based on this comparison, the digital controller 230 can determine necessary adjustments to the phase of the local signal.

As noted above, alternate embodiments could employ multiple mixers separated by one-or more other processing units (such as amplifiers, filters, etc.) The first mixer reduces the input signal to an IF signal and the second mixer reduces the signal to baseband.

In implementation the phase delays for the incoming signal may be functionally achieved by either delaying the incoming signals provided to the first and second error channel mixers 405 and 410 a required amount or by positioning the phases of the first and second copies of the locally-generated signal provided to the first and second error channel mixers 405 and 410 the same amount from a central phase.

The local oscillator 320 generates an initial clock signal. This signal is preferably at the same frequency as that of the incoming signal, though it does not need to be. Based on the initial clock signal and a phase control signal from the radio controller and interface 3 (specifically the digital controller 230), the phase controller 325 creates the locally-generated signal with a specific phase. This phase can and is adjusted in accordance with instructions from the digital controller 230 as the signal is processed.

In a preferred embodiment of the present invention, the chipping rate of the incoming signal, the initial clock signal, and the chipping rate of the locally-generated signal are all nominally at a frequency of 1.3 GHz, while the reset commands provided to the data integrator 315, the error integrator 420, and the second A/D converter 225, and the clocking signal provided to the first A/D converter 220 are at a frequency of 100 MHz. In alternate embodiments, however, these frequencies may be varied.

Figure 5:
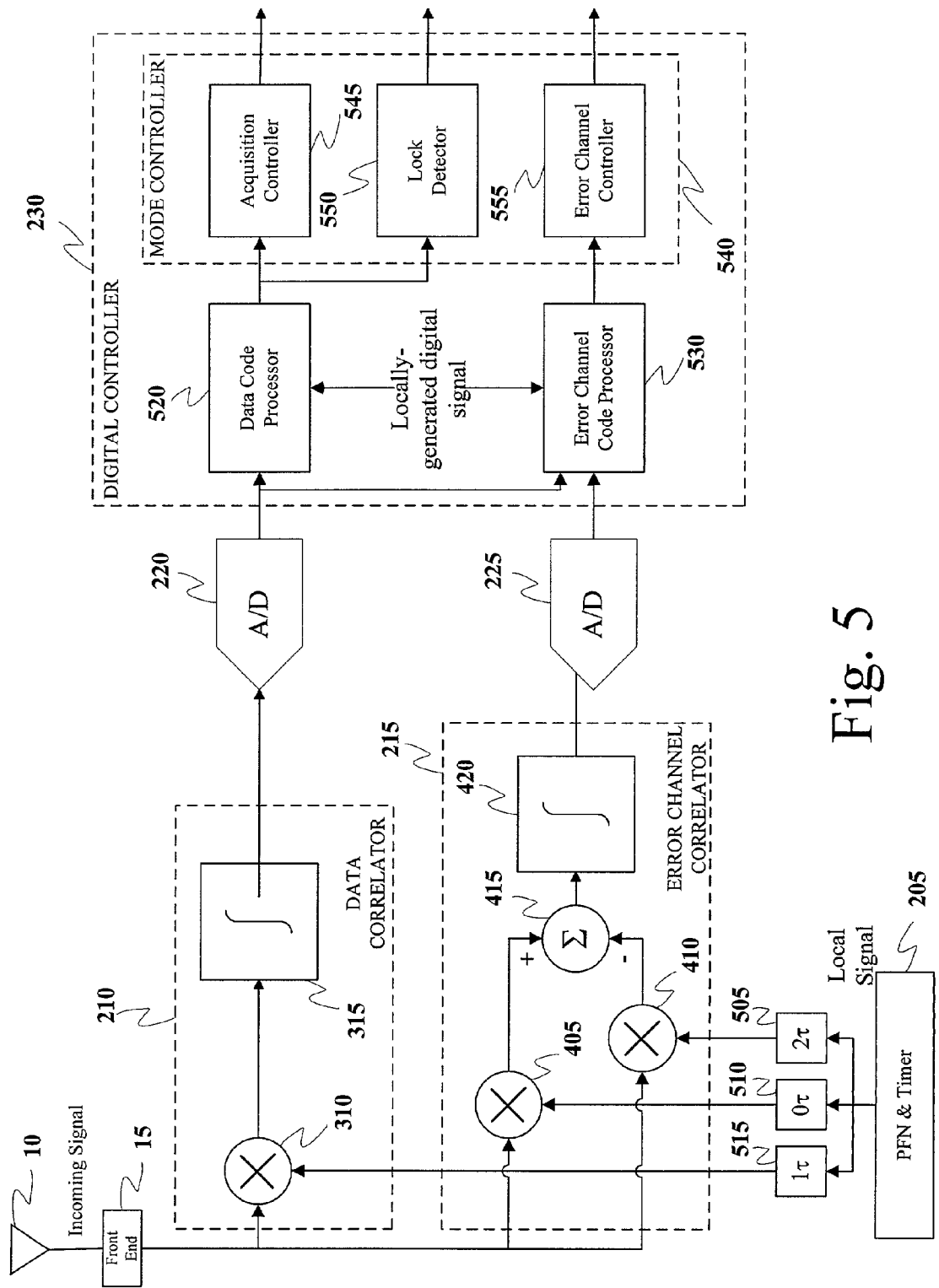
FIG. 5 is a block diagram showing acquisition and tracking paths of the receiver of FIG. 2, according to a preferred embodiment of the present invention.

FIG. 5 is a block diagram showing data and error channel paths of the receiver 1 according to a preferred embodiment of the present invention. As shown in FIG. 5, the digital controller 230 includes a data code processor 520, an error channel code processor 530, and a mode controller 540. The mode controller 540 further includes a acquisition controller 545, a lock detector 550, and an error channel controller 555. In addition, the phase of the local signal output from the PFN and timer 205 is delayed by amounts $2\tau$, $0\tau$, and $1\tau$, via the first, second, and third delays 505, 510, and 515, respectively.

The data code processor 520 and the error channel code processor 530 perform a similar function in the digital realm to the data correlator 210 and the error channel correlator 215. Just as the data correlator 210 mixes the incoming signal with the locally-generated signal to obtain a correlation result in the analog realm, the data code processor 520 performs a comparable function in the digital realm. The data code processor 520 simply receives the incoming digital signal and a locally-generated digital signal, and performs a correlation result. The error channel processor 530 correlates the digital error signal with the digital code-word to produce a final error value.

And although the data code processor 520 and the error channel code processor 530 may have the same code word length, they do not necessarily have to be the same. For example, the data code processor 520 can employ a codeword of length 4 while the error channel code processor 530 can employ a codeword of length 1.

These digital code processors 520 and 530 can be eliminated if desired (e.g., the error channel code processor 530 could be eliminated if the code word length were set equal to one), but their presence allows signals to be received with increased reliability by allowing for additional digital correlation. The implementation of these elements would be comparable to the operations performed in the correlator 20, except that they would be implemented in digital logic.

Based on the results from the data and error channel code processors 520 and 530, the mode controller 540 determines which mode the receiver 1 is in, and provides correction signals to improve the acquisition or tracking of the receiver 1. When the receiver 1 is in acquisition mode, the acquisition controller 545 determines whether the signal has been properly acquired. If yes, it changes the receiver to track mode; if no, it awaits the next set of data signals for another acquisition determination.

When the receiver 1 is in track mode, the lock detector 550 determines whether the signal should remain in track mode. If yes, it awaits the next set of data signals for another signal lock determination; if no, it changes the receiver to acquisition mode. In addition, when in track mode, the error channel controller 555 provides a correction value to improve tracking.

The first, second, and third delays 505, 510, and 515, delay the local signal such that the data mixer 310, the first error channel mixer 405, and the second error channel mixer 410 each receive a local signal that is slightly different in phase. This allows the data correlator 210 to receive a locally-generated signal having a phase that is sufficiently close to that of the incoming signal, and the error channel correlator 215 to receive two locally-generated signals having phases that are a set amount before and after the locally-generated signal used by the data correlator 210.

In the embodiment shown in FIG. 5, the phase of the locally-generated signal generated by the PFN and timer 205 is preferably delayed by $2\tau$, $0\tau$, and $1\tau$, via the first, second, and third delays 505, 510, and 515, respectively (where $\tau$ is a set delay amount). However, in alternate embodiments, these delay amounts and positions could be varied. In addition, the delays could be applied to the incoming signal instead of the locally-generated signal.

Figure 6:
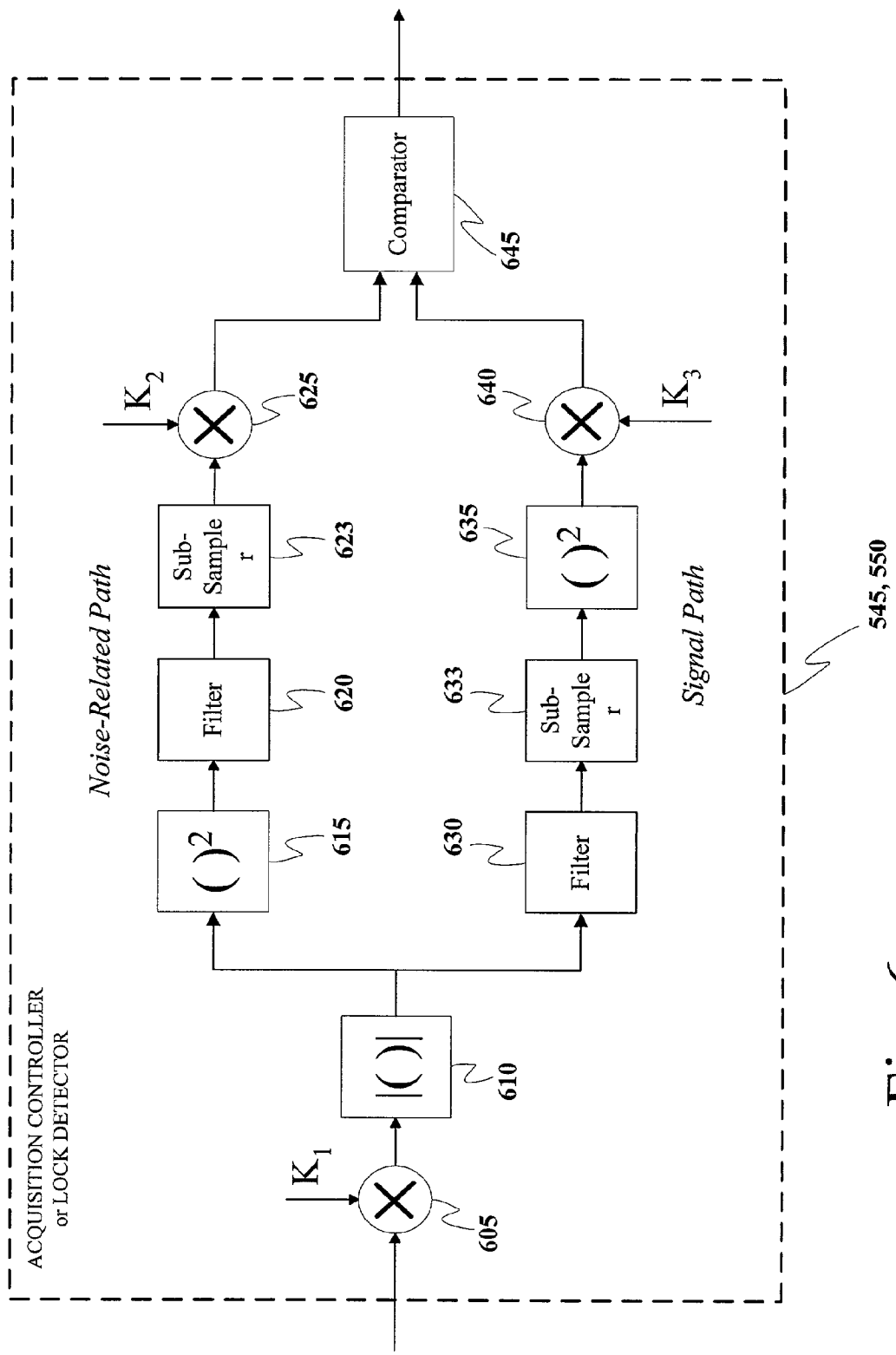
FIG. 6 is a block diagram of the acquisition controller of FIG. 5, according to a preferred embodiment of the present invention.

FIG. 6 is a block diagram of an acquisition controller or a lock detector according to a preferred embodiment of the present invention. As shown in FIG. 6, the acquisition controller 545 or lock detector 550 includes a first scaling mixer 605, an absolute value block 610, a first squarer 615, a noise path filter 620, a noise path sub-sampler 623, a second scaling mixer 625, a signal path filter 630, a signal path sub-sampler 633, a second squarer 635, a third scaling mixer 640, and a comparator 645.

Throughout this description the term "noise path" will occasionally be used. This term refers to a noise-related path that includes a noise component. It is not meant to imply that the path carries only noise. However, for the sake of simplicity, it will sometimes be referred to as a noise path.

As used in this description, the terms "noise path" and "noise-related path" may be used interchangeably.

In this embodiment the first, second, and third scaling mixers 605, 625, and 640 act to scale the amplitude of the signals being processed by the acquisition controller 545 at various points by scaling factors $K_1$, $K_2$, and $K_3$, respectively. In the simplest case, these scaling factors could collectively or individually be equal to 1, in which case the relevant scaling mixer could be eliminated entirely. These scaling factors $K_1$, $K_2$, and $K_3$ may be constant throughout operation, or may be programmable.

By having separate second and third scaling mixers 625 and 640, the system effectively allows for fractional scaling of the second mixer. Thus, even if the second and third scaling factors $K_2$ and $K_3$ are limited to integers, they can be normalized for the third scaling factor $K_3$. This means that the signal path will effectively have a scaling factor of 1, while the noise path has an effective scaling factor of $K_2/K_3$.

While in some preferred embodiments the scaling factors can take any values, in other embodiments some of the scaling factors can be set to be a factor of 2. This allows the associated scaling mixers to be implemented using shift registers, simplifying the design and implementation.

During processing, the absolute value block 610 performs an absolute value function on the signal received from the first scaling mixer 605 to convert all negative values received into their corresponding positive values. This absolute value signal is then provided to a noise path (first squarer 615, noise path filter 620, and second scaling mixer 625), and to a signal path (signal path filter 630, second squarer 635, and third scaling mixer 640).

The noise path first squares the absolute value signal at the first squarer 615, then passes the squared signal through the noise path filter 620 and scales the filtered signal, as necessary, with the second scaling mixer 625. This, combined with the signal path result, produces a noise-based parameter that is an estimate of the noise strength of the incoming signal.

The noise path may include a noise path sub-sampler 623, which periodically samples the output of the noise path filter 620 at a periodic rate, which rate may be varied, e.g., every $4^{th}$ output, every $15^{th}$ output, every $228^{th}$ output, etc. However, if the sampling rate is uniformly set at one, i.e., every result is sampled, the noise path sub-sampler 623 may be omitted entirely.

The signal path first filters the absolute value signal at the signal path filter 630, then squares the filtered signal with the second squarer 635 and scales the squared signal, as necessary, with the third scaling mixer 640. This produces a signal parameter that is an estimate of the signal strength of the incoming signal.

The signal path may include a signal path sub-sampler 633, which periodically samples the output of the signal path filter 630 at a periodic rate, which rate may be varied, e.g., every $4^{th}$ output, every $15^{th}$ output, every $228^{th}$ output, etc. However, if the sampling rate is uniformly set at one, i.e., every result is sampled, the noise path sub-sampler 623 may be omitted entirely. In addition, the sampling rate of the signal path sub-sampler 633 need not be the same as the sampling rate of the noise path sub-sampler 623.

The comparator 645 then compares the noise-based parameter and the signal parameter based on certain threshold criteria to determine if the signal has been properly acquired. Based on this threshold determination, the comparator 645 outputs a mode-controlling parameter that indicates whether the receiver 1 should be in acquisition or track mode. Preferably, if the output signal is above the threshold then the receiver 1 should be in track mode, and if the output signal is below the threshold then the receiver 1 should transition towards an acquisition mode.

Although a comparator 645 is shown in this embodiment, alternate embodiments can employ a more complicated processor to process the signal parameter and the noise-based parameter to generate the mode-controlling parameter. For example, such a processor could perform a non-linear mathematical function on the signal parameter and the noise-based parameter, and use the result of that mathematical function to determine the mode-controlling parameter.

The noise and signal path filters 620 and 630 are preferably chosen to provide the best possible estimates for noise and signal strengths. In the preferred embodiment of the acquisition controller 545, a leaky integrator filter is used as the noise path filter 620 and a two-pole infinite impulse response filter is used as the signal path filter 630. In the preferred embodiment of the lock detector 550, a moving average filter is used as both the noise path filter 620 and the signal path filter 630. However, various other filters can be used as well.

Figure 7A:
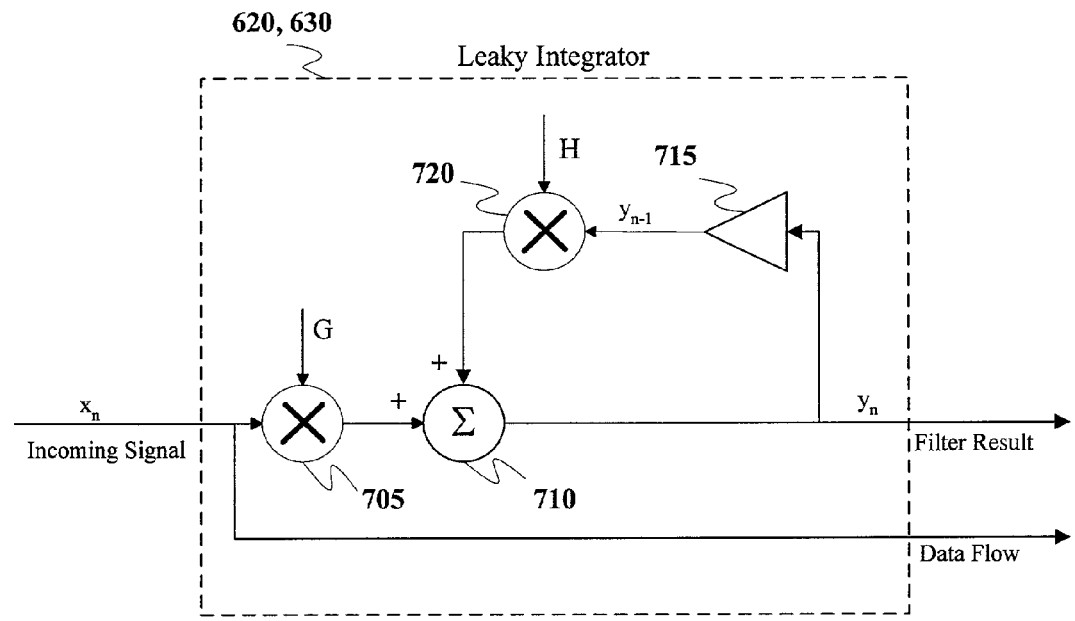
FIG. 7A is a block diagram of a leaky integrator filter, according to a preferred embodiment of the present invention.

FIG. 7A is a block diagram of a leaky integrator filter, according to a preferred embodiment of the present invention. As shown in FIG. 7A, the leaky integrator includes a first mixer 705, a summer 710, a delay 715, and a second mixer 720.

In operation the leaky integrator filter receives the incoming signal at the first mixer 705, where it is scaled with a first scaling factor G. The scaled incoming signal is then sent to the summer 710 where it is added to a feedback signal provided by the second mixer 720. The output of the summer 710 is output as the filter result and is also provided to the delay 715. The output of the delay 715 is then provided to the second mixer 720, where it is scaled according to the second scaling factor H. Thus, the leaky integrator filter operates according to the following equation.

$$y_n = Gx_n + Hy_{n-1} \tag{1}$$

where $x_n$ is the present value of the incoming signal, $y_n$ is the present value of the filter result, $y_{n-1}$ is the previous value of the filter result, and G and H are the first and second scaling factors, respectively.

Preferably the first and second scaling factors G and H are both less than 1 to provide stability to the filter. In a preferred embodiment, the following equalities are true $$G = \alpha \tag{2}$$

$$H = (1-\alpha) \tag{3}$$

where $\alpha$ is a real number less than 1. However, alternate values for the first and second scaling factors G and H may be used.

Figure 7B:
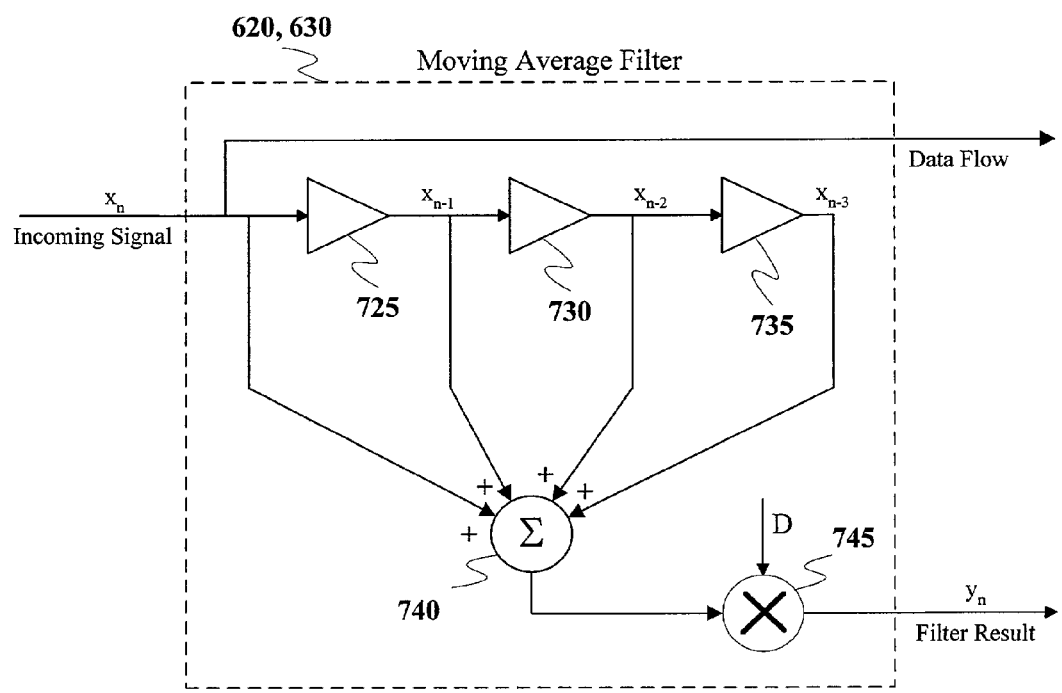
FIG. 7B is a block diagram of a moving average filter, according to a preferred embodiment of the present invention.

FIG. 7B is a block diagram of a moving average filter, according to a preferred embodiment of the present invention. As shown in FIG. 7B, the moving average filter includes first through third delays 725, 730, and 735, a summer 740, and a scaling mixer 745.

In operation the embodiment of the moving average filter of FIG. 7B receives the incoming signal at the first delay 725, and passes the delayed signal through the second and third delays 730 and 735. The incoming signal and the first through third delayed signals output from the first through third delays 725, 730, 735, respectively, are provided as inputs to the summer 740. These four values are added together at the summer 740 and scaled by a scaling factor D in the scaling mixer 745. In this embodiment, the scaling factor is equal to ¼. The moving average filter thus averages the effect of the current value of the incoming signal as well as the three previous values of the incoming signal, as shown in Equation (3).

$$y_n = \frac{x_n + x_{n-1} + x_{n-2} + x_{n-3}}{4} \quad (4)$$

where $y_n$ is the present filter result, $x_n$ is the present value of the incoming signal, and $x_{n-1}$, $x_{n-2}$, and $x_{n-3}$ are the three previous values of the incoming signal.

In this embodiment, four values of the input signal are averaged to obtain the filter result. This number may be increased or decreased in alternate embodiments as desired. Also, while the scaling factor D is equal to ¼ in this embodiment, it could easily be changed to any desirable value, including 1. If (D=1), then the scaling mixer 745 could be omitted.

Figure 7C:
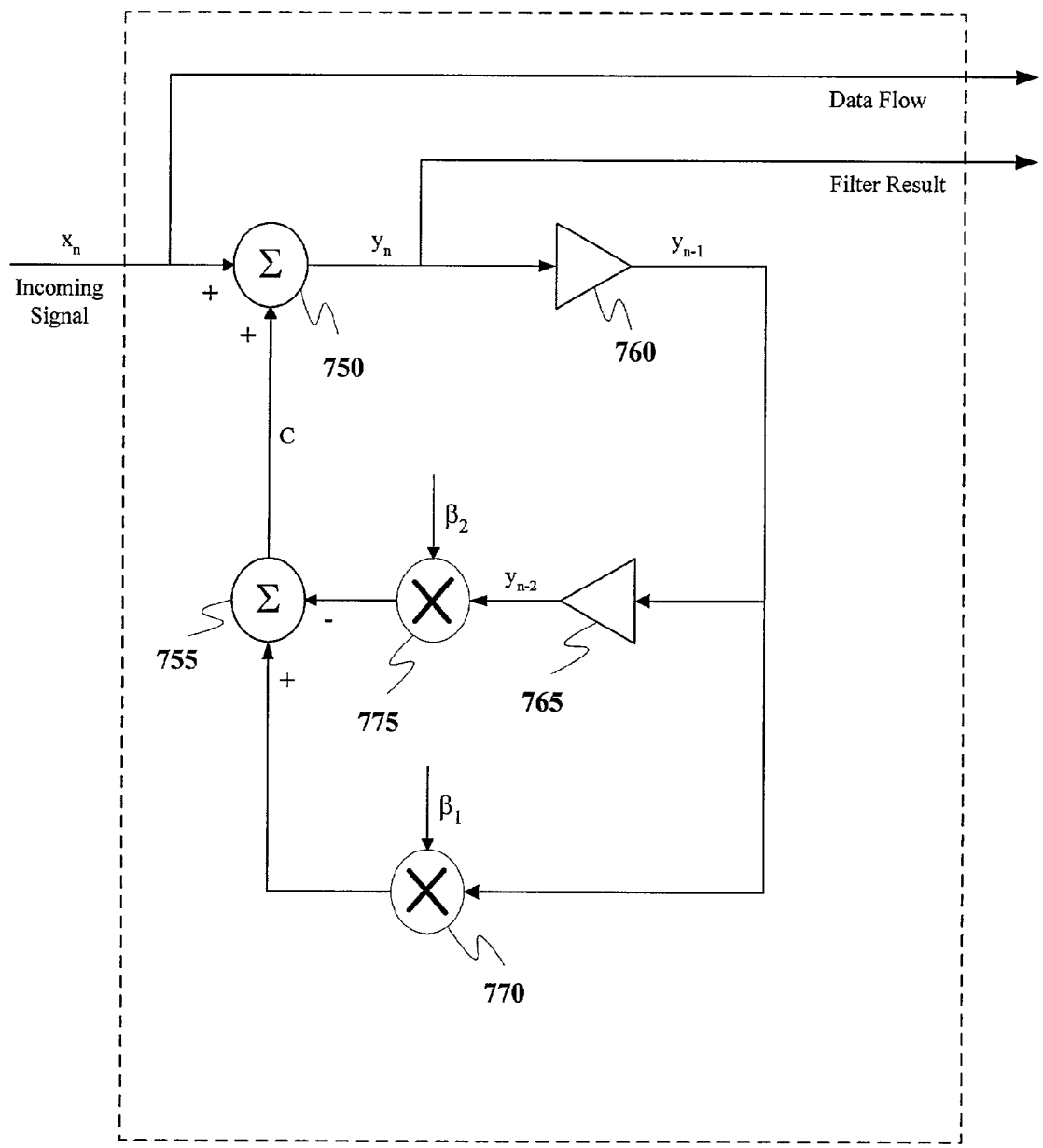
FIG. 7C is a block diagram of a two-pole infinite impulse response filter, according to a preferred embodiment of the present invention.

FIG. 7C is a block diagram of a two-pole infinite impulse response filter, according to a preferred embodiment of the present invention. As shown in FIG. 7C, the infinite impulse response filter includes first and second summers 750 and 755, first and second delays 760 and 765, and first and second mixers 770 and 775.

In operation the infinite impulse response filter receives the present incoming signal $x_n$ at the first summer 750, where it is added to a correction factor C to obtain the present output signal $y_n$. The output signal is then delayed by the first and second delays 760 and 765 to obtain the first and second delayed output signals $Y_{n-1}$ and $Y_{n-2}$, respectively. These values are scaled by the first and second scaling factors $\beta_1$ and $\beta_2$ in the first and second scaling mixers 770 and 775, respectively. The output of the second scaling mixer 775 is then subtracted from the output of the first scaling mixer 770 in the second summer 755 to generate the correction factor C, which is then fed back to the first summer 750. This correction value C can be either positive or negative, depending upon the values of the first and second delayed output signals $Y_{n-1}$ and $Y_{n-2}$, and the first and second scaling factors $\beta_1$ and $\beta_2$. Thus, the infinite impulse response filter operates according to the following equation.

$$y_n = X_n + (\beta_1 y_{n-1} - \beta_2 y_{n-2}) \quad (5)$$

where $x_n$ is the present value of the incoming signal, $y_n$ is the present value of the filter result, $y_{n-1}$ and $y_{n-2}$ are the first and second delayed values of the filter result, and $\beta_1$ and $\beta_2$ are the first and second scaling factors, respectively.

Preferably the output of the second scaling mixer 775 is subtracted from that of the first scaling mixer 770, though that could be reversed in alternate embodiments. Likewise, additional delayed and scaled signals could be provided for calculating the correction factor C.

Figure 7D:
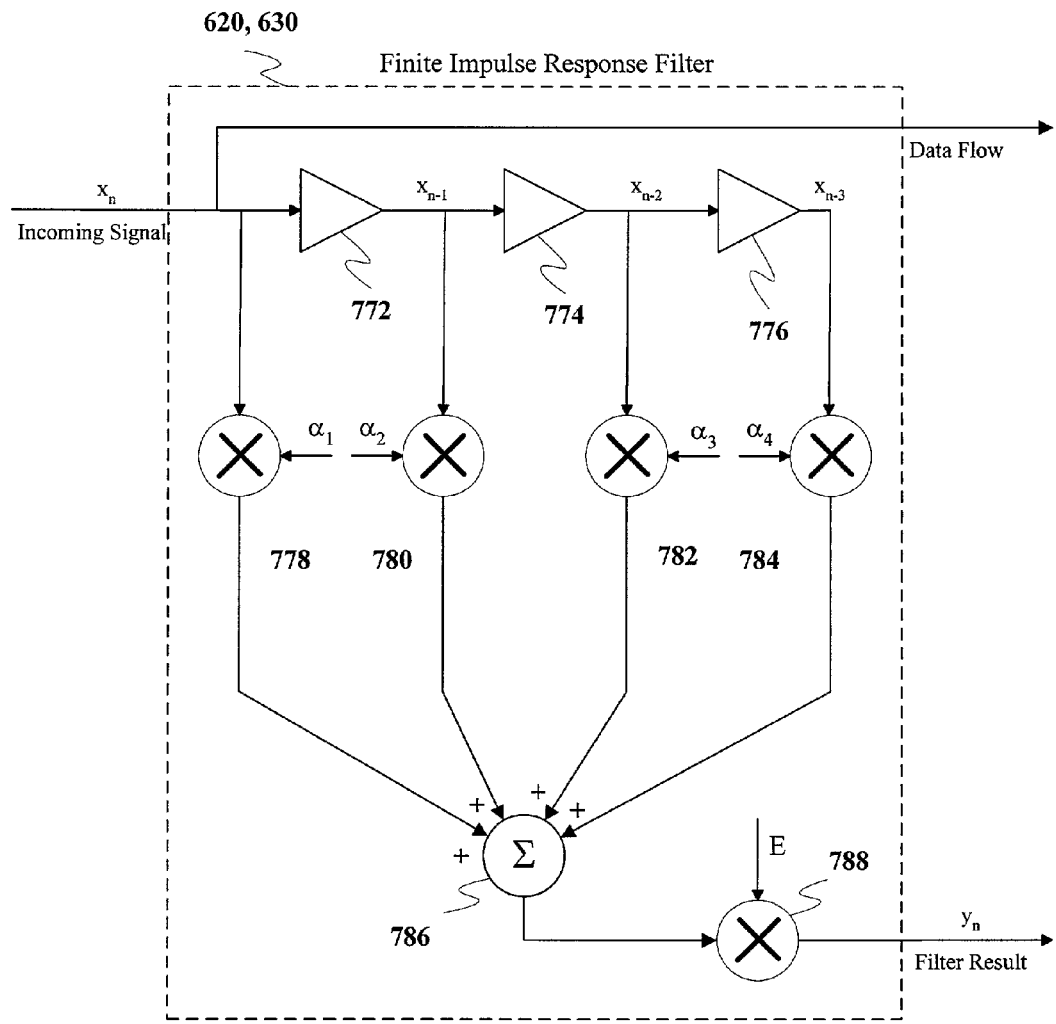
FIG. 7D is a block diagram of a finite impulse response filter, according to a preferred embodiment of the present invention.

FIG. 7D is a block diagram of a finite impulse response (FIR) filter, according to a preferred embodiment of the present invention. As shown in FIG. 7D, the moving average filter includes first through third delays 772, 774, and 776, first through fourth scaling mixers 778, 780, 782, and 784, a summer 786, and a fifth scaling mixer 788.

In operation the embodiment of the FIR filter of FIG. 7D receives the incoming signal at the first delay 772, and passes the delayed signal through the second and third delays 774 and 776. The incoming signal and the first through third delayed signals output from the first through third delays 772, 774, 776, respectively, are provided as inputs to the first through fourth scaling mixers 778, 780, 782, and 784, respectively.

The first through fourth scaling mixers 778, 780, 782, and 784 each scale their respective input signals by first through fourth scaling factors $\alpha_1$, $\alpha_2$, $\alpha_3$, and $\alpha_4$, respectively. The output signals of the first through fourth scaling mixers 778, 780, 782, and 784 are then provided to the summer 786, which adds them together. The sum is then scaled by a fifth scaling factor E in the fifth scaling mixer 788.

In this embodiment, the first through fifth scaling factors $\alpha_1$, $\alpha_2$, $\alpha_3$, $\alpha_4$, and E are preferably chosen to match the preferred input filter response. Equation (6) shows the output equation for $y_n$ when a fifth scaling factor E of ¼ is used:

$$y_n = \frac{\alpha_1 x_n + \alpha_2 x_{n-1} + \alpha_3 x_{n-2} + \alpha_4 x_{n-3}}{4} \quad (6)$$

where $y_n$ is the present filter result, $x_n$ is the present value of the incoming signal, and $X_{n-1}$, $X_{n-2}$, and $X_{n-3}$ are the three previous values of the incoming signal.

In this embodiment, four values of the input signal are scaled and added to obtain the filter result. This number may be increased or decreased in alternate embodiments as desired. Also, the scaling factor E may be any desirable value, including 1. If (E=1), then the fifth scaling mixer 788 could be omitted.

Figure 8:
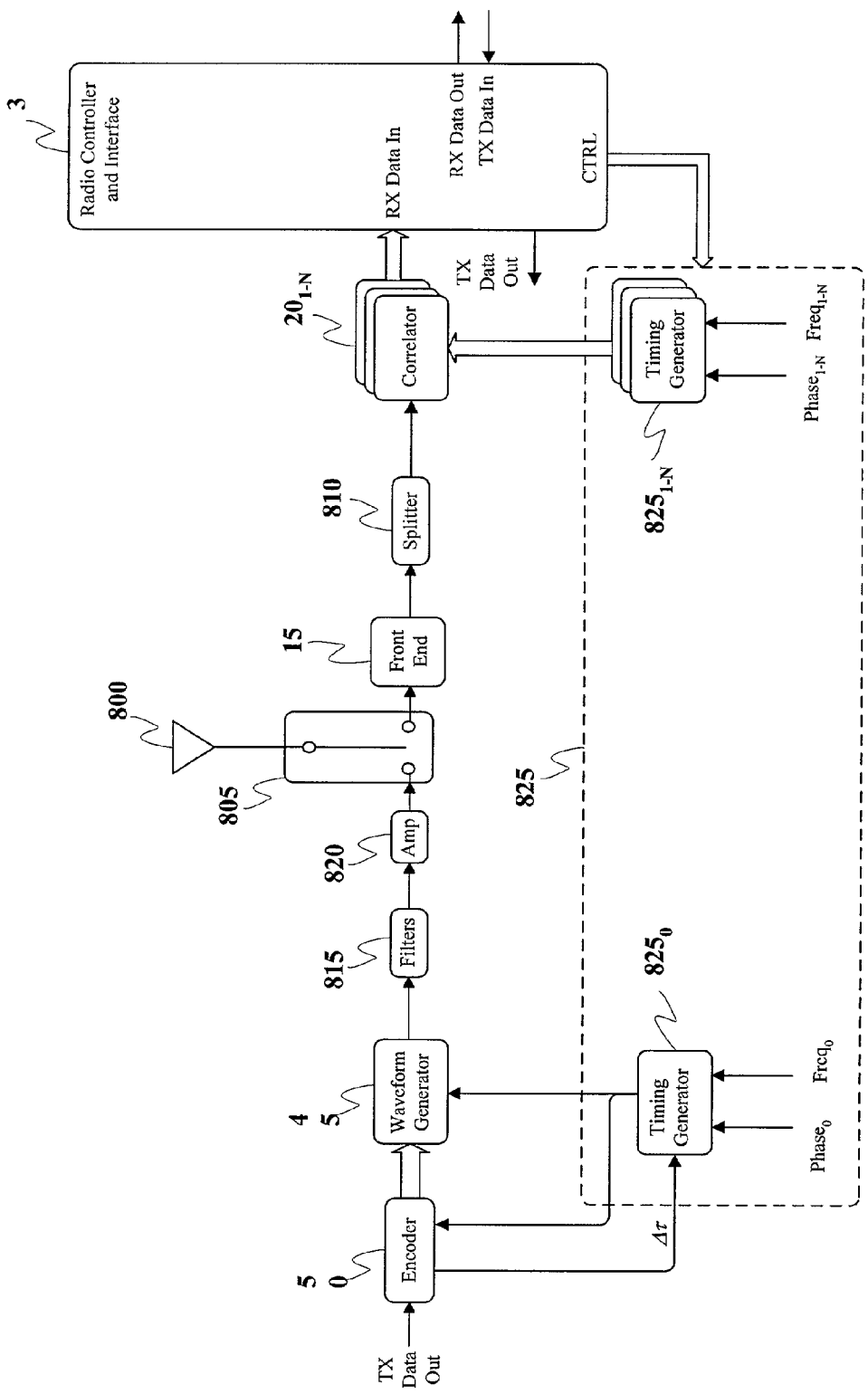
FIG. 8 is a more detailed block diagram of the UWB transceiver of FIG. 1.

FIG. 8 is a more detailed block diagram of the UWB transceiver of FIG. 1. As shown in FIG. 8, the UWB transceiver includes an antenna 800, a transmit/receive (T/R) switch 805, a front end 15, splitter 810, a plurality of correlators $20_1$–$20_N$, a radio controller and interface 3, an encoder 50, a waveform generator 45, a set of filters 815, an amplifier 820, and a timing generator module 825. The timing generator module 825 includes an output timing generator $825_0$, and a plurality of input timing generators $825_1$–$825_N$. This embodiment allows multiple fingers (also called arms) to process the incoming signal at the same time, increasing the speed and efficiency of acquisition and tracking.

The T/R switch 805 connects the antenna 800 to either the amplifier 820 or the front end 15, depending upon whether the transceiver is transmitting or receiving. In alternate embodiments the T/R switch 805 can be eliminated in various ways, including using separate transmitting and receiving antennas.

When receiving energy through the antenna 800, the received energy is coupled in to the T/R switch 805, which passes the energy to a radio front end 15 as an incoming signal. The radio front end 15 filters, extracts noise, and adjusts the amplitude of the incoming signal before providing the same to the splitter 810.

The splitter 810 divides the incoming signal up into N copies of the incoming signal and applies the N incoming signals to different correlators $20_1$–$20_N$. Each of the correlators $20_1$–$20_N$ receives a clock input signal from a respective input timing generator $825_1$–$825_N$ of a timing generator module 825 as shown in FIG. 8. Each of these correlators corresponds to a different finger of the transceiver.

The input timing generators $825_1$–$825_N$ receive a phase and frequency adjustment signal, as shown in FIG. 8, but may also receive a fast modulation signal or other control signals as well. The radio controller and interface 3 may also provide control signals (e.g., phase, frequency and fast modulation signals, etc.) to the timing generator module 825 for time synchronization and modulation control. The fast modulation control signal may be used to implement, for example, chirp waveforms, PPM waveforms, such as fast time scale PPM waveforms, etc.

Although not shown, the radio controller and interface 3 also provides control signals to, for example, the encoder 50, the waveform generator 45, the filter set 815, the amplifier 820, the T/R switch 805, the front end 15, the correlators $20_1$–$20_N$ (corresponding to the UWB waveform correlator 20 of FIG. 1), etc., for controlling, for example, amplifier gains, signal waveforms, filter passbands and notch functions, alternative demodulation and detecting processes, user codes, spreading codes, cover codes, etc.

During signal acquisition, the radio controller and interface 3 adjusts the phase input of the input timing generator $825_1$, in an attempt for the correlator $20_1$ to identify and the match the timing of the signal produced at the receiver with the timing of the arriving signal. When the received signal and the locally generated signal coincide in time with one another, the radio controller and interface 3 senses the high signal strength or high SNR and begins to track, so that the receiver is synchronized with the received signal.

Once synchronized, the receiver will operate in a track mode, where the input timing generator $825_1$ is adjusted by way of a continuing series of phase adjustments to counteract any differences in timing of the input timing generator $825_1$ and the incoming signal. However, a feature of the present invention is that by sensing the mean of the phase adjustments over a known period of time, the radio controller and interface 3 adjusts the frequency of the input timing generator $825_1$ so that the mean of the phase adjustments becomes zero.

The frequency is adjusted in this instance because it is clear from the pattern of phase adjustments that there is a frequency offset between the input timing generator $825_1$ and the clocking of the received signal. Similar operations may be performed on input timing generators $825_2$–$825_N$, so that each finger of the receiver can recover the signal delayed by different amounts, such as the delays caused by multipath (i.e., scattering along different paths via reflecting off of local objects).

A feature of the transceiver in FIG. 8 is that it includes a plurality of tracking correlators $20_1$–$20_N$. By providing a plurality of correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 3 receives the information from the different correlators $20_1$–$20_N$ and decodes the data. The radio controller and interface 3 also provides control signals for controlling the front end 15, e.g., such as gain, filter selection, filter adaptation, etc., and adjusting the synchronization and tracking operations by way of the timing generator module 825.

In addition, the radio controller and interface 3 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 8, an output timing generator $825_O$ also receives phase, frequency and/or fast modulation adjustment signals for use in encoding a UWB waveform from the radio controller and interface 3. Data and user codes (via a control signal) are provided to the encoder 50, which in the case of an embodiment of the present invention using time-modulation, passes command signals (e.g., Δt) to the output timing generator $825_O$ for providing the time at which to send a pulse. In this way, encoding of the data into the transmitted waveform may be performed.

When the shape of the different pulses are modulated according to the data and/or codes, the encoder 50 produces the command signals as a way to select different shapes for generating particular waveforms in the waveform generator 45. For example, the data may be grouped in multiple data bits per channel symbol. The waveform generator 45 then produces the requested waveform at a particular time as indicated by the timing generator $825_O$. The output of the waveform generator is then filtered in the filter set 815 and amplified in the amplifier 820 before being transmitted via antenna 800 by way of the T/R switch 805.

In another embodiment of the present invention, the transmit power is low enough that the transmitter and receiver are simply alternately powered down while the other operates without need for the T/R switch 805. Also, in some embodiments of the present invention, neither the filter set 815 nor the amplifier 820 are needed, because the desired power level and spectrum are directly useable from the waveform generator 45. In addition, the filter set 815 and the amplifier 820 may be included in the waveform generator 45 depending on the implementation of the present invention.

A feature of the UWB communications system disclosed, is that a transmitted waveform can be made to have a nearly continuous power flow, for example, by using a high chipping rate, where individual wavelets in the waveform are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 800 such that the amplifier 820 is not required. In this way, the entire radio can be integrated on a single monolithic integrated circuit.

Under certain operating conditions, the system can be operated without the filter set 815. If, however, the system is to be operated, for example, with another radio system, the filter set 815 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Transceiver Signals

Figure 9:
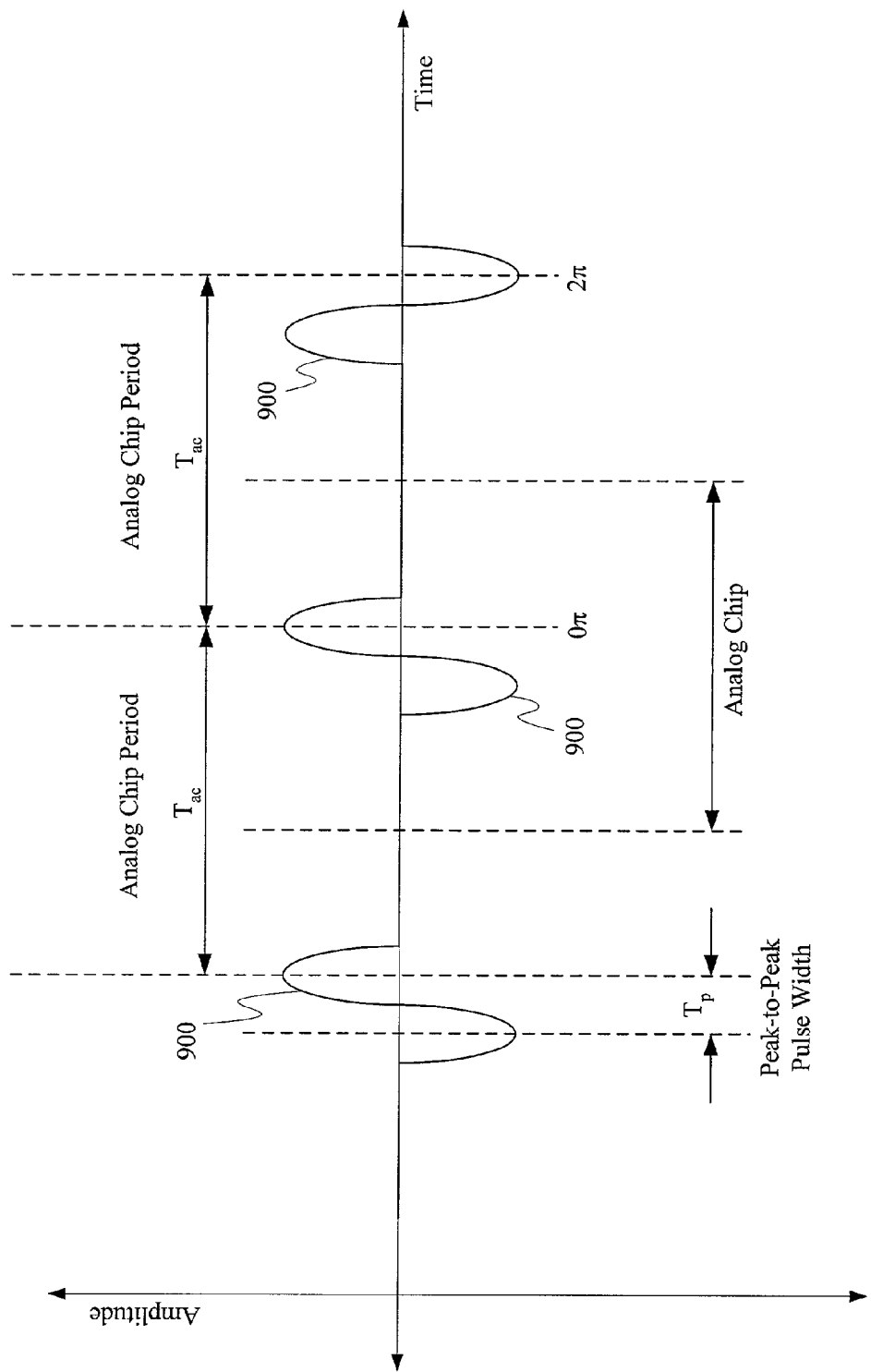
FIG. 9 is a timing diagram of a stream of bi-phase monopulses in accordance with a preferred embodiment of the present invention.
Figure 10B:
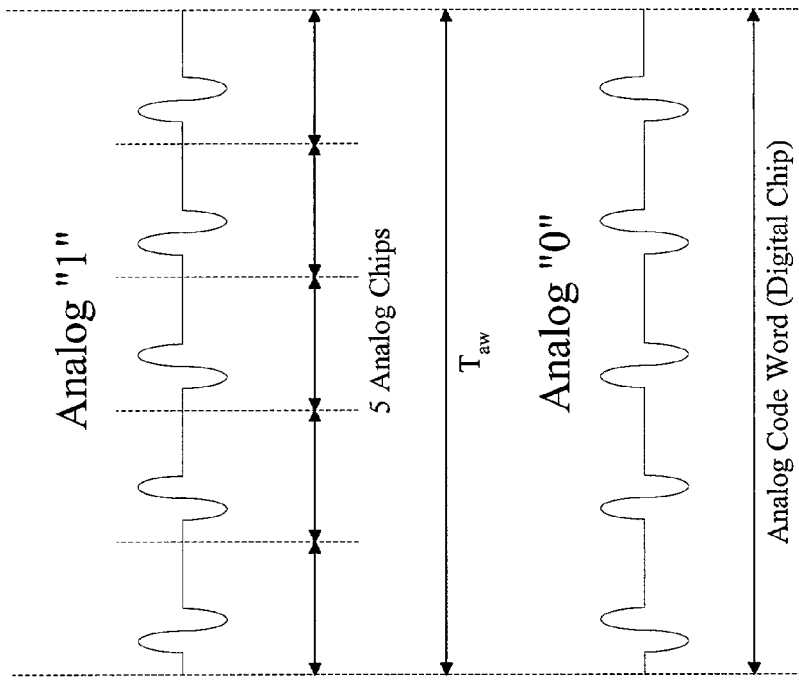
FIG. 10B is a timing diagram showing a five-chip analog code word according to a preferred embodiment of the present invention.
Figure 10A:
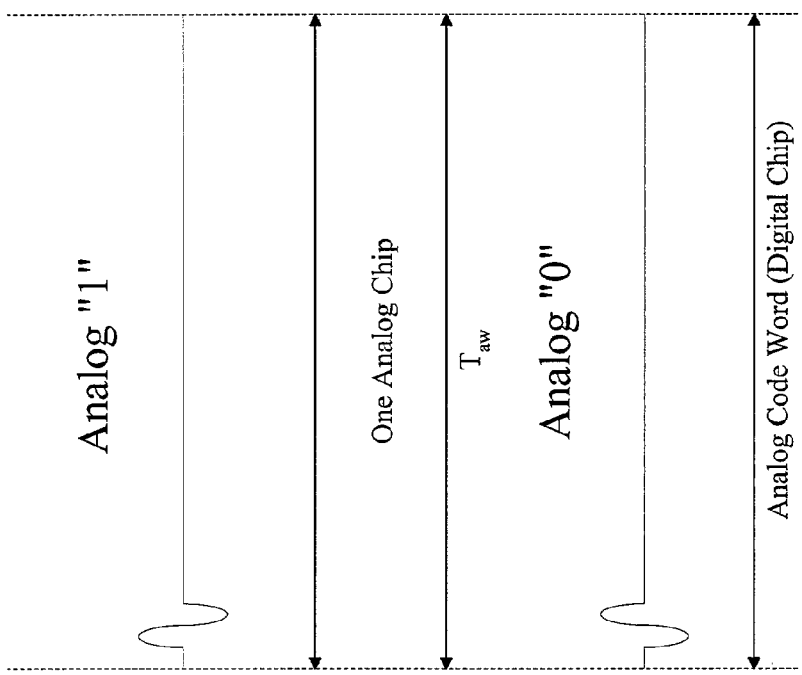
FIG. 10A is a timing diagram showing a one-chip analog code word according to a preferred embodiment of the present invention.
Figure 11:
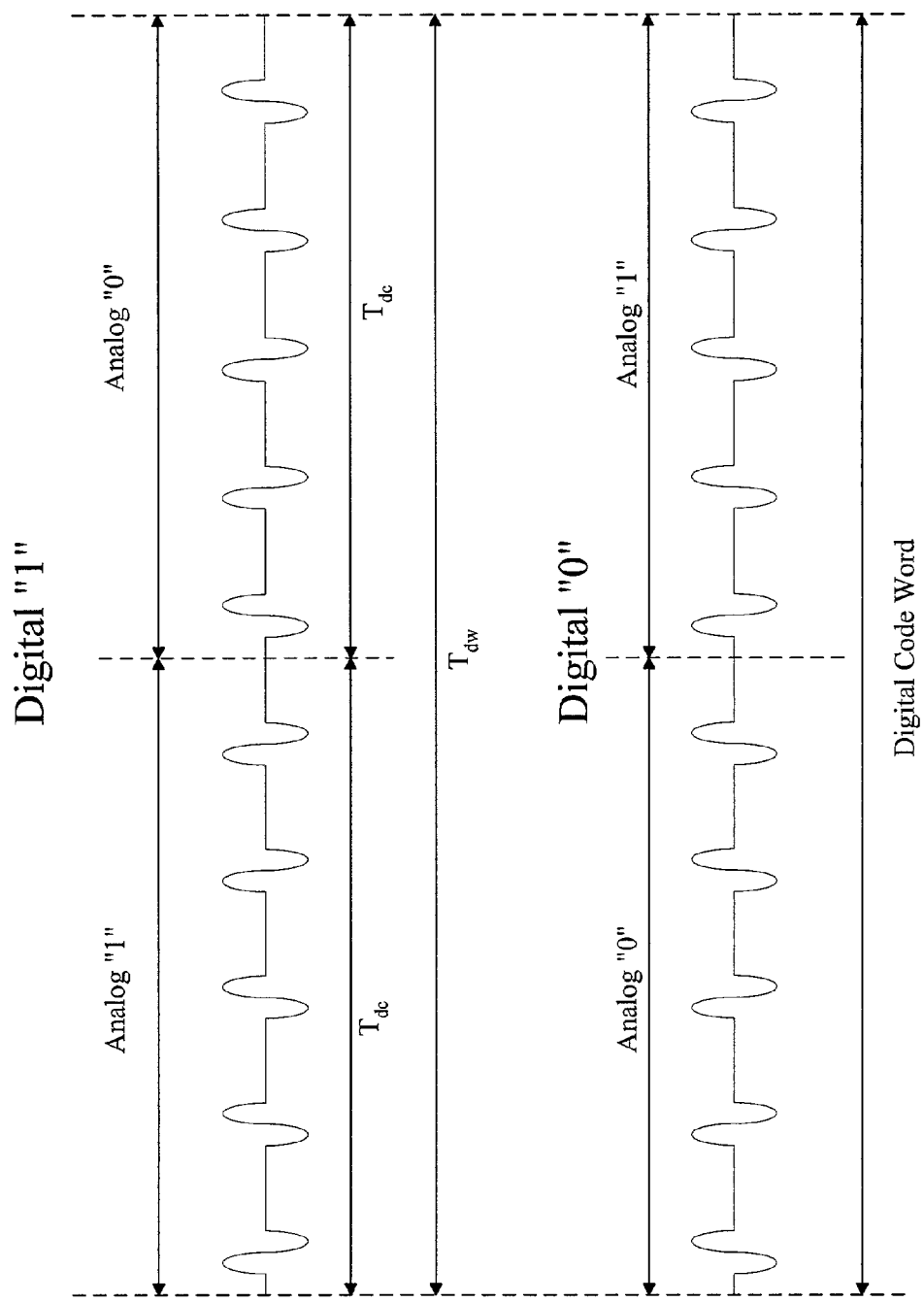
FIG. 11 is a timing diagram showing a two-chip digital code word according to a preferred embodiment of the present invention.

The operation of a preferred embodiment of the transceiver described above will now be described with respect to FIGS. 9–14. In this embodiment the transceiver uses bi-phase monopulses for the transfer of information. FIGS. 9–11 are timing diagrams showing various arrangements of transmitted signals; FIGS. 12A–14C are timing diagrams showing the operation of the error channel; and FIG. 15 is timing diagram showing an incoming signal and a correlation signal for actual operation of a preferred embodiment of the present invention.

Bi-phase Monopulses

FIG. 9 is a timing diagram of a stream of bi-phase monopulses in accordance with a preferred embodiment of the present invention. As shown in FIG. 9, each bi-phase monopulse 900 is a signal having a positive peak and a negative peak formed adjacent to each other. The monopulses can be reversed in polarity as needed, and it is this difference in polarity that is used to carry information.

In accordance with preferred embodiments of the present invention, data signals using monopulses transmit information bits at the lowest level through analog chips. Each analog chip has a set analog chip period $T_{ac}$, indicating the duration of the chip, and a corresponding analog chip frequency $F_{ac}$ (or analog chip rate), and contains a single monopulse that represents a bit or partial bit of information.

Unfortunately, because of the nature of the monopulses, it is very difficult to accurately measure the width of a monopulse. However, it is comparatively easy to measure the peak-to-peak pulse width $T_p$ of the monopulses. Therefore, in a practical sense, it is necessary to set a relationship between the analog chip period $T_{ac}$ and the peak-to-peak pulse width of the monopulses $T_p$ such that the peak-to-peak pulse width $T_p$ is set to be lower than the analog chip period $T_{ac}$, i.e.:

$$T_p < T_{ac} \qquad (7)$$

In the preferred embodiment $T_p$ is approximately one-ninth the value of $T_{ac}$.

The analog chip period $T_{ac}$ is measured as the time between corresponding peaks on adjacent monopulses 900. The actual start and end points of the analog chip can be chosen as desired, provided that they do not overlap the time interval of the monopulse 900. FIG. 9 shows an embodiment where the analog chip is defined as having approximately equal portions of dead space before and after the monopulse 900. However, in alternate embodiments, the placement of the start and end points of the analog chip can be varied. In one preferred embodiment, the peak-to-peak pulse width $T_p$ is about 80 ps, while the analog chip period $T_{ac}$ is about 770 ps.

Analog Code Words

Individual analog chips are ordered together into analog code words to transfer data at a given data rate, with each analog code word corresponding to a bit or a partial bit of information to be transferred. The analog code words have an analog code word period $T_{aw}$, indicating the duration of an analog code word, and a related analog code word frequency $F_{aw}$. This may correspond to the data rate, though it does not have to. FIGS. 10A and 10B show two examples of analog code words.

FIG. 10A is a timing diagram showing a one-chip analog code word according to a preferred embodiment of the present invention. This simplest example has an analog code word that includes a single analog chip. In this case the analog code word period $T_{aw}$ and the analog chip period $T_{ac}$ are the same (i.e., the analog chips and the analog code words are transmitted at the same frequency). As shown in FIG. 10A, one particular orientation of the analog chip corresponds to an analog "1," and the other orientation of the analog chip corresponds to an analog "0." This could be reversed for alternate embodiments.

FIG. 10B is a timing diagram showing a five-chip analog code word according to a preferred embodiment of the present invention. This embodiment has an analog code word that includes five analog chips. In this case the analog code word period is five times the analog chip period (i.e., the analog code words are transmitted at one-fifth the frequency of the analog chips).

In other words:

$$T_{aw} = n * T_{ac} \qquad (8)$$

for an n-chip analog code word. Thus, the analog chip period $T_{ac}$ and number of analog chips per analog code word n determine the period of the analog code word $T_{aw}$.

As shown in FIG. 10B, a particular orientation of the five analog chips corresponds to an analog "1," and the inverse of this orientation corresponds to an analog "0." The particular choice of chip orientation and arrangement within the analog code word is not critical, and can be varied as necessary. What is important is that the analog "1" and analog "0" code words are the inverse of each other.

One preferred embodiment includes 13 analog chips per analog code word, and sets the analog chip frequency at 1.3 GHz (770 ps analog chip period). This results in an analog code word frequency of 100 MHz (10 ns analog code word period), which corresponds to an analog data transfer rate of 100 Mbits of information per second.

The various parameters of peak-to-peak pulse width $T_p$, analog chip period $T_{ac}$, analog chip frequency $F_{ac}$, number of analog chips per analog code word n, analog code word period $T_{aw}$, and analog code word frequency $T_{aw}$ can be varied as necessary to achieve the desired performance characteristics for the transceiver. For example, the embodiments disclosed in FIGS. 10A and 10B have the same analog code word period $T_{aw}$, despite the differing number of analog chips n. This means that the transmission power for a given analog code word period $T_{aw}$ is used in a single monopulse in the embodiment of FIG. 10A, but is spread out over five monopulses in the embodiment of FIG. 10B. Alternate embodiments can obviously change these parameters as needed.

Digital Code Words

Analog code words may be combined into digital code words, which carry the signal data transmitted or received by the transceiver. In this case the analog code words are used as digital chips to create the digital code words. Each digital chip thus has a digital chip period $T_{dc}$ that is equal to the analog code word period $T_{aw}$, and a digital chip frequency $F_{dw}$ that is equal to the analog code word frequency $F_{aw}$. In other words:

$$T_{dc} = T_{aw} \qquad (9)$$

$$F_{dc} = F_{aw} \qquad (10)$$

The number of digital chips (i.e., analog code words) m used to make a digital code word is determined by balancing the need for speed and reliability of transmission. In its simplest form, a digital code word can include a single digital chip (m=1), and so can transmit at the analog code word frequency. As the size of the digital code word increases, the reliability of transmission increases for a given range and average transmission power, but the actual data transmission speed is reduced. FIGS. 11 shows an example of a digital code word.

FIG. 11 is a timing diagram showing a two-chip digital code word according to a preferred embodiment of the present invention. This embodiment has a digital code word that includes two analog chips (m=2). In this case the digital code word period $T_{dw}$ is twice the digital chip period (i.e., the digital code words are transmitted at half the frequency of the digital chips). In other words:

$$T_{dw}=m*T_{dc} \quad (11)$$

As shown in FIG. 11, one particular arrangement of two digital chips corresponds to a digital "1," and the inverse of this orientation corresponds to a digital "0." However, the particular choice and arrangement of digital chips within the digital code word is not critical and can be varied as necessary. While there is a certain advantage in decoding if inverses are used, that is not necessary. For example, a digital "1"could be made up of an analog "11," while a digital "0" is made up of an analog "01."

In addition, as the number of digital chips per digital code word increases above 1, it becomes possible to encode more than a binary information bit per digital code word. Rather than simply encoding a "0" or "1," the binary code word could encode a "0," "1," "2," or "3," or any other level of encoding allowed by the number of digital chips per digital code word. (Note: the same is true of analog code words.)

One advantage of using digital code words in addition to analog code words is that the size of digital code words can be easily changed during operation. The number of analog chips per analog code word is often fixed during the design, but the number of digital chips per digital code word can be changed as needed during operation. This could be done, for example, to vary the desired reliability of transmission. Thus, the transceiver can operate at a maximum data transmission rate equal to the analog transmission rate, or it could operate at a reduced transmission rate, but at greater reliability.

One preferred embodiment sets the analog code word frequency $F_{aw}$ to 100 MHz (10 ns analog code word period $T_{aw}$), which corresponds to an analog data transfer rate of 100 Mbits of information per second. If the size of the digital code word m is set to 1, then the digital code word is transmitted at a digital code word $F_{dw}$ frequency of 100 MHz, corresponding to a digital data transfer rate of 100 Mbits per second. However, if the size of the digital code word m is set to 2, then the digital code word $F_{dw}$ is transmitted at a digital code word frequency of 50 MHz (half the analog code word frequency), corresponding to a digital data transfer rate of 50 Mbits per second. A corresponding reduction in digital code word frequency and digital data transfer rate will occur as the digital code word size increases. Ultimately, the size of the digital code word can be varied as shown above until a desired balance of data rate and reliability is obtained.

Most importantly, this digital code word length can be varied for different transmissions. If the level of interference is low and fewer errors are expected, a low digital code word length m can be chosen to maximize data transfer speed. However, if a great deal of interference is expected, then a higher digital code word length m can be chosen, with a resulting lower data transfer speed.

Signal Acquisition and Tracking

Figure 12A:
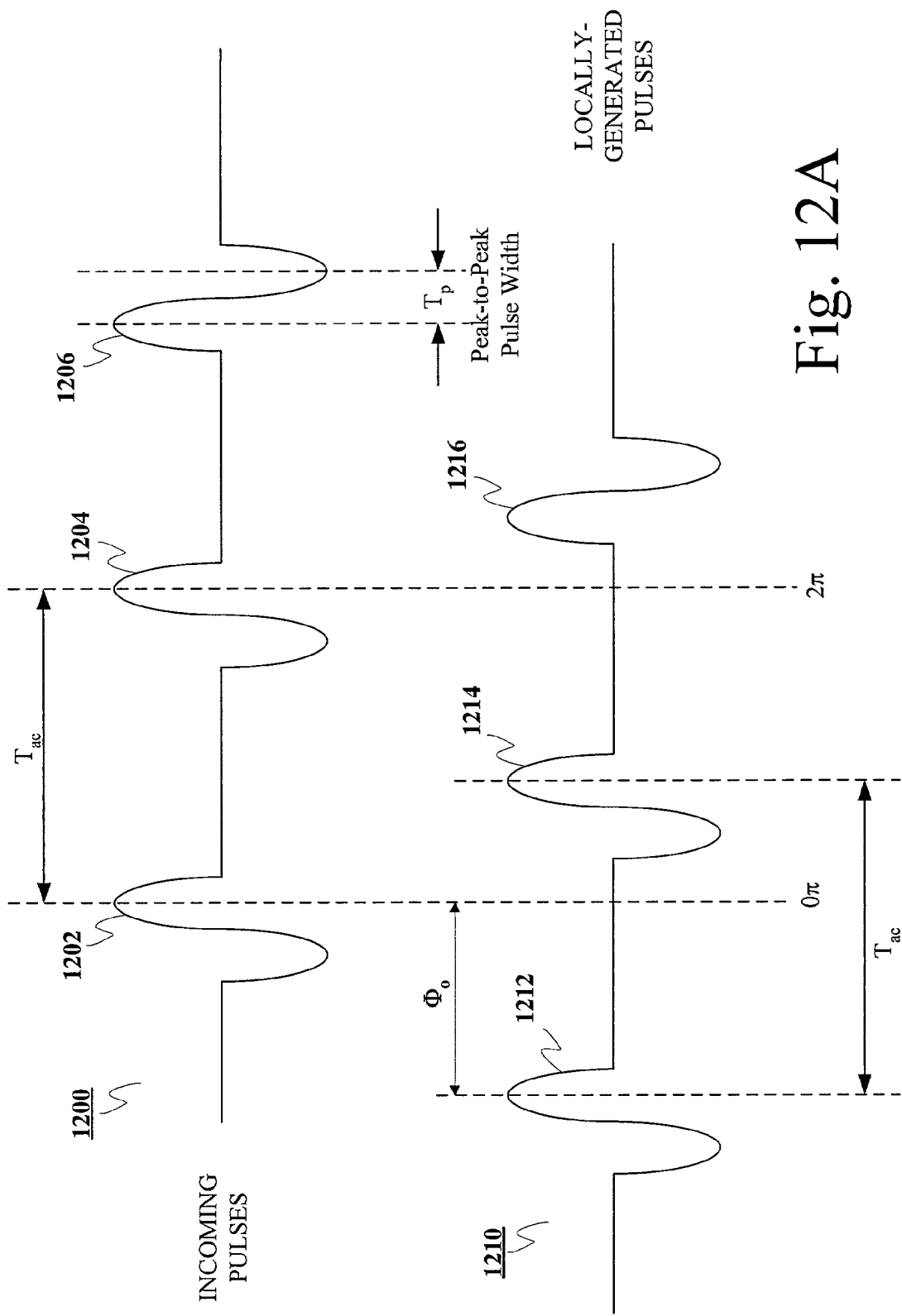
FIG. 12A is a timing diagram showing an incoming signal and a locally-generated signal in a UWB transceiver.
Figure 12B:
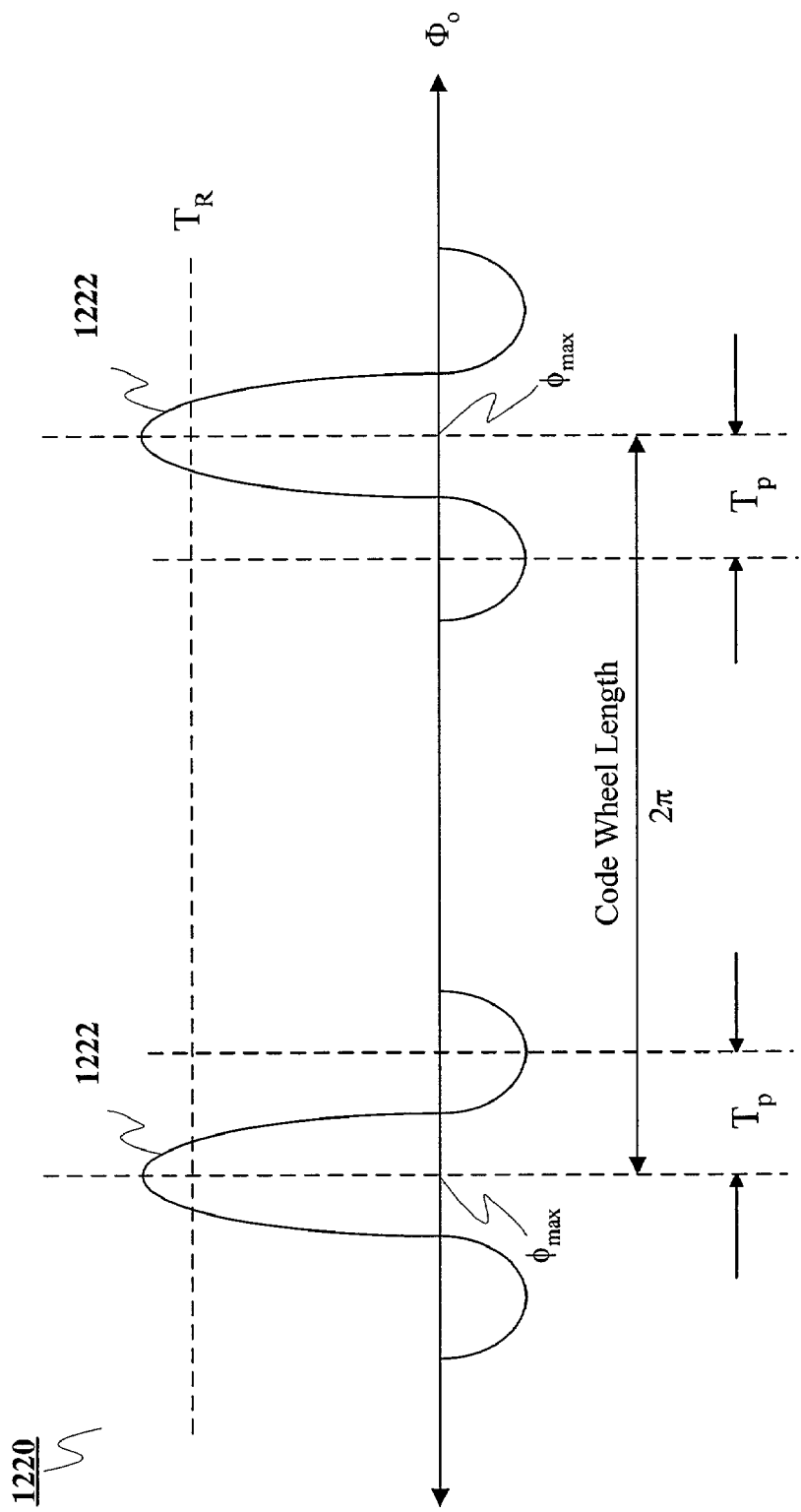
FIG. 12B is a timing diagram showing a correlation result comparing the incoming signal and the locally-generated signal of FIG. 12A.

The acquisition and track operations will now be described with respect to FIGS. 12A to 14. FIG. 12A and 12B are timing diagrams showing the correlation result of an incoming bi-phase monopulse signal and a locally-generated bi-phase monopulse signal according to the phase difference between the two signals. In particular, FIG. 12A is a timing diagram showing an incoming signal and a locally-generated signal in a UWB transceiver; and FIG. 12B is a timing diagram showing a correlation result comparing the incoming signal and the locally-generated signal of FIG. 12A.

As shown in FIG. 12A, an incoming signal 1200 including incoming pulses 1202, 1204, and 1206 arrives at some fixed clock interval called $T_{ac}$ (i.e., the analog chip period). A locally-generated signal 1210 including local pulses 1212, 1214, and 1216 is then formed similar to the incoming pulses, but at an unknown phase offset $\Phi_o$ with respect to the incoming signal. These two signals are then compared to each other to obtain a correlation result that indicates how close the two are in phase.

In the preferred embodiments disclosed in FIGS. 1–8, the incoming signal 1200 arrives at the antenna 10 and passes through the front end 15 to arrive at the acquisition correlator 210. The locally-generated signal 1210 is formed at the PFN and timer 205 based on a signal received from the timing generator 25. The incoming signal 1200 and the locally-generated signal 1210 are then multiplied in the data mixer 310 (an acquisition mixer) and integrated in the data integrator 315 (an acquisition integrator) to obtain the correlation result, which is used in the acquisition mode. The incoming signal 1200 and the locally-generated signal 1210 are multiplied at two delayed times in the first and second error channel mixers 405 and 410 (tracking mixers), and the results are used to obtain an error channel (or error signal) that can be used to determine the phase difference $\Phi_o$ between the incoming signal and the locally-generated signal when the incoming signal and the locally-generated signal are close in phase. This error channel is used during the track mode.

FIG. 12B shows a simplified version of the correlation result 1220 of the incoming signal with the locally generated pulses output from the acquisition integrator 315 as a function of time (or phase, since the phase is scanned). This result is passed through the first A/D converter 220 to the digital controller 230, which uses the result to determine the degree of correlation.

There is maximum correlation at the acquisition correlator 210 when the incoming signal 1200 and the locally-generated signal 1210 are perfectly phase aligned. Initially, it is not known whether the two signals are aligned (synchronized) with each other. Thus, the local pulses 1212, 1214, 1216 created in the PFN and timer 205 may be positioned between the incoming pulses 1202, 1204, 1206 of the incoming signal 1200 as shown in FIG. 12A.

In this case of mis-aligned phase, the magnitude of the output of the acquisition correlator 210 is small, which means that the signals have a small correlation result. To maximize correlation, the phase of the phase controller 325 attached to the PFN and timer 205 is varied under control of the digital controller 230 until the locally-generated signal 1210 is in phase with the incoming signal 1200 at the acquisition correlator 210.

If the output from the acquisition correlator 210 does not have a signal-to-noise ratio (SNR) exceeding a given threshold value $T_R$, then digital controller 230 sends a signal to the phase controller 325 to adjust the phase of the locally-generated signal 1210. As such, the local pulses 1212, 1214, 1216 slide in phase until they are aligned (synchronized) with the incoming pulse train at the acquisition correlator 210 and hence maximum correlation is achieved.

FIG. 12B shows the correlation result 1220 of the incoming signal with the locally generated pulses at the acquisition correlator 210 as a function of time (or phase, since the phase is scanned). In effect, the magnitude of the output of the correlator 210 is a function of the phase difference $\Phi_o$ between the incoming signal and the locally-generated signal.

An SNR threshold $T_R$ is set that is used to identify specific portions of the correlation function that are at a desired level of correlation. The correlation result 1220 is examined over a given time (or phase) until the portions of the correlation above the exemplary SNR threshold $T_R$ are found. At phases where the correlation is above exemplary SNR threshold $T_R$, the receiver can be considered synchronized to the incoming signal.

For clarity of illustration, it is assumed in FIG. 12B that the incoming data stream 1200 consists of all the same orientation of monopulse. However, bi-phase modulated data would not affect the discussion. Also, FIG. 12B shows only the correlation signal with no additive noise.

As can be seen at point 1222, when the signals are perfectly phase aligned, the correlation is at a maximum. Furthermore, point 1222 along with neighboring portions of the correlation is above the magnitude threshold $T_R$. The threshold $T_R$ can be changed as need to achieve the desired level of correlation. In fact, the threshold $T_R$ can be modified during operation as a higher or lower level of correlation is needed.

Figure 13:
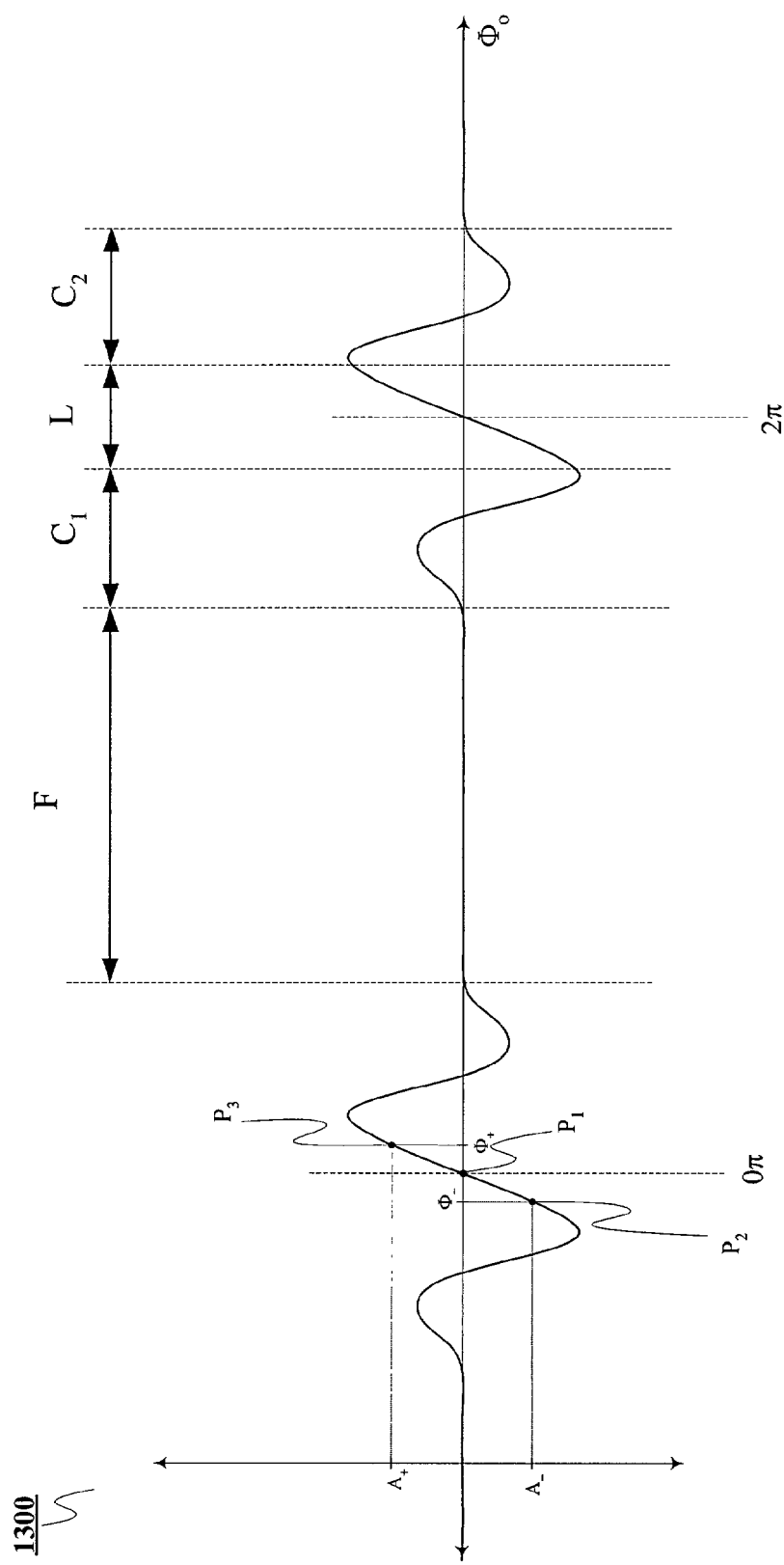
FIG. 13 is a timing diagram of an error channel indicating the phase difference between the incoming signal and the locally-generated signal when the incoming signal and the locally-generated signal are close in phase.

FIG. 13 is a simplified timing diagram showing the amplitude of the error signal as a function of the phase difference $\Phi_o$ between the incoming signal and the locally-generated signal. As shown in FIG. 13, an error channel 1300 is a signal that has a relatively flat region F where the incoming signal and the locally-generated signal are very different in phase, two curved regions $C_1$ and $C_2$ where the incoming signal and the locally-generated signal are somewhat close in phase, and an approximately linear region L where the incoming signal and the locally-generated signal are very close in phase.

In the embodiment disclosed in FIGS. 1 to 5, the error channel corresponds to the output of the tracking correlator 215. The tracking correlator mixes the incoming signal with the locally generated signal at a phase a set amount before the acquired phase and a set amount after the acquired phase.

If the error channel 1300 is in the linear region L, then its magnitude is proportional to the phase difference between the incoming signal and the locally-generated signal. Once it leaves the linear region L, then the error channel 1300 becomes a poor estimate for phase difference.

As shown in FIG. 13, if the amplitude of the calculated difference between the early tracking signal and the late tracking signal is zero, then the phase difference between the incoming signal and the locally-generated signal is zero and no correction need be performed (point $P_1$ on the error channel). If the amplitude of the calculated difference between the early tracking signal and the late tracking signal is a positive value $A_+$, then the phase of locally-generated signal is off from that of the incoming signal by an amount $\Phi_+$ in a given direction (point $P_3$ on the error channel). If the amplitude of the calculated difference between the early tracking signal and the late tracking signal is a negative value $A_-$, then the phase of locally-generated signal is off from that of the incoming signal by an amount $\Phi_-$ in the opposite direction (point $P_2$ on the error channel).

The exact shape of the error curve, and how the phase difference is determined will depend upon the implementation of the tracking correlator 215.

Figure 14A:
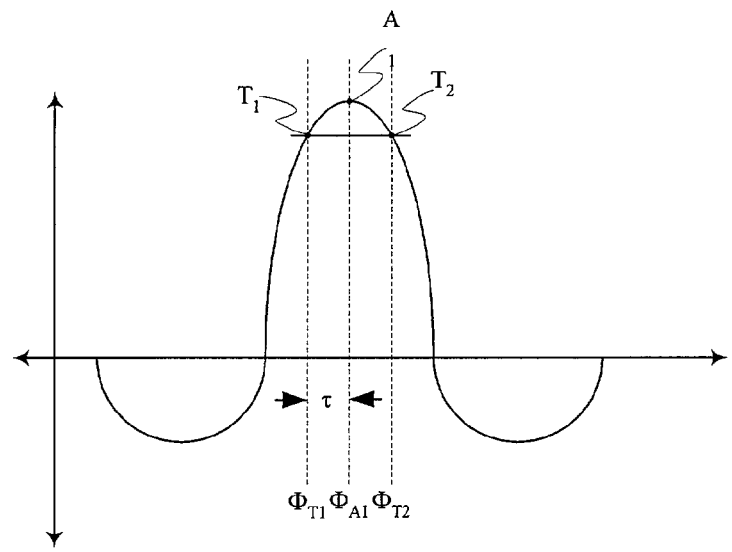
FIGS. 14A to 14C are timing diagrams showing the operation of the track mode with respect to the correlation curve of FIG. 12B.
Figure 14B:
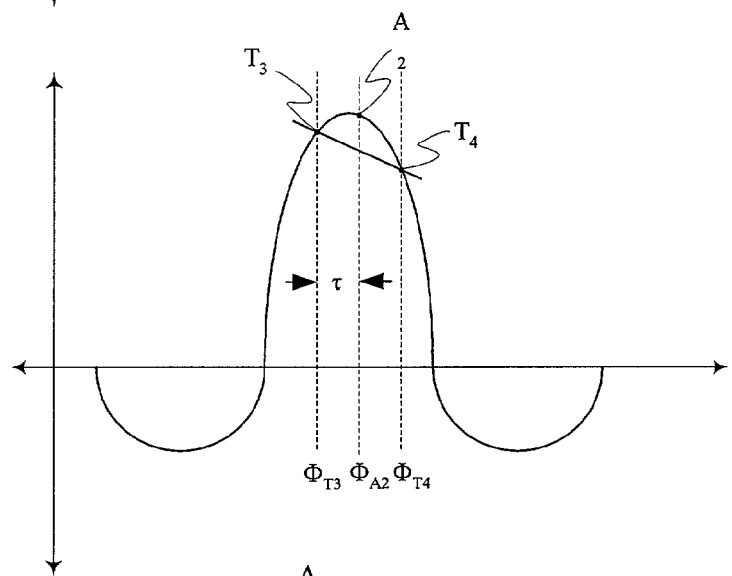
Figure 14C:
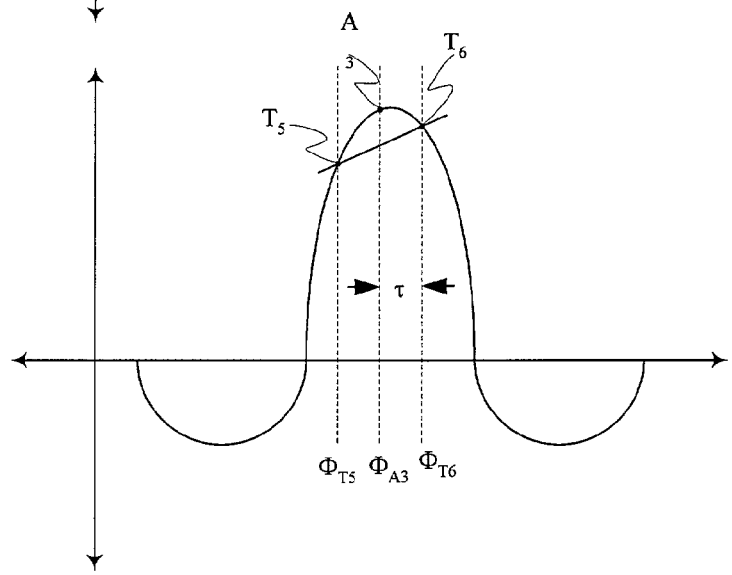
Figure 15:
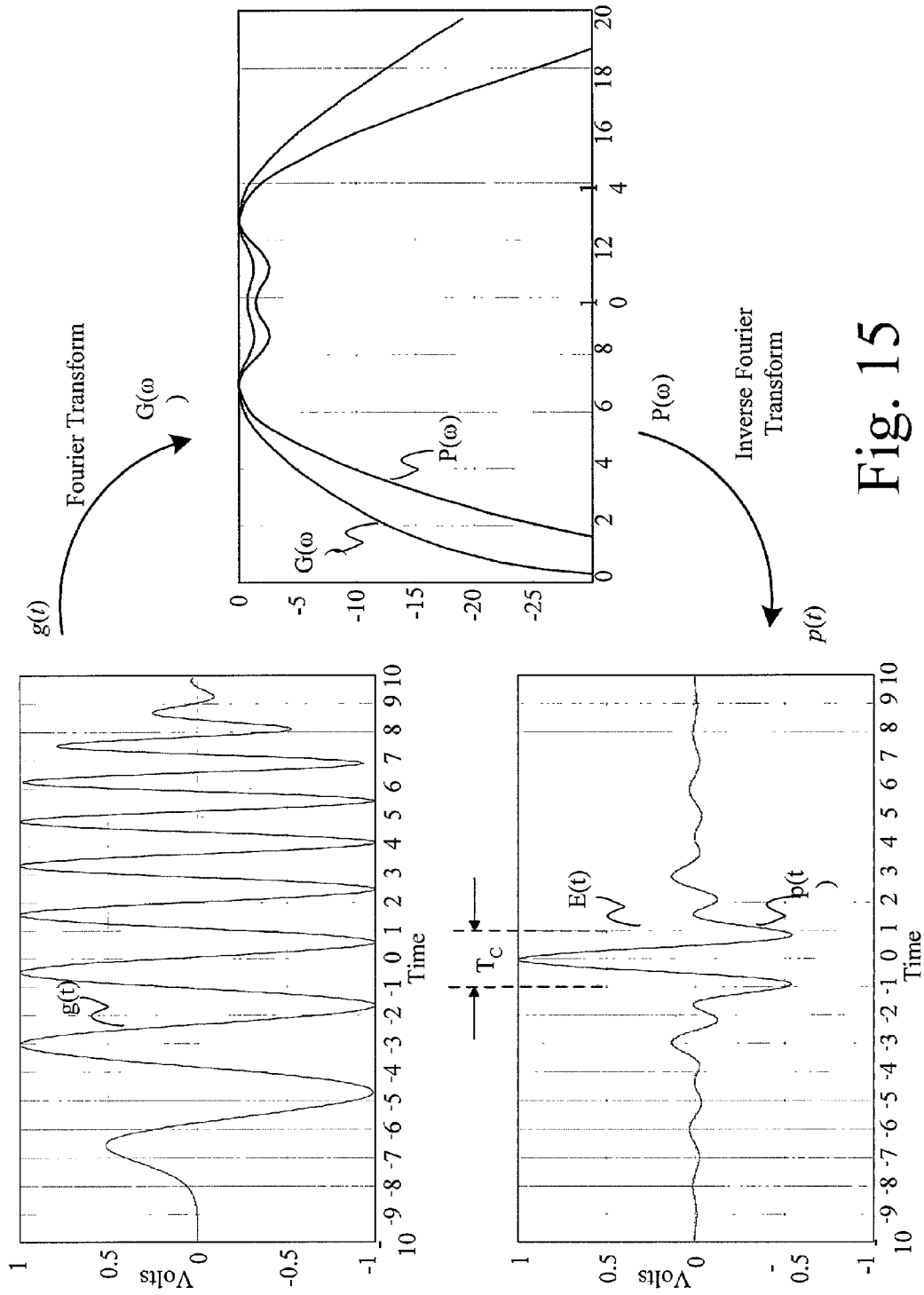
FIG. 15 is timing diagram showing an incoming signal and a correlation signal for actual operation of a preferred embodiment of the present invention.

FIGS. 14A to 14C are timing diagrams showing the operation of the track mode with respect to the correlation curve of FIG. 12B. As shown in FIG. 12B, the incoming signal is acquired when the SNR (in this case amplitude) of the correlation signal is above the threshold $T_R$. Ideally this will take place when the amplitude of the correlation signal is at a maximum. However, it is more likely that the correlation signal will be at a point above the threshold $T_R$, but not at the maximum. In addition, even if the signal is initially acquired at the perfect phase, there may be some slipping of the phase during operation, causing the acquisition point to slip to somewhere other than the maximum point on the correlation curve.

Therefore, once the incoming signal is acquired, the receiver 1 leaves acquisition mode to enter track mode. In track mode, the tracking correlator 215 determines whether the phase of the locally-generated signal is correct, too high, or too low, and gives an indication of how to correct it.

FIGS. 14A to 14C illustrate three possible conditions for the acquisition phase. In FIG. 14A, the acquisition phase $\Phi_{A1}$ is at the ideal point; in FIG. 14B, the acquisition phase $\Phi_{A2}$ is later than the ideal point; and in FIG. 14C, the acquisition phase $\Phi_{A3}$ is earlier than the ideal point. In each case we look at a point a set amount $\tau$ out of phase prior to the acquisition phase and a point the same amount $\tau$ out of phase after the acquisition phase. The polarity of the slope of a line drawn between these two points indicates how the acquisition phase should be changed, and the magnitude of the slope indicates to what degree the acquisition phase should be changed.

FIG. 14A shows the situation where a first acquisition phase is chosen as $\Phi_{A1}$, which results in a first tracking phase $\Phi_{T1}$ an amount $\tau$ before the first acquisition phase $\Phi_{A1}$ and a second tracking phase $\Phi_{T2}$ an amount $\tau$ after the first acquisition phase $\Phi_{A1}$. The first acquisition phase $\Phi_{A1}$, corresponds to a first acquisition point $A_1$ on the correlation curve; and the first and second tracking phases $\Phi_{T1}$ and $\Phi_{T2}$ correspond to first and second tracking points $T_1$ and $T_2$, respectively, on the correlation curve.

In FIG. 14A, the first acquisition point is at a maximum point on the correlation curve, and so the first acquisition phase is exactly correct. As a result, a first and second tracking points $T_1$ and $T_2$ have the same magnitude on the correlation curve. Therefore a line drawn between the first and second tracking points $T_1$ and $T_2$ has a zero slope, indicating that no change need be made to the first acquisition phase $\Phi_{A1}$.

FIG. 14B shows the situation where a second acquisition phase is chosen as $\Phi_{A2}$, which results in a third tracking phase $\Phi_{T3}$ an amount $\tau$ before the second acquisition phase $\Phi_{A2}$ and a fourth tracking phase $\Phi_{T4}$ an amount $\tau$ after the second acquisition phase $\Phi_{A2}$. The second acquisition phase $\Phi_{A2}$, corresponds to a second acquisition point $A_2$ on the correlation curve; and the third and fourth tracking phases $\Phi_{T3}$ and $\Phi_{T4}$ correspond to third and fourth tracking points $T_3$ and $T_4$, respectively, on the correlation curve.

In FIG. 14B, the second acquisition phase $\Phi_{A2}$ is higher than it should be, meaning that the second acquisition point $A_2$ has a lower magnitude than the maximum point on the correlation curve. Furthermore, the third tracking point $T_3$ has a higher magnitude than the fourth tracking point $T_4$. Therefore a line drawn between the third and fourth tracking points $T_3$ and $T_4$ has a negative slope, indicating that the second acquisition phase $\Phi_{A2}$ should be reduced. Furthermore, as the second acquisition phase $\Phi_{A2}$ slips farther from the ideal point, the slope of the line between the third and fourth tracking points $T_3$ and $T_4$ will decrease, indicating that the second acquisition phase $\Phi_{A2}$ must be reduced by a greater amount.

FIG. 14C shows the situation where a third acquisition phase is chosen as $\Phi_{A3}$, which results in a fifth tracking phase $\Phi_{T5}$ an amount $\tau$ before the third acquisition phase $\Phi_{A3}$ and a sixth tracking phase $\Phi_{T6}$ an amount 96 after the third acquisition phase $\Phi_{A3}$. The third acquisition phase $\Phi_{A3}$, corresponds to a third acquisition point A3 on the correlation curve; and the fifth and sixth tracking phases $\Phi_{T5}$ and $\Phi_{T6}$ correspond to the fifth and sixth tracking points $T_5$ and $T_6$, respectively, on the correlation curve.

In FIG. 14C, the third acquisition phase $\Phi_{A3}$ is lower than it should be, meaning that the third acquisition point $A_3$ has a lower magnitude than the maximum point on the correlation curve. Furthermore, the fifth tracking point $T_5$ has a lower magnitude than the sixth tracking point $T_6$. Therefore a line drawn between the fifth and sixth tracking points $T_5$ and $T_6$ has a positive slope, indicating that the third acquisition phase $\Phi_{A3}$ should be increased. Furthermore, as the third acquisition phase $\Phi_{A3}$ slips farther from the ideal point, the slope of the line between the fifth and sixth tracking points $T_5$ and $T_6$ will increase, indicating that the third acquisition phase $\Phi_{A3}$ must be increased by a greater amount.

Thus, it would be very helpful to have an indication of the slope of the line between the two tracking points on either side of a given acquisition phase. The error channel of FIG. 13 in the linear region L is just such an estimation. As long as the phase difference $\Phi_o$ between the incoming signal and the locally-generated signal is small enough that the error channel is in the linear region L, the error channel signal can be used to calculate the slope of the line between the two tracking points, which can then be used to indicate how the phase of the locally-generated signal should be changed.

This analysis may be performed by obtaining three delayed phases for the locally-generated signal, each an amount $\tau$ apart in phase. The first signal (delayed by an amount $0\tau$) is used as an early tracking signal; the second signal (delayed by an amount $1\tau$) is used as an acquisition signal; and the third signal (delayed by an amount $2\tau$) is used as a late tracking signal. This is obtained in the embodiment of FIGS. 1–5 by having the first through third delays 505, 510, and 515. In alternate embodiments, however, delays could be applied to the incoming signal and the locally-generated signal could pass unchanged.

As shown in FIG. 5, the early tracking signal is supplied to the first tracking mixer 405 and the late tracking signal is supplied to the second tracking mixer 410, both of which receive a copy of the incoming signal. The results from these two mixing operations are sent to the tracking adder 415 to obtain a difference. In the preferred embodiment of FIGS. 4 and 5, the result from the second tracking mixer 410 is subtracted from that of the first tracking mixer 405. This is shown purely for illustrative purposes. The operation could easily be done in reverse, with result from the first tracking mixer 405 being subtracted from that of the second tracking mixer 410. The only difference in this case would be a reversal of the polarity of the signal output from the tracking adder 415.

FIG. 13 shows the error tracking result output from the tracking integrator 420 as a function of the phase difference between the incoming signal and the locally-generated signal. This result is passed through the second A/D converter 230 to the digital controller 230, which uses the result to determine the how close the actual acquisition phase is to an ideal acquisition phase, and how it should be changed to bring it closer to the ideal acquisition phase.

Transceiver Operation

FIG. 15 is timing diagram showing an incoming signal and a correlation signal for actual operation of a preferred embodiment of the present invention, as shown in FIGS. 1 to 7.

Signal Properties

For use in the transceiver of FIGS. 1 to 7, a UWB signal is preferably generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In the embodiment described above, each wavelet communicates one bit, using two shapes such as bi-phase. In other embodiments of the present invention, each wavelet may be configured to communicate q bits, where $M \geq 2^q$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1,+a1, −a1, +a2, −a2, . . . , +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+jπ(N−1)/N), exp(−jπ(N−1)/N)), (v) multilevel multi-phase signals ($a_i$ exp(j2πβ/N) |$a_i \in \{1, a1, a2, \ldots, aK\}$, $\beta \in \{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and related characteristic equations will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 11 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{12}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 45) has several control lines (e.g., coming from the radio controller and interface 3) that govern the shape of the wavelet. Therefore, $B_i$ can be thought of as an index into a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=0 to infinity. As i is incremented, a wavelet is produced. Equation 13 below can be used to represent a generic wavelet pulse function, whose shape can be changed from pulse to pulse to convey information or implement user codes, etc.

$$g_{B_i}(t)=Re(B_{i,1}) \cdot f_{B_{i,2},B_{i,3},\ldots}(t)+Im(B_{i,1}) \cdot h_{B_{i,2},B_{i,3},\ldots}(t) \tag{13}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1}=a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Gaussian waveform as defined by Equation 14 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \tag{14}$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 15 below.

$$f_{B_{i,2},B_{i,3},B_{i,4}}=f_{\omega_i,k_i,b_i}(t)=e^{-[b_it]^2}\sin(\omega_i t+k_i t^2). \tag{15}$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 16 below.

$$g_{B_i}(t) = \left( \frac{1}{e^{\frac{-(t-t1_i)}{.3*tr_i}}+1} - \frac{1}{e^{\frac{-(t-t2_i)}{.3*tf_i}}+1} \right) \cdot \sin(\theta_i + \omega_i t + k_i t^2) \tag{16}$$

where $\{B_{i,2}, B_{i,3}, B_{i,4}, B_{i,5}, B_{i,6}, B_{i,7}, B_{i,8}\}=\{t1_i, t2_i, tr_i, tf_i, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega+kT_D$. An example assignment of parameter values is $\omega=1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c>B>0.25f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460, the contents of which are incorporated herein by reference) is that the parameters are chosen such that neither f nor h in Equation 12 above has a DC component, yet f and h exhibit the required wide relative bandwidth for UWB systems.

Similarly, as a result of $B>0.25f_c$, it should be noted that the matched filter output of the UWB signal is typically only a few cycles, or even a single cycle in duration.

Figure 16:
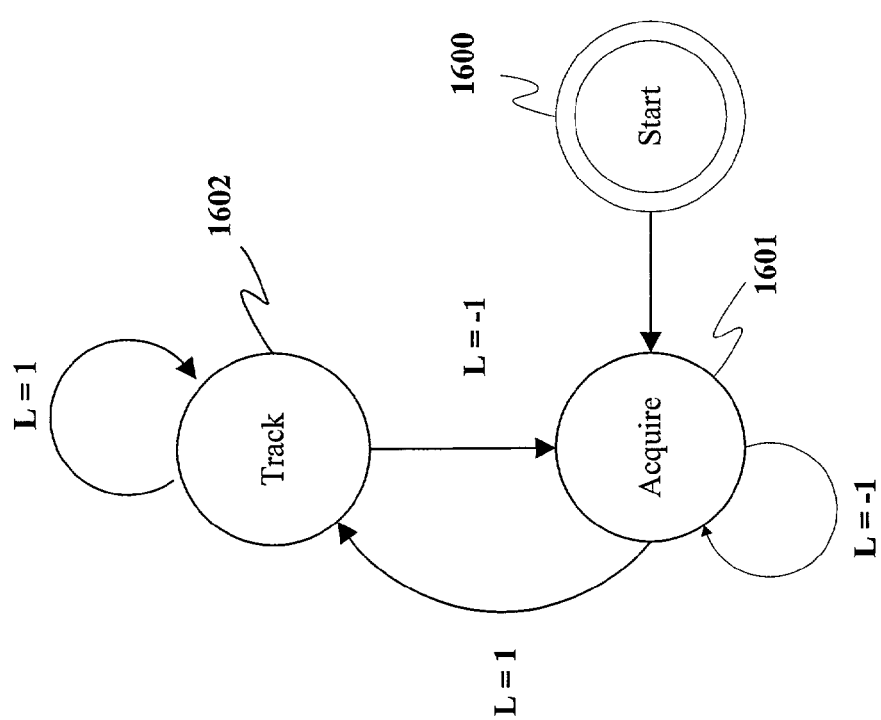
FIG. 16 is a state diagram of a mode controller according to a preferred embodiment of the present invention.

The compressed (i.e., coherent matched filtered) pulse width of a UWB wavelet will now be defined with reference to FIG. 15. In FIG. 15, the time domain version of the wavelet thus represents g(t) and the Fourier transform (FT) version is represented by G(ω). Accordingly, the matched filter is represented as G*(ω), the complex conjugate, so that the output of the matched filter is P(ω)=G(ω). G* (ω). The output of the matched filter in the time domain is seen by performing an inverse Fourier transform (IFT) on P(ω) so as to obtain p(t), the compressed or matched filtered pulse. The width of the compressed pulse p(t) is defined by $T_c$, which is the time between the points on the envelope of the compressed pulse E(t) that are 6 dB below the peak thereof, as shown in FIG. 16. The envelope waveform E(t) may be determined by Equation 17 below.

$$E(t)=\sqrt{(p(t))^2+(p^H(t))^2} \quad (17)$$

where $p^H$ (t) is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Acquisition and Tracking

As noted above, in operation, the receiver operates in either an acquisition or a track mode. When the receiver is already locked to the incoming signal, the receiver is in track mode; when signal integrity significantly degrades, or has not yet been locked, the receiver enters to acquisition mode to acquire or reacquire the signal.

In acquisition mode, an incoming UWB signal is received through the antenna 10. Locally, the PFN and timer 205 generates a string of pulses that corresponding in sequence to a code applied to the transmitted signal. This string of pulses is then mixed with the incoming signal at the acquisition mixer 310. The acquisition integrator 315 integrates the output of the acquisition mixer 310 and outputs a correlation value that indicates the correlation between the incoming UWB signal and the string of pulses generated by the PFN and timer 205. The output of the acquisition integrator 315 has a maximum correlation value when its two input signals are perfectly phase aligned.

Initially, it is not known whether the two signals are lined up with each other. The local pulse stream created in the PFN and timer 205 may be positioned out of phase with the incoming signal, i.e., the pulses of the local pulse stream appear between the pulses of the incoming signal. In this case, the correlation value output from the acquisition integrator 315 would be small. To obtain a sufficiently high correlation between these two signals, the phase of the clock in the PFN and timer 205 is varied by the phase controller 325 until the generated pulse stream is closely enough matched in phase with the incoming signal at the acquisition mixer 310.

This is controlled through the use of a threshold value $T_R$ for the SNR of the correlation output from the acquisition integrator 315. If the SNE of the correlation output from acquisition integrator 315 is below a set threshold value, the digital controller 230 sends a signal to the phase controller 325 to adjust the phase of the generated local pulse stream. To do this, the phase of the local oscillator 320 is adjusted repeatedly to shift the phase of the local pulse stream until it is sufficiently in phase with the incoming signal. Thus, the local pulse stream slides in phase until it is aligned in time with the incoming signal at the acquisition mixer 310, hence, obtaining a maximum correlation SNR. The point at which a maximum correlation SNR occurs is determined by any of a variety of acquisition routines.

When the term "maximum correlation SNR" is used, it refers to a correlation SNR that is above the set threshold $T_R$ rather than an absolute maximum correlation value. Depending upon the level at which the threshold is set, the number of positions of "maximum correlation SNR" will vary.

When a correlation SNR of sufficient quality is observed, i.e., an absolute correlation SNR or a point within an acceptable distance from the absolute correlation peak, the digital controller 230 switches to have the receiver 1 operate in track mode. At this point, it is necessary to continuously monitor the signal-to-noise ratio (SNR) of the incoming signal to determine if an acceptable quality of service, e.g., a data rate at an acceptable bit error rate (BER), is maintained by monitoring the pattern of signal sample points at the output of the first A/D converter 220 or at the output of the data code processor 520.

In the preferred embodiment, the first A/D converter 220 is set to have a sampling rate equal to the analog codeword frequency $F_{aw}$, thus providing one sample per analog code word. Each of these samples has a data bit width of 3 to 8 bits, depending on the implementation of first A/D converter 220. Accordingly, an incoming bit is a sample point with a noise-free value of either A or −A, where A is the signal amplitude. An amplitude A indicates an incoming signal "1," and, an amplitude −A indicates an incoming signal "0" (represented by "−1"). However because of noise in the incoming signal, the bit pattern actually varies around amplitudes A and −A.

Due to different encoding or signal inversion, the interpretation of incoming signals may vary. For example, in alternate embodiments, amplitude A could easily indicate an incoming signal "0," while an amplitude −A could indicate an incoming signal of "1."

Signal power may be expressed as the square of the mean of the absolute value of the bit pattern, which corresponds with the post-compression amplitude of the UWB signal. Noise power is given by the variance around that mean. To determine whether tracking is proceeding properly, it is necessary to measure the SNR to make sure that the signal has sufficient SNR.

In preferred embodiment of the present invention, the incoming signal is a bi-phase signal, i.e., it communicates with inverted and non-inverted channel symbols. The BER is ideally given by a function Q(A/σ), where A is the signal amplitude, σ is the noise standard deviation. As an example, if the tolerable BER is $10^{-2}$ (such that one error in 100 incoming bits is allowed), the system will remain in track mode as long as there is fewer than one error per 100 incoming bits.

For bi-phase modulation, the BER is related to the SNR. Recognizing this, the present inventors implemented a mechanism and process to estimate SNR such that the preferred mode of operation, i.e. acquisition or track, could be determined with certainty. For this system, let a received sample be $x_i=b_iA+\sigma n_i$, where $b_i$ is the bit value, $b_i \in \{-1,1\}$, A is the amplitude of the signal, $n_i$ is zero-mean, unit variance, white-Gaussian noise, and $\sigma$ is the standard deviation of the noise component. If $$\frac{A}{\sigma}$$

is greater than 2.3, then the statistical properties of $|x_i|$ are approximately the same as the statistical properties of $A+\sigma n_i$. Therefore, a reasonable approximation of the absolute value is $$|x_i| \approx A + \sigma n_i \qquad (18)$$

when $$\frac{A}{\sigma}$$

s sufficiently large, i.e., above about 2.3.

A mode controller of the present invention implements finite state machines. FIG. 16 is a state diagram of a mode controller according to a preferred embodiment of the present invention. The mode controller includes a start state 1600, an acquisition state 1601, and a track state 1602.

In the acquisition state 1601, an acquisition controller 545 acquires the incoming signal during the acquisition mode of operation. In a track state 1602, an error channel controller 555 tracks the incoming signal and a lock detector 550 monitors the SNR of the signal during the track mode of operation. The value of a variable L drives the mode controller by determining when the mode controller should transition between states and in which mode the receiver should operate. Thus, L is a mode-controlling parameter.

In operation, the mode controller starts in initial state 1600. An acquisition controller 545 in state 1601 then acquires the signal, and a value for L is repeatedly determined.

In this preferred embodiment, L is set to equal 1 if the SNR is above a set acquisition threshold needed to acquire a signal, and is set to equal −1 if the SNR is below the acquisition threshold. Thus the mode controller 540 stays in state 1601 if L=−1, and transitions to the track state 1602 if L=1. This process is continually repeated during operation until the mode controller 540 transitions to the tracking state 1602 (i.e., until L=1).

Once the mode controller 540 transitions to the track state 1602, the error channel controller 555 then tracks the signal. Here a value for L is again repeatedly determined by the lock detector 550.

In this preferred embodiment, L is set to equal 1 if the SNR is above a set tracking threshold needed to maintain a track, and is set to equal −1 if the SNR is below the tracking threshold. Thus the mode controller 540 stays in state 1602 if L=1, and transitions back to the acquisition state 1601 to re-acquire the signal if L=−1. This process is continually repeated during operation.

Figure 17:
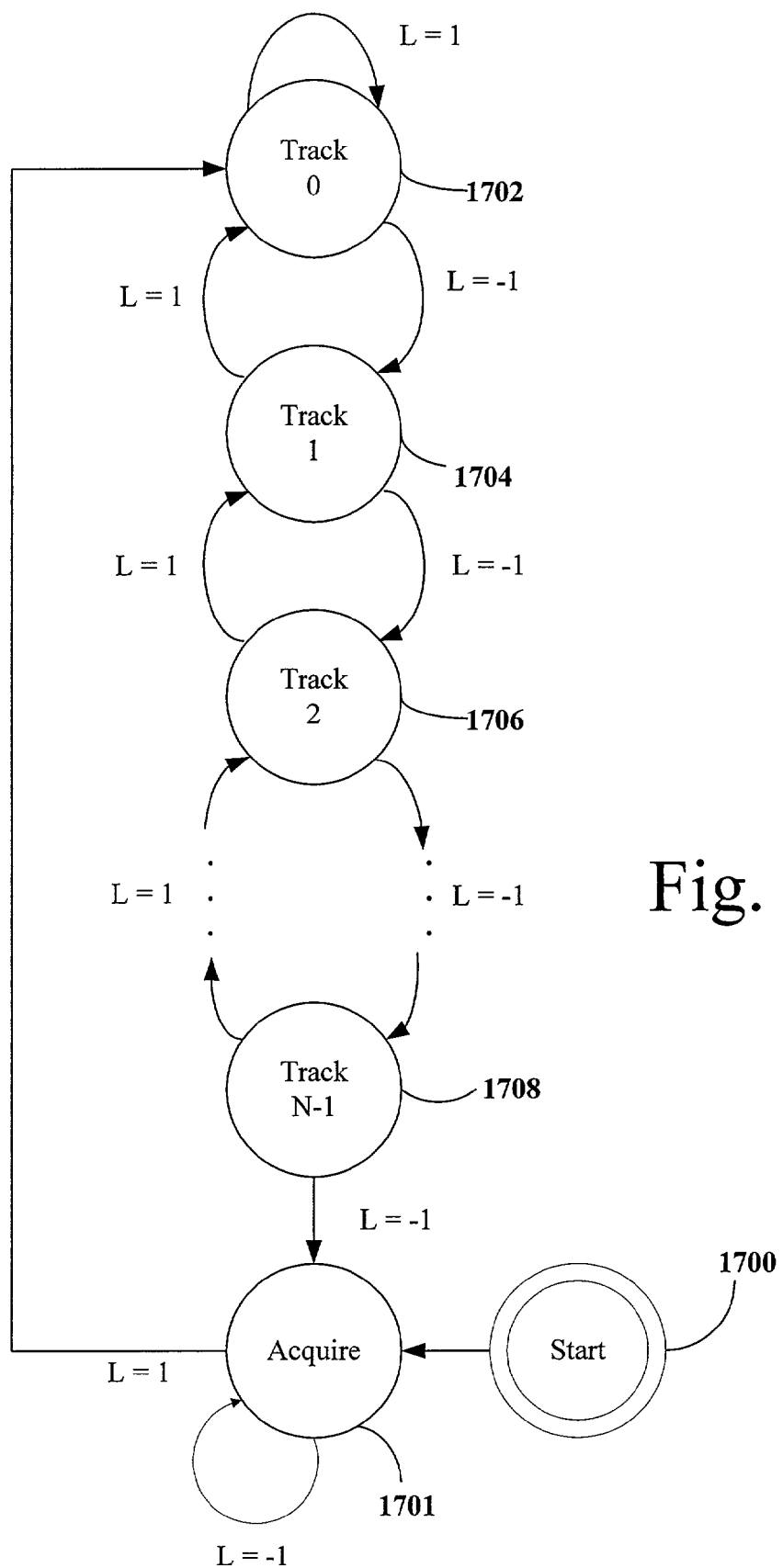
FIG. 17 is a state diagram of a mode controller according to an alternate preferred embodiment of the present invention.

In other embodiments the mode controller 540 can also include multiple track states, as shown in FIG. 17. FIG. 17 is a state diagram of a mode controller according to an alternate preferred embodiment of the present invention. In the embodiment of FIG. 17, the mode controller 540 includes a start state 1700, an acquisition state 1701, and N track states shown by example in states 1702 to 1708. In this case, N is an integer greater than 1.

Similar to the mode controller 540 of FIG. 16, the mode controller 540 of FIG. 17 starts in the initial state 1700, then acquires the signal in the acquisition state 1701. Acquisition is performed as described above with respect to the acquisition state 1601.

After acquisition, the mode controller 540 goes to a $1^{st}$ track state 1702, where L is calculated. As with the embodiment of FIG. 16, L is set to equal 1 if the SNR is above a set tracking threshold needed to maintain a track, and is set to equal −1 if the SNR is below the tracking threshold.

If L=1, the mode controller 540 stays in the $1^{st}$ track state 1702; if L=−1, the mode controller 540 transitions down to a $2^{nd}$ track state 1704. Then a value for L is again determined. If the mode controller 540 continues to compute L=−1, the mode controller 540 transitions down through the $3^{rd}$ track state 1706 all the way to the $N^{th}$ track state 1708. The $1^{st}$ track state 1702 can be considered an initial track state and the $2^{nd}$ through $N^{th}$ track states 1704 to 1708 can be considered intermediate states. When in these intermediate states, the receiver is still in track mode.

However, if L=−1 at the $N^{th}$ tracking state 1708, the mode controller 540 transitions out of the $N^{th}$ tracking state 1708 and goes back into the acquisition state 1701. At this point, the mode controller 540 directs the receiver to reacquire the signal. After acquisition, the mode controller 540 passes control back to $1^{st}$ track state 1702 and the process repeats.

While in an intermediate tracking state 1704 to 1708, a value of L=1 causes a transition from track state i to track state (i−1). Thus it is possible for the mode controller to recover from a brief period of poor signal integrity.

The function of the intermediate tracking states 1704 to 1708 is to prevent the receiver from jumping immediately to the reacquisition state if the receiver receives a burst of noise. The mode controller 540 is built to increase the steepness of the radio performance curves and to ensure that accidental signal unlocks do not occur. Thus, it takes longer to become unlocked and the curve steepens. These intermediate states allow the receiver to tolerate intermittent bit errors without going into the acquisition state. Increasing or reducing the number of intermediate states can adjust the amount of time it takes to unlock a tracking process.

This function is especially useful when there are burst errors. These burst errors cause short periods of increased bit errors. However, if the signal is easily unlocked, these intermittent burst errors could cause the signal to go into frequent reacquisition, thus reducing system throughput. The mode controllers 540 required by FIGS. 16 and 17 may be implemented in a programmable processor such as an ASIC, for example.

A preferred embodiment of the mode controller state machine depicted in FIG. 17 could contain three intermediate tracking states. Alternate embodiments could choose more or fewer, depending upon the amount of time allowed to recover from a period of poor signal integrity.

Mode Controller—First Preferred Embodiment

Figure 18:
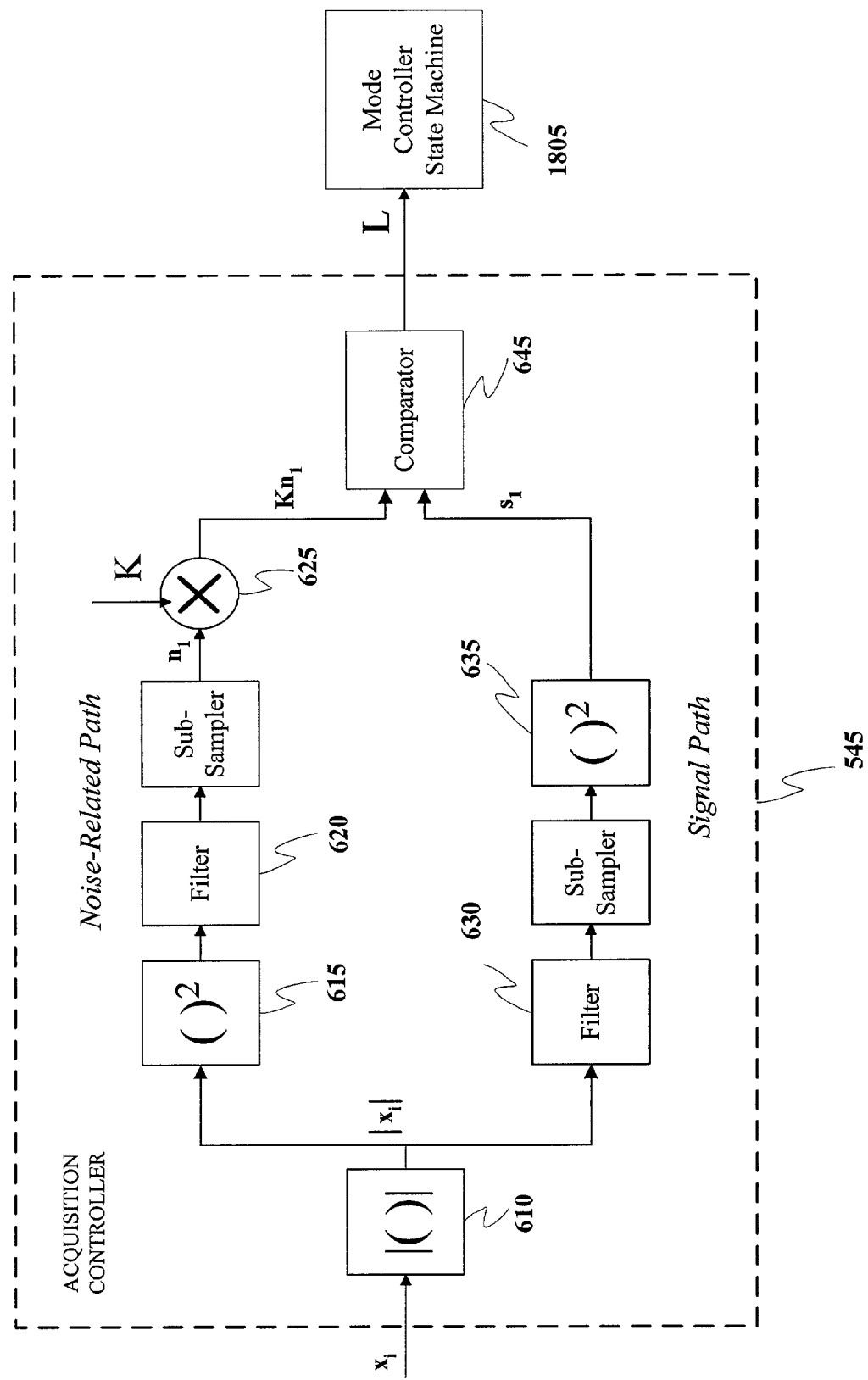
FIG. 18 is a block diagram of a specific embodiment of the acquisition controller or lock detector of FIG. 6.

The embodiment of FIG. 6 shows the case in which the mode controller 540 determines whether the receiver 1 should be in acquisition or track mode based on the estimation of signal and noise power. This determination begins with a calculation of two parameters, an estimate of the signal strength $s_1$ and an estimate of the noise plus signal strength $n_1$. FIGS. 18 is a block diagram of a specific embodiment of the acquisition controller 545 or lock detector 550 of FIG. 6. In this embodiment the first and third scaling factors $K_1$ and $K_2$ are set to 1 and the second scaling factor $K_3$ is set to K. Because ($K_1=K_3=1$), the first and third scaling mixers 615 and 640 have been eliminated. The operation of the acquisition controller 545 or lock detector 550 is described below.

Equation 19 shows the calculation of $s_1$, where samples $x_i$ are summed over a set of B bits in the incoming signal and then squared. Similarly, Equation 20 shows the calculation of $n_1$, where the square of $x_i$ is summed over the set of B bits.

$$s_1 = \left(\sum_{i=1}^{B} |x_i|\right)^2 \quad (19)$$

$$n_1 = \sum_{i=1}^{B} x_i^2 \quad (20)$$

A lock parameter L is a determination of whether a signal meets a SNR requirement. A lock constant K influences the probability of L being 1, i.e. the threshold that the signal must meet. Thus, for an acceptable SNR, $s_1$ should be greater than $n_1$ by a factor equal to the lock constant K. As such, the present process compares $s_1$ and $n_1$ in Equation 21. If signal power is sufficiently greater than noise power, then L=1, indicates sufficient SNR. Conversely, if signal power is not large enough compared to noise power, then L=−1, indicating insufficient SNR.

$$L = \text{sign}(s_1 - Kn_1) \quad (21)$$

Here, $s_1$ and $n_1$ are random variables. Equations 22–24 show the expected values of $s_1$, $n_1$ and $s_1-Kn_1$, where $|x_i|$ from Equation 18 is substituted in Equations 19 and 20 and the expected values taken.

$$E(s_1) = E\left[\left\{\sum_{i=1}^{B}(A+k_i\sigma)\right\}^2\right] \quad (22)$$

$$= E\left[B^2A^2 + \sigma^2\sum_{i=1}^{B}k_i^2 + 2BA\sigma\sum_{i=1}^{B}k_i\right]$$

$$= B^2A^2 + B\sigma^2$$

Since, $k_i$ is zero mean and unit variance, $E[(\Sigma k_i)^2]=B$ and $E[\Sigma k_i]=0$ $$E(n_1) = E\left[\sum_{i=1}^{B}(A+k_i\sigma)^2\right] \quad (23)$$

$$= E\left[BA^2 + \sigma^2\sum_{i=1}^{B}k_i^2 + 2A\sigma\sum_{i=1}^{B}k_i\right]$$

$$= BA^2 + B\sigma^2$$

Similarly, the $k_i$ terms simplify. Then, $$E(s_1 - Kn_1) = B^2A^2 + B\sigma^2 - KBA^2 - KB\sigma^2 \quad (24)$$

$$= BA^2(B-K) - B\sigma^2(K-1)$$

To ensure that L=1 most of the time, $E(s_1-Kn_1)>0$. Equivalently, $$\frac{A^2}{\sigma^2} > \frac{K-1}{B-K} \quad (25)$$

Since the BER is a function of SNR, the mode controller adjusts the BER threshold at which to enter an acquisition state by changing the values of K and B in Equation 25. It is this mathematical analysis that provides the impetus for the mode control process and mechanism, since it enables a low cost, highly reliable implementation.

As shown in the embodiment described in Equations 19 to 25, the noise and signal path filters 620 and 630 are moving average filters sub-sampled by a factor of B. However, different filters could be used in alternate embodiments. In this case, the Equations 19 to 25 would be changed to account for the behavior of the chosen filters. In addition, if the first and third scaling factors $K_1$ and $K_2$ were set equal to a value other than 1, new constants corresponding to these values could be added to the equations where necessary.

As shown in FIGS. 18, in operation the incoming sampled data stream $x_i$ passes through the absolute value block 610 and the absolute value of the incoming sampled data stream $|x_i|$ is determined. The absolute value of the scaled incoming signal $|x_i|$ is then used in parallel calculations to determine the noise related estimate $n_1$ and the signal estimate $s_1$.

The noise related estimate $n_1$ is determined by squaring the absolute value of the scaled incoming signal $|x_i|$ in the first squarer 615 and then filtering the squares in the noise path filter 620. The noise related estimate $n_1$ is then scaled by the scaling factor K at the second scaling mixer 625 and the scaled noise related estimate $Kn_1$ is provided to the comparator 645. Preferably the value of K is initially set to correspond to a desired BER.

The signal estimate $s_1$ is determined by filtering the absolute value of the scaled incoming signal $|x_i|$ over a set number of samples in the signal path filter 630 and then squaring the filtered signal in the second squarer 635. The signal estimate $s_1$ is then provided to the comparator 645. Optionally, the signal estimate can also be scaled before it is provided to the comparator 645.

At the comparator 645, the signal estimate $s_1$ and the scaled noise related estimate $Kn_1$ are compared to determine the probability of the incoming signal being locked. This comparison yields the lock parameter L. L is input to a mode controller state machine 1805. Based on this signal, the mode controller state machine 1805 will either stay in the current state or transition to a different state, as described with reference to FIGS. 16 and 17.

The comparator 645 outputs the value of L, which determines whether the signal is of sufficient quality to be acquired in the acquisition state, or whether the signal is of sufficient quality that a lock can be maintained in the tracking state. A direct computation of the ratio in Equation 24 is therefore not required since Equation 24 is only used to set the value of K. Equivalently, the value of K can be set empirically based on simulation. This is often the technique used when more complex filters are used for the noise and signal path filters 620 and 630.

Figure 19:
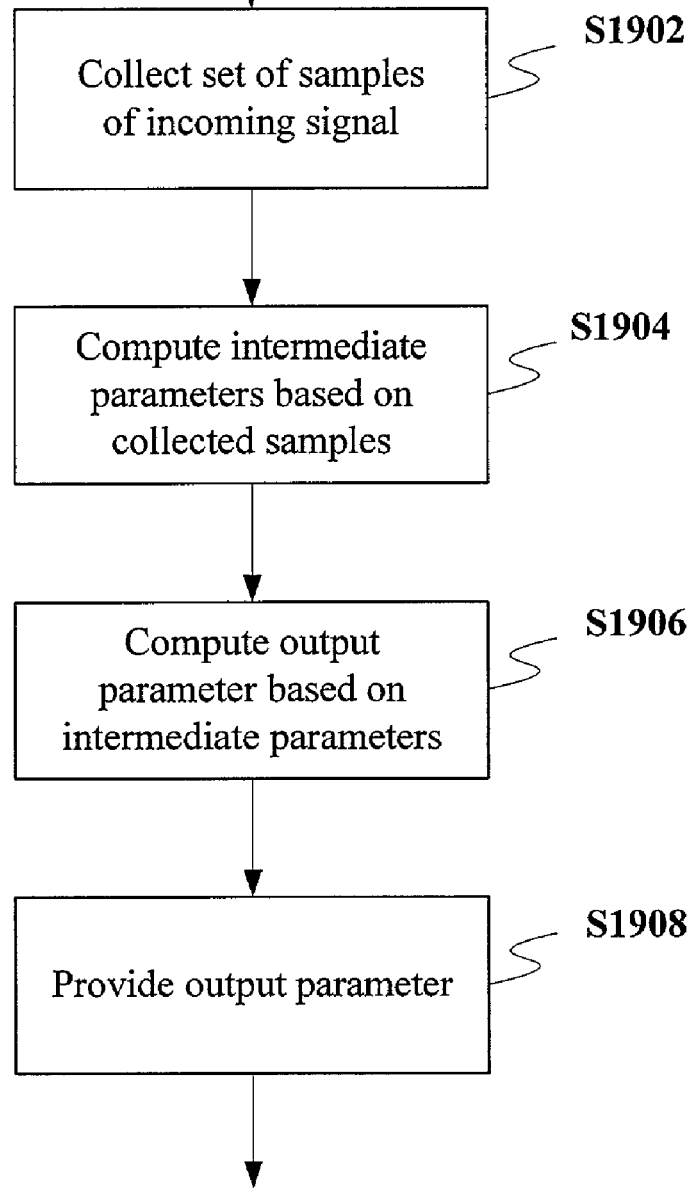
FIG. 19 shows the steps performed by the acquisition state machine of FIGS. 16 and 17 according to the embodiment of the acquisition controller of FIG. 18.

FIG. 19 shows the steps performed by the mode controller state machine 1805 of FIG. 18 whether in an acquisition state 1601, 1701 or a tracking state 1602,1702, 1704,1706, 1708 (See FIGS. 16 and 17),-according to the embodiment of the mode controller 540 of FIG. 6.

Regardless of the starting state, the mode controller state machine 1805 performs the following steps. In step S1902, a set of bits B in the incoming signal is collected. Using this set of B samples, the current state 1601, 1602,1701,1702, 1704, 1706, or 1708 computes a set of intermediate parameters S1904. Based on these intermediate parameters, an output parameter is calculated in step S1906, and this output parameter is provided as an output in step S1908.

The intermediate parameters are preferably a signal parameter and a noise-related parameter. They could be $s_1$ and $n_1$, as described above with respect to the first preferred embodiment of the mode controller. They could also be l and g, or $l_1$ and $g_1$, as described below referring to FIG. 22, with respect to the second and third preferred embodiments of the mode controller. These parameters may be continually monitored, or may be sampled at a set periodicity.

Preferably the intermediate parameters are computed "in band." In other words, they are computed within the same bandwidth.

In the preferred embodiment the output parameter is a mode-controlling parameter called a lock parameter L, which takes a value of 1 or −1. The lock parameter L indicates whether the mode controller state machine 1805 should transition to a new state, and what the new state will be.

As shown in FIGS. 16 and 17 and the associated description, the lock parameter L indicates whether the set of B samples is at a sufficiently high SNR to transition to a new state. In the embodiment of FIGS. 16 and 17, a sufficiently high SNR will result in L having a value of 1, which will cause the mode controller state machine 1805 to move to a tracking state, or transition to a lower tracking state. Similarly, a sufficiently low SNR will result in L having a value of −1, which will cause the mode controller state machine 1805 to move to a higher tracking state, or transition back to the acquisition state.

The operation of mode controller state machine 1805 may be slightly different when in different states. In particular, the step of computing the output parameter S1906 may be performed slightly differently when in the acquisition state as compared to when in the tracking state.

In embodiments that do not employ sub-sampled moving average filters, the intermediate parameters, i.e., the signal parameter and the noise-related parameter, may be constantly monitored to detect the occurrence of a valid lock point. In some embodiments the noise and signal path filters 620 and 630 can either be finite impulse response (FIR) or infinite impulse response (IIR) filters.

An example of such an embodiment employs an IIR signal filter 620 of the form depicted in FIG. 7C that is designed to have an impulse response that closely matches the shape of the autocorrelation pulse of FIG. 12B. Thus, an approximate matched filter is used in the signal estimation path in FIG. 18.

An equivalent approach employing an FIR filter or an IIR filter with a different structure could also be used. An example of the type of filter used in the noise-related path of FIG. 18 is the leaky integrator filter shown in FIG. 7A or the moving average filter of FIG. 7B. Other forms of FIR and IIR filters are possible.

Figure 20:
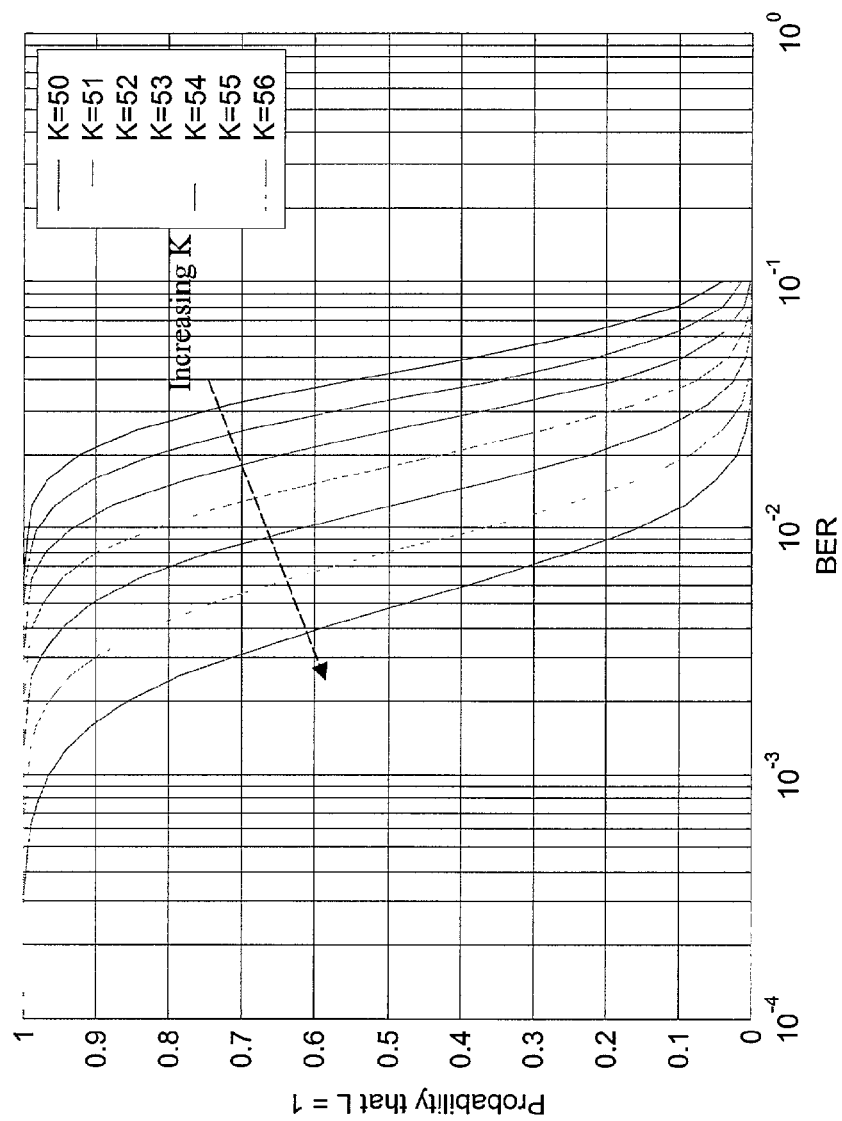
FIG. 20 is a graph that shows the behavior of the probability curves for various values of K according to the acquisition controller or lock detector of FIG. 18.

FIG. 20 is a graph that shows the behavior of the probability curves for various values of K according to the acquisition controller or lock detector of FIG. 18 where sub-sampled moving average filters are used for the noise and signal path filters 620 and 630. In this embodiment the value selected for B is 16, and the filters are sub-sampled by a factor of 16. From these curves, it is clear that larger values of K drive L to −1 at lower BER's. As previously stated, the BER in this exemplary embodiment is set to $10^{-2}$. This means that for every 100 incoming bits 1 error is allowed. If the BER reaches or gets larger than $10^{-2}$, then on average the mode controller drives the receiver to acquire a new signal. Since acquisition is "expensive" in terms of lost system throughput, an acquisition constant $K_A$ is chosen so that the probability that L=1 at $10^{-2}$ BER is high. For the present preferred embodiment (K=50).

Figure 21:
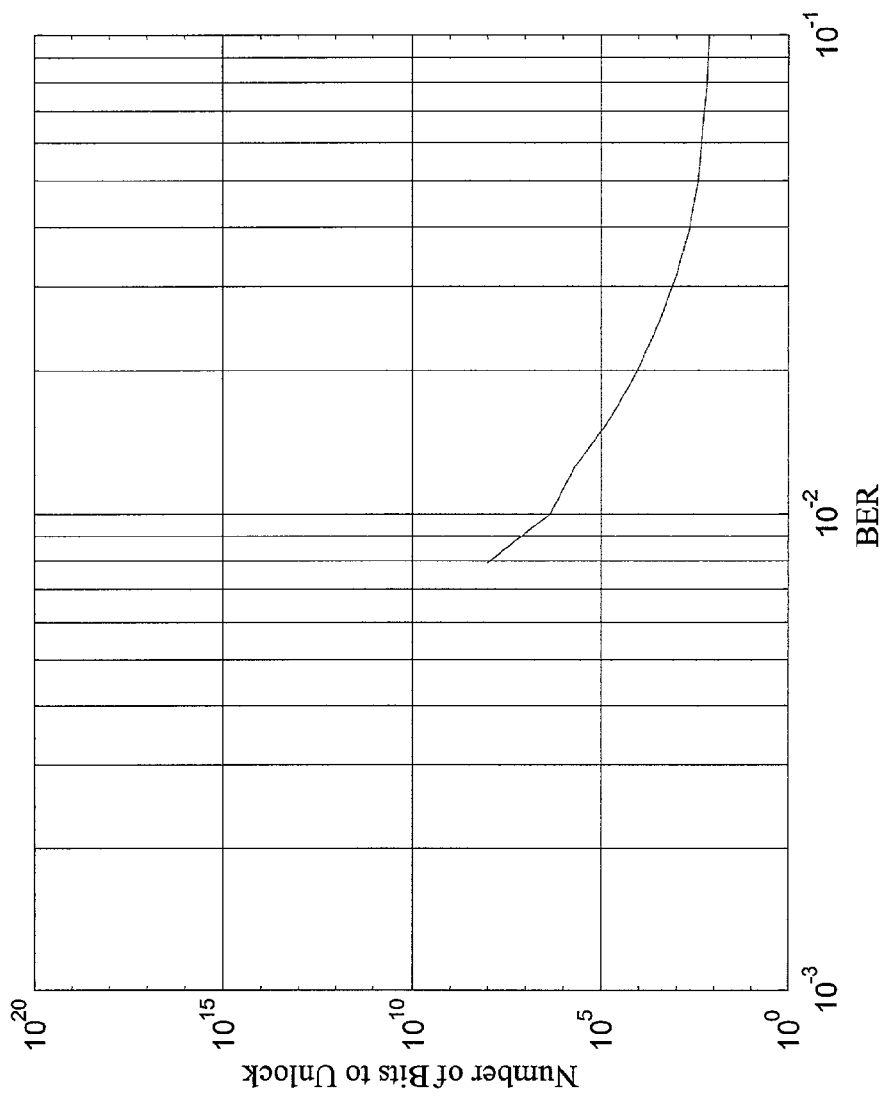
FIG. 21 shows the performance curve of the acquisition controller or lock detector of FIG. 18 for (B=16) and (K=50)

FIG. 21 shows the performance curve of the mode controller state machine 1805 in FIG. 18 with three intermediate tracking states. (See FIG. 17.) The lock controller uses (B=16) and (K=50). This curve was generated by computing the average number of bits needed to enter an acquisition state after first entering the tracking state. From the curve, it is shown that at a BER of $10^{-2}$, the system will unlock within 10 million bits. The curve increases dramatically such that at a BER of $10^{-3}$, the system stays locked for an extremely large amount of time.

Mode Controller—Second Preferred Embodiment

Figure 22:
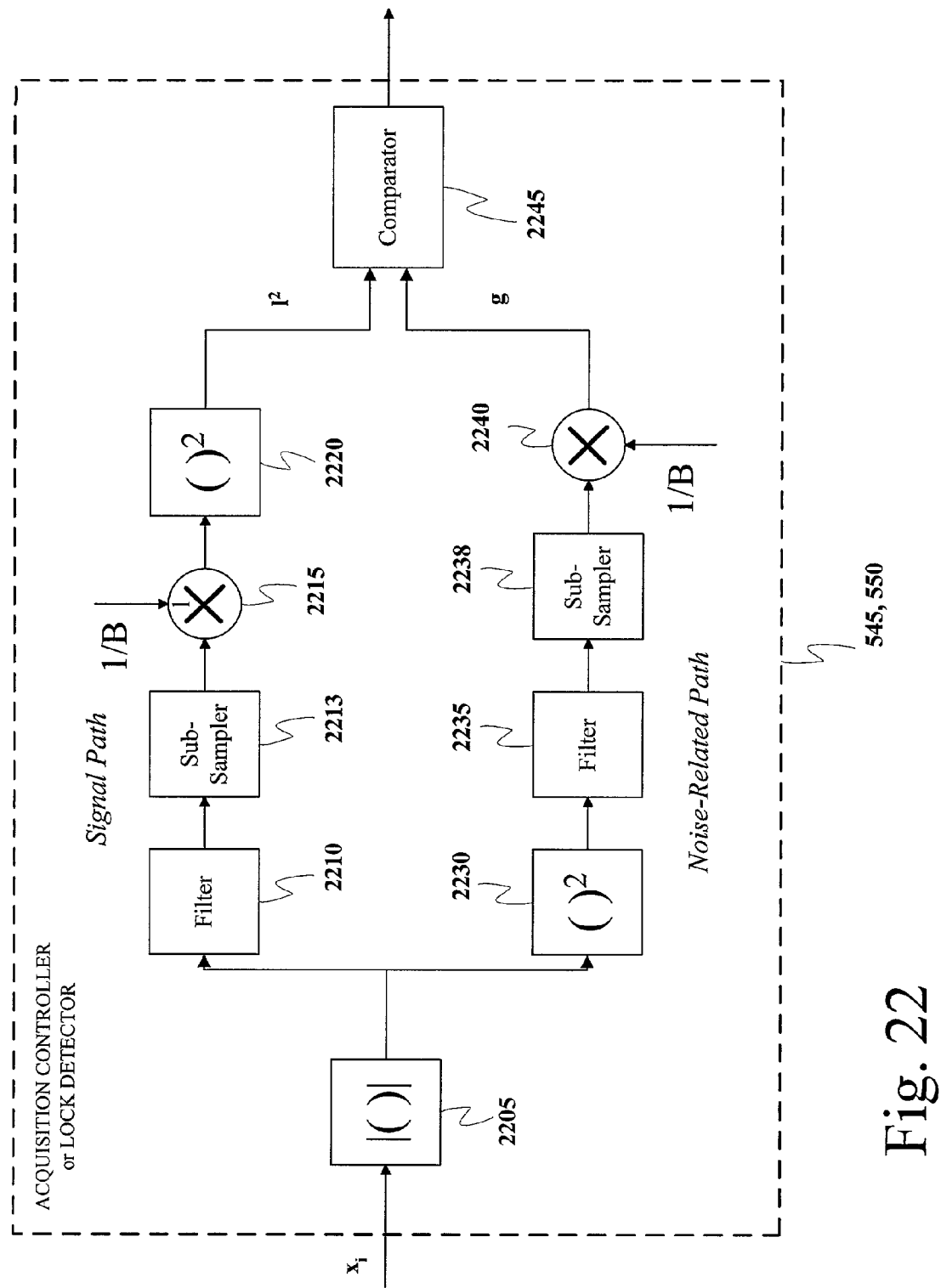
FIG. 22 shows an alternate embodiment of the acquisition controller 545 or lock detector 550 in the mode controller of FIG. 5.

FIG. 22 shows an alternate embodiment of the acquisition controller 545 or lock detector 550 in the mode controller of FIG. 5. As shown in FIG. 22, the acquisition controller 545 or lock detector 550 includes an absolute value block 2205, a first filter 2210, a first sub-sampler 2213, a first scaling mixer 2215, a first squarer 2220, a second squarer 2230, a second filter 2235, a second sub-sampler 2238, a second scaling mixer 2240, and a comparator 2245.

By way of example, the process occurring within a track state 1602, 1702 of a track state machine from FIGS. 16 and 17 according to the lock detector 550 of FIG. 22 is described. In this embodiment, the SNR is calculated by computing two parameters l and g. Equation 26 explains how the expected value of l may be calculated assuming the first filter 2310 is a moving average filter. And Equation 26 explains how the expected value of g may be calculated, assuming the second filter 2335 is a moving average filter.

$$l = \frac{1}{B}\sum_{i=1}^{B} |x_i| \tag{26}$$

$$E(l) = E\left[\frac{1}{B}\sum_{i=1}^{B} |x_i|\right]$$

$$= E\left[A + \frac{1}{B}\sigma\sum_{i=1}^{B} k_i\right] = A$$

$$g = \frac{1}{B}\sum_{i=1}^{B} |x_i|^2$$

$$E(g) = E\left[\frac{1}{B}\sum_{i=1}^{B} |x_i|^2\right]$$

$$= E\left[A^2 + \frac{1}{B}2A\sigma\sum_{i=1}^{B} k_i + \frac{1}{B}\sigma^2\sum_{i=1}^{B} k_i^2\right] = A^2 + \sigma^2 \tag{27}$$

$l^2$ estimates signal power. $g-l^2$ estimates noise power.

Then, by definition, Equation 28 shows the direct estimate of SNR.

$$\frac{l^2}{g-l^2} \approx \frac{A^2}{A^2+\sigma^2-A^2} = \frac{A^2}{\sigma^2} \qquad (28)$$

Since BER is a function of SNR, as previously stated, the SNR corresponding to the desired BER can be determined and monitored. When the SNR goes below a target level $T_h$, the mode controller can detect an unlock status with lock parameter L. As such, the present invention compares the SNR to the target level in Equation 29.

$$L = \begin{cases} 1, & \text{for } \frac{l^2}{g-l^2} \geq T \\ -1, & \text{for } \frac{l^2}{g-l^2} < T \end{cases} \qquad (29)$$

As shown in FIG. 22, an incoming bit stream $x_i$ is received at the absolute value block 2205, which calculates the absolute value of the incoming bit stream $x_i$. This absolute value is then filtered in the first filter and multiplied by the scaling factor 1/B in the first scaling mixer 2215 to determine l. This value of l is then squared to determine the value $I^2$. The value g is determined by squaring $x_i$ in the second squarer 2230 and filtering the squares in the second filter 2235. That output is then multiplied by 1B in the second scaling mixer 2240. The comparator 2245 then compares I and g to determine the lock parameter L. The lock parameter L is provided to a controller, which is used by a mode controller to determine whether the receiver should be in track or acquire mode. Again, as shown in FIG. 17, the track state may include multiple sub-states such that the state controller could also move the receiver between the multiple track sub-states as well as between the track and acquisition states.

A first sub-sampler 2213 may be provided between the first filter 2210 and the first scaling mixer 2215. The first sub-sampler 2213 samples the output of the first filter 2210 at a periodic rate, which rate may be varied, e.g., every $4^{th}$ output, every $15^{th}$ output, every $228^{th}$ output, etc. However, if the sampling rate is uniformly set at one, i.e., every result is sampled, the first sub-sampler 2213 may be omitted entirely. Similarly, a second sub-sampler 2238 may be provided between the second filter 2235 and the second scaling mixer 2240. As above, if its sampling rate is uniformly set at one, i.e., every result is sampled, the second sub-sampler 2238 may be omitted entirely. The sub-sample times of the first and second sub-samplers 2213 and 2238 need not be the same.

As shown in embodiment described in Equations 26 to 29, the first and second filters 2210 and 2235 are summers. However, different filters could be used in alternate embodiments. In this case, the Equations 26 to 29 would be changed to account for the behavior of the chosen filters.

Mode Controller—Third Preferred Embodiment

Figure 23:
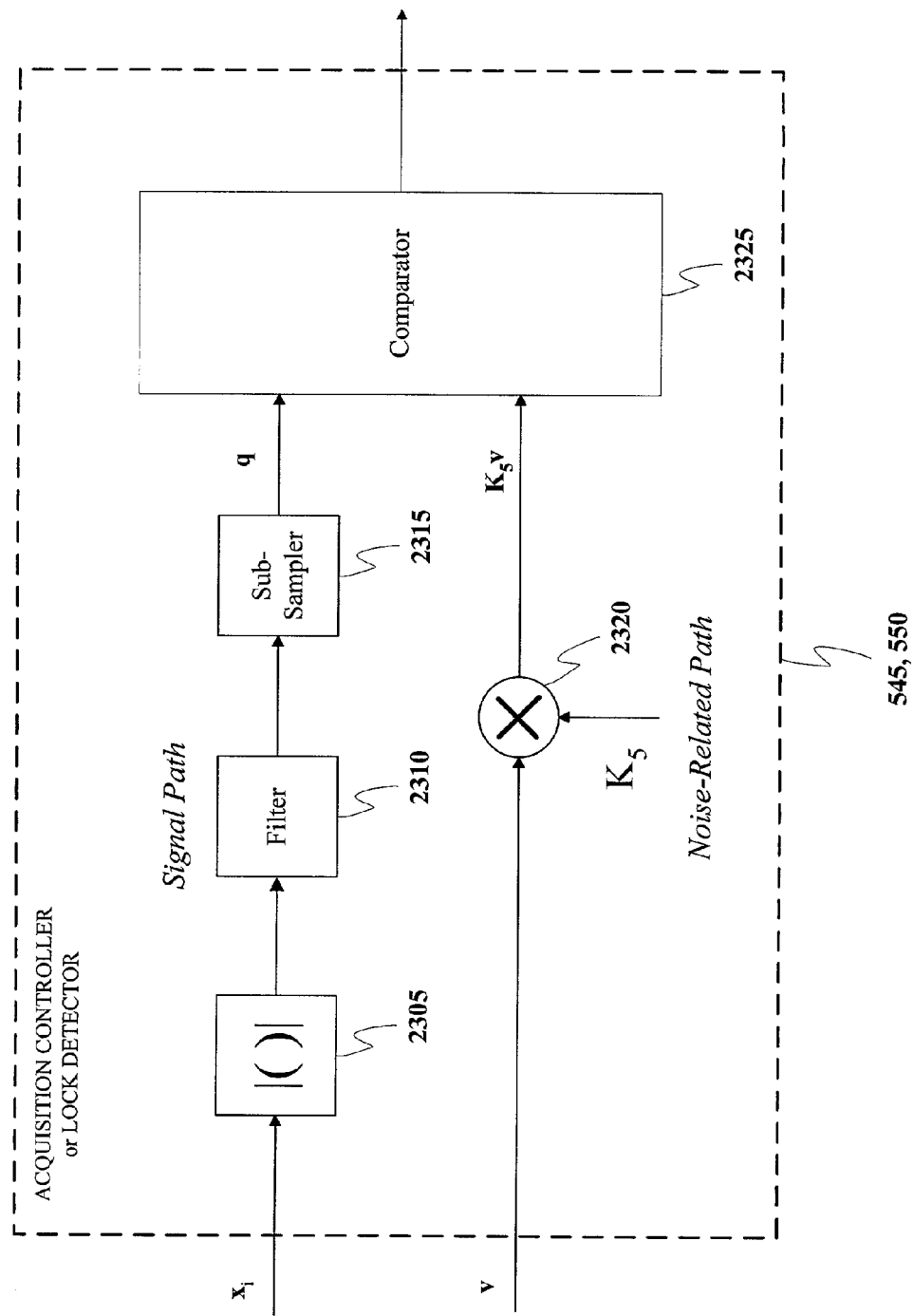
FIG. 23 shows another alternate embodiment of the acquisition controller or lock detector of the present invention in which AGC initialization is used to determine whether the mode controller should be in acquisition or track mode.

FIG. 23 shows another alternate embodiment of the acquisition controller 545 or lock detector 550 of the present invention in which AGC initialization is employed prior to determining whether the mode controller should be in acquisition or track mode. During AGC initialization, a noise standard deviation v is estimated.

When AGC is initialized by measuring the noise variance, the quantization levels may potentially translate directly to BERs. For example, if the noise variance is set to some arbitrary value through AGC control, then the amplitude of the incoming signal out of the A/D converter implies a SNR proportional to that amplitude. The proportionality constant depends on the level at which the noise variance is set. This value translates directly into a BER. So, by setting the noise variance prior to signal acquisition, the quantized levels translate directly into a BER.

Using this estimated noise standard deviation v, the mode controller 540 can then simply monitor the incoming signal $x_i$ output from the first A/D converter 220 or the data code processor 520 to determine the proper mode.

The estimated noise standard deviation is scaled and compared to the filtered (and potentially sub-sampled) absolute value of the incoming signal $x_i$. L is computed as described in Equation 30:

$$L = \text{sign}(q - K_5 v), \qquad (30)$$

where q is the filtered (and possibly sub-sampled) absolute value of the incoming bit stream, $K_5$ is a scaling factor, and v is the estimated noise standard deviation.

As shown in FIG. 23, the acquisition controller 545 or lock detector 550 includes an absolute value block 2305, a filter 2310, a sub-sampler 2315, a scaling mixer 2220, and a comparator 2225.

An incoming bit stream $x_i$ is received at the absolute value block 2305, which calculates the absolute value of the incoming bit stream $x_i$. This absolute value is then filtered in the filter 2310 to determine a value for q. A value of the estimated noise standard deviation v is received at the scaling mixer 2320 and multiplied by a scaling factor $K_5$.

The comparator 2245 then compares q and $K_5 v$ to determine the lock parameter L. The lock parameter L is provided to a controller, which is used by a mode controller to determine whether the receiver should be in track or acquire mode. Again, as shown in FIG. 17, the track state may include multiple sub-states such that the state controller could also move the receiver between the multiple track sub-states as well as between the track and acquisition states.

A sub-sampler 2315 may be provided between the filter 2310 and the comparator 2325. The sub-sampler 2215 samples the output of the filter 2310 at a periodic rate, which rate may be varied, e.g., every $4^{th}$ output, every $15^{th}$ output, every $228^{th}$ output, etc. However, if the sampling rate is uniformly set at one, i.e., every result is sampled, the sub-sampler 2215 may be omitted entirely.

If the initial noise variance estimate v is underestimated, then the SNR would appear to be better than it actually is. On the other hand, if the initial noise variance estimate v is overestimated, then the SNR would appear to be worse than it actually is. But since the noise variance estimate v may be periodically updated by monitoring the spread of the absolute value data while in tracking mode, eventually, the noise variance estimate v will converge to a reasonable value.

Although three different embodiments are shown for mode controllers, they should be considered exemplary and restrictive. Other embodiments are possible. In addition, the various embodiments can be mixed and matched for acquisition and tracking, as needed to meet the requirements of acquisition and tracking.

Using a Transceiver in a Larger System

The UWB transceiver described with respect to FIGS. 1 to 8 may be used to perform a radio transport function for interfacing with different applications as part of a stacked protocol architecture. In such a configuration, the UWB transceiver performs signal creation, transmission, and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1 may be used as part of a local area network (LAN) connecting fixed structures or as part of a wireless personal area network (WPAN) connecting mobile devices, for example.

In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 24:
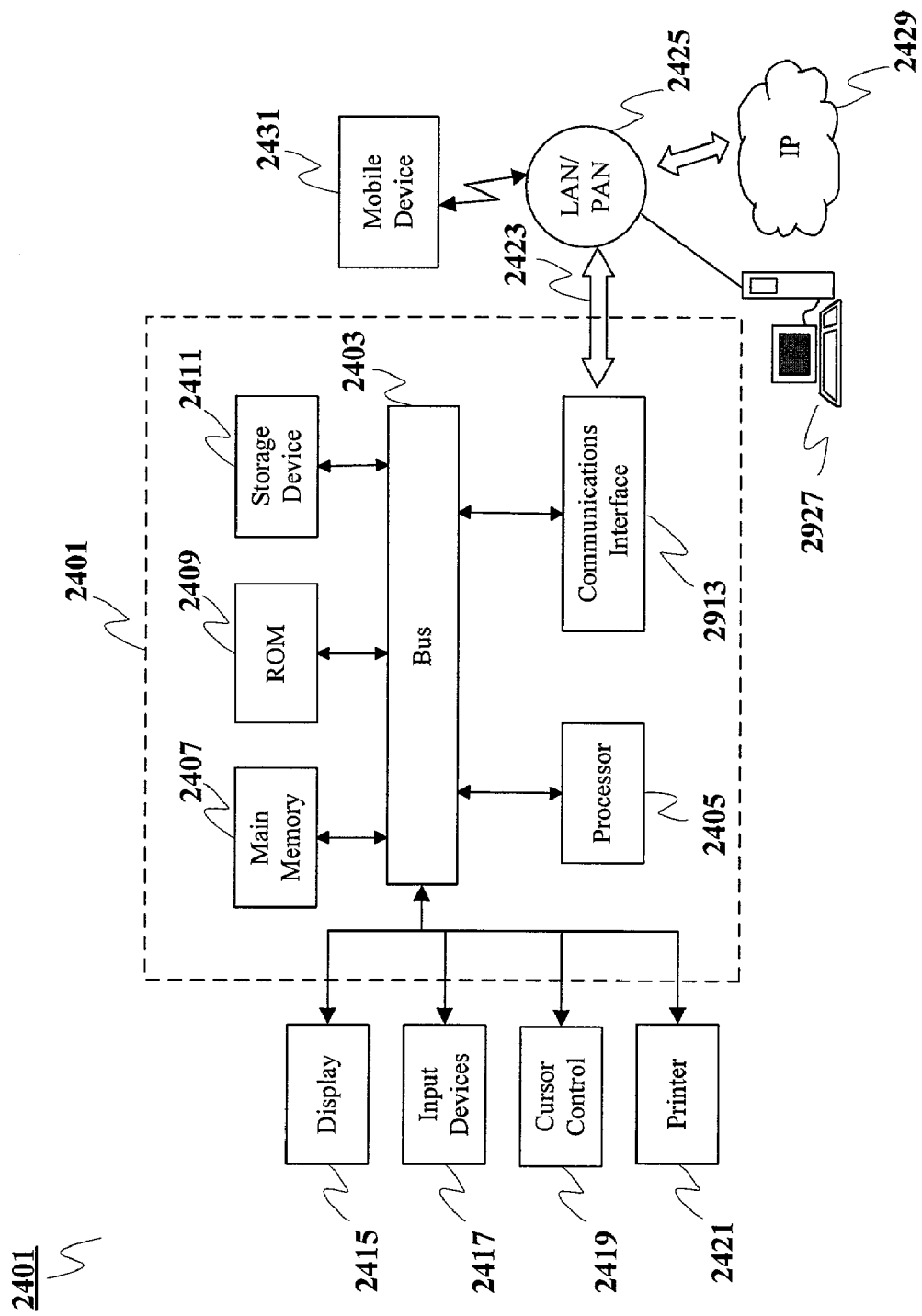
FIG. 24 illustrates a processor system according to a preferred embodiment of the present invention.

FIG. 24 illustrates a processor system 2400 according to a preferred embodiment of the present invention. In this embodiment, the processor system 2400 includes a processor unit 2401, a display 2415, one or more input devices 2417, a cursor control 2419, a printer 2421, a network link 2423, a communications network 2425, a host computer 2427, an Internet Protocol (IP) network 2429, and a mobile device 2431. The processor unit 2401 includes a bus 2403, a processor 2405, a main memory 2407, a read only memory (ROM) 2409, a storage device 2411, and a communication interface 2413. Alternate embodiments may omit various elements.

The bus 2403 operates to communicate information throughout the processor unit. It is preferably a data bus or other communication mechanism for communicating information.

The processor 2405 is coupled with the bus 2403 and operates to process the information.

The main memory 2407 may be a random access memory (RAM) or other dynamic storage device (e.g., dynamic RAM (DRAM), static RAM (SRAM), synchronous DRAM (SDRAM), flash RAM). It is preferably coupled to the bus 2403 for storing information and instructions to be executed by the processor 2405. In addition, a main memory 2407 may be used for storing temporary variables or other intermediate information during execution of instructions to be executed by the processor 2405.

The ROM 2409 may be a simple read-only memory, or may be another kind of static storage device (e.g., programmable ROM (PROM), erasable PROM (EPROM), and electrically erasable PROM (EEPROM)). It is coupled to the bus 2403 and stores static information and instructions for the processor 2405.

The storage device 2411 may be a magnetic disk, an optical disc, or any other device suitable for storing data. It is provided and coupled to the bus 2403 and stores information and instructions.

The processor unit 2401 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the processor unit 2401 using an appropriate device bus (e.g., a small system interface (SCSI) bus, an enhanced integrated device electronics (IDE) bus, or an ultra-direct memory access (DMA) bus). The processor unit 2401 may additionally include a compact disc reader, a compact disc reader-writer unit, or a compact disc jukebox, each of which may be connected to the same device bus or another device bus.

The processor system 2401 may be coupled via the bus 2403 to the display 2415. The display unit may be a cathode ray tube (CRT), a liquid crystal display (LCD), or any other suitable device for displaying information to a system user. The display 2415 may be controlled by a display or graphics card.

The processor system 2401 is also preferably connected to the one or more includes input devices 2417 and a cursor control 2419 for communicating information and command selections to the processor 2405. The one or more input devices may include a keyboard, keypad, or other device for transferring information and command selections. The cursor control 2419 may be a mouse, a trackball, cursor direction keys, or any suitable device for communicating direction information and command selections to the processor 2405 and for controlling cursor movement on the display 2415.

In addition, a printer 2421 may provide printed listings of the data structures or any other data stored and/or generated by the processor system 2401.

The processor unit 2401 performs a portion or all of the processing steps of the invention in response to the processor 2405 executing one or more sequences of one or more instructions contained in a memory, such as the main memory 2407. Such instructions may be read into the main memory 2407 from another computer-readable medium, such as a storage device 2411. One or more processors in a multi-processing arrangement may also be employed to execute the sequences of instructions contained in the main memory 2407. In alternative embodiments, hard-wired circuitry may be used in place of or in combination with-software instructions. Thus, embodiments are not limited to any specific combination of hardware circuitry and software.

As stated above, the processor unit 2401 includes at least one computer readable medium or memory programmed according to the teachings of the invention and for containing data structures, tables, records, or other data described herein. Stored on any one or on a combination of computer readable media, the present invention includes software for controlling the system 2401, for driving a device or devices for implementing the invention, and for enabling the system 2401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 2405 for execution. A computer readable medium may take many forms, including but not limited to, non-volatile media, volatile media, and transmission media. Non-volatile media includes, for example, optical, magnetic disks, and magneto-optical disks, such as the storage device 2411. Volatile media includes dynamic memory, such as the main memory 2407. Transmission media includes coaxial cables, copper wire and fiber optics, including the wires that comprise the bus 2403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 2405 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 2401 may receive the data on the telephone line and use an infrared transmitter to convert the data to an infrared signal. An infrared detector coupled to the bus 2403 can receive the data carried in the infrared signal and place the data on the bus 2403. The bus 2403 carries the data to the main memory 2407, from which the processor 2405 retrieves and executes the instructions. The instructions received by the main memory 2407 may optionally be stored on a storage device 2411 either before or after execution by the processor 2405.

The communications interface 2413 provides a two-way UWB data communication coupling to a network link 2423, which is connected to the communications network 2425. The communications network 2425 may be a local area network (LAN), a personal area network (PAN), or the like. For example, the communication interface 2413 may be a network interface card and the communications network may be a packet switched UWB-enabled PAN. As another example, the communication interface 2413 may be a UWB accessible asymmetrical digital subscriber line (ADSL) card, an integrated services digital network (ISDN) card, or a modem to provide a data communication connection to a corresponding type of communications line.

The communications interface 2413 may also include the hardware to provide a two-way wireless communications coupling other than a UWB coupling, or a hardwired coupling to the network link 2423. Thus, the communications interface 2413 may incorporate the UWB transceiver of FIG. 1 or FIG. 8 as part of a universal interface that includes hardwired and non-UWB wireless communications coupling to the network link 2423.

The network link 2423 typically provides data communication through one or more networks to other data devices. For example, the network link 2423 may provide a connection through a LAN to the host computer 2427 or to data equipment operated by a service provider, which provides data communication services through the IP network 2429. Moreover, the network link 2423 may provide a connection through the communications network 2425 to the mobile device 2431, e.g., a personal data assistant (PDA), laptop computer, or cellular telephone.

The communications network 2425 and IP network 2429 both preferably use electrical, electromagnetic, or optical signals that carry digital data streams. The signals through the various networks and the signals on the network link 2423 and through the communication interface 2413, which carry the digital data to and from the system 2401, are exemplary forms of carrier waves transporting the information. The processor unit 2401 can transmit notifications and receive data, including program code, through the communications network 2425, the network link 2423, and the communication interface 2413.

Obviously, numerous modifications and variations of the present invention are possible in light of the above teachings. It is therefore to be understood that within the scope of the appended claims, the invention may be practiced otherwise than as specifically described herein.

What is claimed is:

1. A mode controller for determining a desired operation mode for acquisition or tracking of an incoming data signal, comprising:
    a data dependence removal element for receiving the incoming data signal and outputting a data-independent signal that indicates a strength of the incoming data signal independent of data contained in the incoming data signal;
    a signal path comprising
        a first processor for manipulating the data-independent signal to determine a first intermediate signal; and
        a first non-linear function element for performing a non-linear function on the first intermediate signal to determine a signal parameter;
    a noise-related path, comprising
        a second non-linear function element for performing a non-linear function on the data-independent signal to determine a second intermediate signal;
        a second processor for manipulating the second intermediate signal to determine a noise-related parameter; and
    a third processor for processing the signal parameter and the noise-related parameter to determine a mode-controlling parameter indicative of the relative signal strength of the incoming data signal.

2. A mode controller for determining a desired operation mode for acquisition or tracking of an incoming data signal, as recited in claim 1, further comprising a first sub-sampler between the first processor and the first non-linear function element for sampling the first intermediate signal at a first rate and outputting a sampled first intermediate signal to the first non-linear function element.

3. A mode controller for determining a desired operation mode for acquisition or tracking of an incoming data signal, as recited in claim 1, further comprising a second sub-sampler between the second processor and the comparator for sampling the signal parameter at a second rate and outputting a sampled signal parameter to the comparator.

4. A mode controller for determining a desired operation mode for acquisition or tracking of an incoming data signal, as recited in claim 1, further comprising an input scaler for multiplying the incoming signal by a first scaling factor before it is input to the data dependence removal element.

5. A mode controller for determining a desired operation mode for acquisition or tracking of an incoming data signal, as recited in claim 4, wherein the first scaling factor is a factor of 2.

6. A mode controller for determining a desired operation mode for acquisition or tracking of an incoming data signal, as recited in claim 4, wherein the first scaling factor is programmable.

7. A mode controller for determining a desired operation mode for acquisition or tracking of an incoming data signal, as recited in claim 1, further comprising a signal path scaler for multiplying the signal parameter by a second scaling factor before it is input to the comparator.

8. A mode controller for determining a desired operation mode for acquisition or tracking of an incoming data signal, as recited in claim 7, wherein the second scaling factor is a factor of 2.

9. A mode controller for determining a desired operation mode for acquisition or tracking of an incoming data signal, as recited in claim 7, wherein the second scaling factor is programmable.

10. A mode controller for determining a desired operation mode for acquisition or tracking of an incoming data signal, as recited in claim 1, further comprising a noise-related path scaler for multiplying the noise-related signal by a third scaling factor before it is input to the comparator.

11. A mode controller for determining a desired operation mode for acquisition or tracking of an incoming data signal, as recited in claim 10, wherein the third scaling factor is a factor of 2.

12. A mode controller for determining a desired operation mode for acquisition or tracking of an incoming data signal, as recited in claim 10, wherein the third scaling factor is programmable.

13. A mode controller for determining a desired operation mode for acquisition or tracking of an incoming data signal, as recited in claim 1, wherein the first processor is a first filter.

14. A mode controller for determining a desired operation mode for acquisition or tracking of an incoming data signal, as recited in claim 13, wherein the first filter is a finite impulse response filter.

15. A mode controller for determining a desired operation mode for acquisition or tracking of an incoming data signal, as recited in claim 14, wherein the first filter is a moving average filter.

16. A mode controller for determining a desired operation mode for acquisition or tracking of an incoming data signal, as recited in claim 13, wherein the first filter is an infinite impulse response filter.

17. A mode controller for determining a desired operation mode for acquisition or tracking of an incoming data signal, as recited in claim 16, wherein the first filter is a leaky integrator filter.

18. A mode controller for determining a desired operation mode for acquisition or tracking of an incoming data signal, as recited in claim 1, wherein the second processor is a second filter.

19. A mode controller for determining a desired operation mode for acquisition or tracking of an incoming data signal, as recited in claim 18, wherein the second filter is a finite impulse response filter.

20. A mode controller for determining a desired operation mode for acquisition or tracking of an incoming data signal, as recited in claim 19, wherein the second filter is a moving average filter.

21. A mode controller for determining a desired operation mode for acquisition or tracking of an incoming data signal, as recited in claim 18, wherein the second filter is an infinite impulse response filter.

22. A mode controller for determining a desired operation mode for acquisition or tracking of an incoming data signal, as recited in claim 21, wherein the second filter is a leaky integrator filter.

23. A mode controller for determining a desired operation mode for acquisition or tracking of an incoming data signal, as recited in claim 1, wherein the data dependence removal element is an absolute value element that outputs the absolute value of the incoming signal as the data-independent signal.

24. A mode controller for determining a desired operation mode for acquisition or tracking of an incoming data signal, as recited in claim 1, wherein the first non-linear function element is a first squarer that outputs the square of the first intermediate signal as the signal parameter.

25. A mode controller for determining a desired operation mode for acquisition or tracking of an incoming data signal, as recited in claim 1, wherein the second non-linear function element is a second squarer that outputs the square of the data-independent signal as the second intermediate signal.

26. A mode controller for determining a desired operation mode for acquisition or tracking of an incoming data signal, as recited in claim 1, wherein the first processor is an infinite impulse response filter and the second processor is a leaky integrator filter.

27. A mode controller for determining a desired operation mode for acquisition or tracking of an incoming data signal, as recited in claim 26, wherein the infinite impulse response filter is shaped to approximate an expected correlation signal.

28. A mode controller for determining a desired operation mode for acquisition or tracking of an incoming data signal, as recited in claim 1, wherein the first processor is a first moving average filter and the second processor is a second moving average filter.

29. A mode controller for determining a desired operation mode for acquisition or tracking of an incoming data signal, comprising:
    an absolute value element for receiving the incoming data signal and determining an absolute value of the incoming data signal;
    a signal path comprising
        a first filter for filtering the absolute value of the data signal to determine a first intermediate signal; and
        a first squarer for squaring the first intermediate signal to determine a signal parameter;
    a noise-related path, comprising
        a second squarer for squaring the absolute value of the incoming data signal to determine a second intermediate signal; and
        a second filter for filtering the second intermediate signal to determine a noise-related parameter; and
    a comparator for comparing the signal parameter and the noise-related parameter to determine a mode-controlling parameter indicative of the relative signal strength of the incoming data signal.

30. A mode controller for determining a desired operation mode for acquisition or tracking of an incoming data signal, as recited in claim 29, further comprising a first sub-sampler between the first filter and the first squarer for sampling the first intermediate signal at a first rate and outputting a sampled first intermediate signal to the first squarer.

31. A mode controller for determining a desired operation mode for acquisition or tracking of an incoming data signal, as recited in claim 29, further comprising a second sub-sampler between the second filter and the comparator for sampling the signal parameter at a second rate and outputting a sampled signal parameter to the comparator.

32. A mode controller for determining a desired operation mode for acquisition or tracking of an incoming data signal, as recited in claim 29, further comprising an input scaler for multiplying the incoming signal by a first scaling factor before it is input to the absolute value element.

33. A mode controller for determining a desired operation mode for acquisition or tracking of an incoming data signal, as recited in claim 32, wherein the first scaling factor is a factor of 2.

34. A mode controller for determining a desired operation mode for acquisition or tracking of an incoming data signal, as recited in claim 32, wherein the first scaling factor is programmable.

35. A mode controller for determining a desired operation mode for acquisition or tracking of an incoming data signal, as recited in claim 29, further comprising a signal path scaler for multiplying the signal parameter by a second scaling factor before it is input to the comparator.

36. A mode controller for determining a desired operation mode for acquisition or tracking of an incoming data signal, as recited in claim 35, wherein the second scaling factor is a factor of 2.

37. A mode controller for determining a desired operation mode for acquisition or tracking of an incoming data signal, as recited in claim 35, wherein the second scaling factor is programmable.

38. A mode controller for determining a desired operation mode for acquisition or tracking of an incoming data signal, as recited in claim 29, further comprising a noise-related path scaler for multiplying the noise-related signal by a third scaling factor before it is input to the comparator.

39. A mode controller for determining a desired operation mode for acquisition or tracking of an incoming data signal, as recited in claim 38, wherein the third scaling factor is a factor of 2.

40. A mode controller for determining a desired operation mode for acquisition or tracking of an incoming data signal, as recited in claim 38, wherein the third scaling factor is programmable.

41. A mode controller for determining a desired operation mode for acquisition or tracking of an incoming data signal, as recited in claim 29, wherein the first filter is a finite impulse response filter.

42. A mode controller for determining a desired operation mode for acquisition or tracking of an incoming data signal, as recited in claim 41, wherein the first filter is a moving average filter.

43. A mode controller for determining a desired operation mode for acquisition or tracking of an incoming data signal, as recited in claim 29, wherein the first filter is an infinite impulse response filter.

44. A mode controller for determining a desired operation mode for acquisition or tracking of an incoming data signal, as recited in claim 43, wherein the first filter is a leaky integrator filter.

45. A mode controller for determining a desired operation mode for acquisition or tracking of an incoming data signal, as recited in claim 29, wherein the second filter is a finite impulse response filter.

46. A mode controller for determining a desired operation mode for acquisition or tracking of an incoming data signal, as recited in claim 45, wherein the second filter is a moving average filter.

47. A mode controller for determining a desired operation mode for acquisition or tracking of an incoming data signal, as recited in claim 29, wherein the second filter is an infinite impulse response filter.

48. A mode controller for determining a desired operation mode for acquisition or tracking of an incoming data signal, as recited in claim 47, wherein the second filter is a leaky integrator filter.

49. A mode controller for determining a desired operation mode for acquisition or tracking of an incoming data signal, as recited in claim 29, wherein the first filter is an infinite impulse response filter and the second filter is a leaky integrator filter.

50. A mode controller for determining a desired operation mode for acquisition or tracking of an incoming data signal, as recited in claim 49, wherein the infinite impulse response filter is shaped to approximate an expected correlation signal.

51. A mode controller for determining a desired operation mode for acquisition or tracking of an incoming data signal, as recited in claim 29, wherein the first filter is a first moving average filter and the second filter is a second moving average filter.

52. A mode controller for determining a desired operation mode for acquisition or tracking of an incoming data signal in an ultrawide bandwidth receiver, comprising:
   a signal path for determining a signal parameter of the incoming data signal;
   a noise-based path for determining a noise-based parameter of the incoming data signal;
   a processor for processing the signal parameter and the noise-related parameter to determine a mode-controlling parameter; and
   a controller for transitioning between an acquisition mode and a tracking mode based on the mode-controlling parameter.

53. A mode controller for determining a desired operation mode for acquisition or tracking of an incoming data signal in an ultrawide bandwidth receiver, as recited in claim 52, wherein the signal parameter is an estimate of signal strength and the noise-based parameter is an estimate of signal-plus-noise strength.

54. A mode controller for determining a desired operation mode for acquisition or tracking of an incoming data signal in an ultrawide bandwidth receiver, as recited in claim 52, wherein the processor is a comparator.

55. A mode controller for determining a desired operation mode for acquisition or tracking of an incoming data signal in an ultrawide bandwidth receiver, as recited in claim 52, further comprising
   a signal path scaler for scaling the signal parameter to generate a scaled signal parameter,
   wherein the processor receives the scaled signal parameter rather than the signal parameter.

56. A mode controller for determining a desired operation mode for acquisition or tracking of an incoming data signal in an ultrawide bandwidth receiver, as recited in claim 52, further comprising
   a noise path scaler for scaling the noise-based parameter to generate a scaled noise-based parameter, wherein the processor receives the scaled noise-based parameter rather than the noise-based parameter.

57. A mode controller for determining a desired operation mode for acquisition or tracking of an incoming data signal in an ultrawide bandwidth receiver, as recited in claim 52, wherein the signal path comprises a filter.

58. A mode controller for determining a desired operation mode for acquisition or tracking of an incoming data signal in an ultrawide bandwidth receiver, as recited in claim 52, wherein the noise path comprises a filter.

59. A mode controller for determining a desired operation mode for acquisition or tracking of an incoming data signal in an ultrawide bandwidth receiver, as recited in claim 52, further comprising an absolute value block for determining an absolute value of the incoming data signal and providing the absolute value of the data signal to the signal path and the noise-based path.

* * * * *